US012431573B2

(12) United States Patent
Fukuda et al.

(10) Patent No.: US 12,431,573 B2
(45) Date of Patent: Sep. 30, 2025

(54) CONNECTOR DRIVING STRUCTURE AND POWER SOURCE APPARATUS HAVING SAME

(71) Applicant: HONDA MOTOR CO., LTD., Tokyo (JP)

(72) Inventors: Osamu Fukuda, Sakado (JP); Aya Goto, Tokyo (JP); Hirokazu Umemura, Tokyo (JP); Toshihiro Masuda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 593 days.

(21) Appl. No.: 17/946,357

(22) Filed: Sep. 16, 2022

(65) Prior Publication Data

US 2023/0107734 A1 Apr. 6, 2023

(30) Foreign Application Priority Data

Oct. 1, 2021 (JP) .................................. 2021-163054

(51) Int. Cl.
*H01R 13/62* (2006.01)
*H01M 50/244* (2021.01)
(Continued)

(52) U.S. Cl.
CPC ....... *H01M 50/244* (2021.01); *H01M 50/543* (2021.01); *H01M 50/256* (2021.01)

(58) Field of Classification Search
CPC .................... H01M 50/244; H01R 13/62933
(Continued)

(56) References Cited

U.S. PATENT DOCUMENTS

| 4,843,477 A * | 6/1989 | Mizutani ............. B60R 11/0235 |
| | | 361/679.01 |
| 5,131,851 A * | 7/1992 | Billger .................... B60R 16/04 |
| | | 439/378 |

(Continued)

FOREIGN PATENT DOCUMENTS

| DE | 10 2014 102 202 A1 | 8/2015 |
| JP | 2000-123806 A | 4/2000 |

(Continued)

OTHER PUBLICATIONS

German Office Action received in corresponding German application No. 102022124191.2 dated Sep. 23, 2024 with English translation (4 pages).

(Continued)

*Primary Examiner* — Neil Abrams
(74) *Attorney, Agent, or Firm* — Rankin, Hill & Clark LLP

(57) ABSTRACT

A connector driving structure includes an operating part, a driving part that moves in conjunction with movement of the operating part, a connector elastically supported by the driving part, a damper supported by the connector, and a battery stand. Operating the operating part changes the position of the driving part between a close position where the driving part is close to the battery stand and an away position where the driving part is away from the battery stand. The connector includes a connector terminal and a terminal holding portion holding the connector terminal. The damper is provided such that its first end is supported by the terminal holding portion and its second end abuts against the battery base.

10 Claims, 39 Drawing Sheets

(51) Int. Cl.
*H01M 50/543* (2021.01)
*H01M 50/256* (2021.01)

(58) Field of Classification Search
USPC .......................................................... 439/310
See application file for complete search history.

(56) References Cited

U.S. PATENT DOCUMENTS

| | | | | |
|---|---|---|---|---|
| 5,504,991 A | * | 4/1996 | Parmley, Sr. | ........... B60L 53/30 |
| | | | | 320/109 |
| 5,829,997 A | * | 11/1998 | Okano | ................. H01R 13/701 |
| | | | | 361/740 |
| 7,291,032 B1 | * | 11/2007 | Carver | ................... H01R 43/26 |
| | | | | 439/310 |
| 8,246,372 B1 | * | 8/2012 | Walters | ................ H01R 13/622 |
| | | | | 439/310 |
| 10,370,127 B1 | * | 8/2019 | Michael | ............... H01R 13/502 |

| | | | |
|---|---|---|---|
| 2014/0287289 A1 | | 9/2014 | Lee |
| 2015/0236312 A1 | | 8/2015 | Koehler et al. |
| 2020/0274119 A1 | | 8/2020 | Okubo et al. |
| 2020/0388802 A1 | | 12/2020 | Takeuchi |
| 2023/0107734 A1 | * | 4/2023 | Fukuda ............... H01M 50/244 |
| | | | 429/96 |

FOREIGN PATENT DOCUMENTS

| | | |
|---|---|---|
| JP | 2008-247371 A | 10/2008 |
| WO | 2019/064593 A1 | 4/2019 |

OTHER PUBLICATIONS

Indian Office Action received in corresponding Indian application No. 202244056333 dated Jan. 8, 2024 (6 pages); English translation included.

* cited by examiner

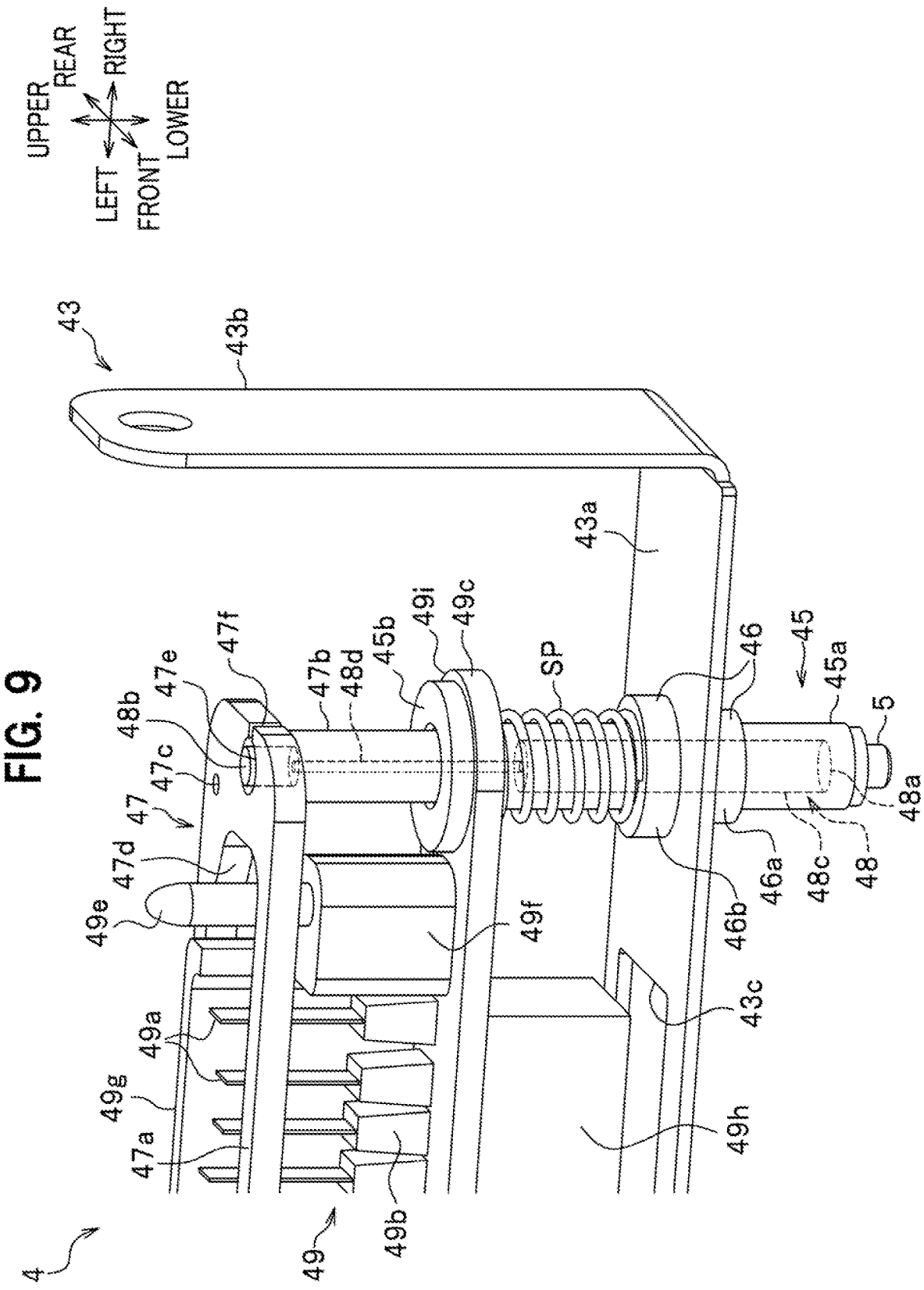

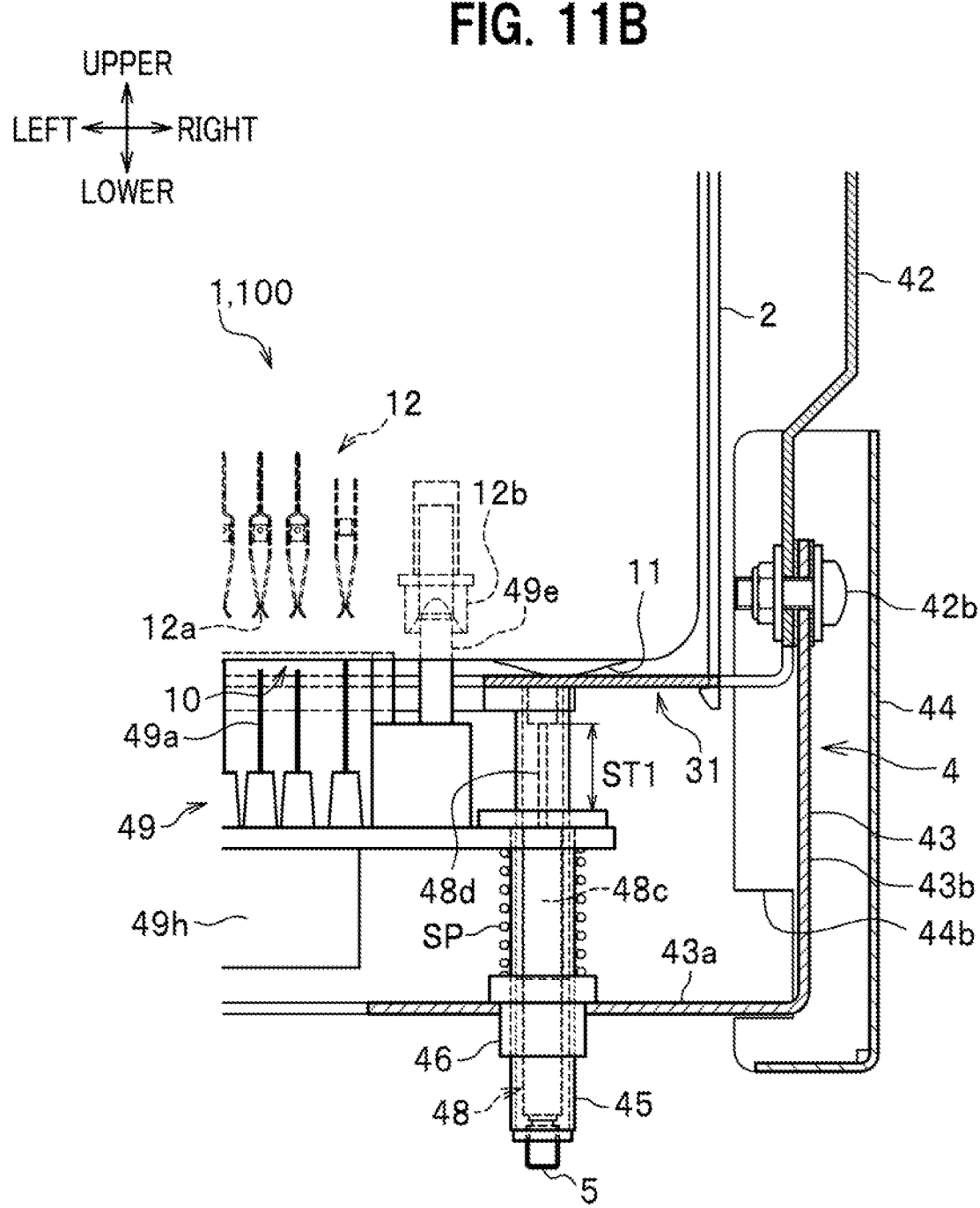

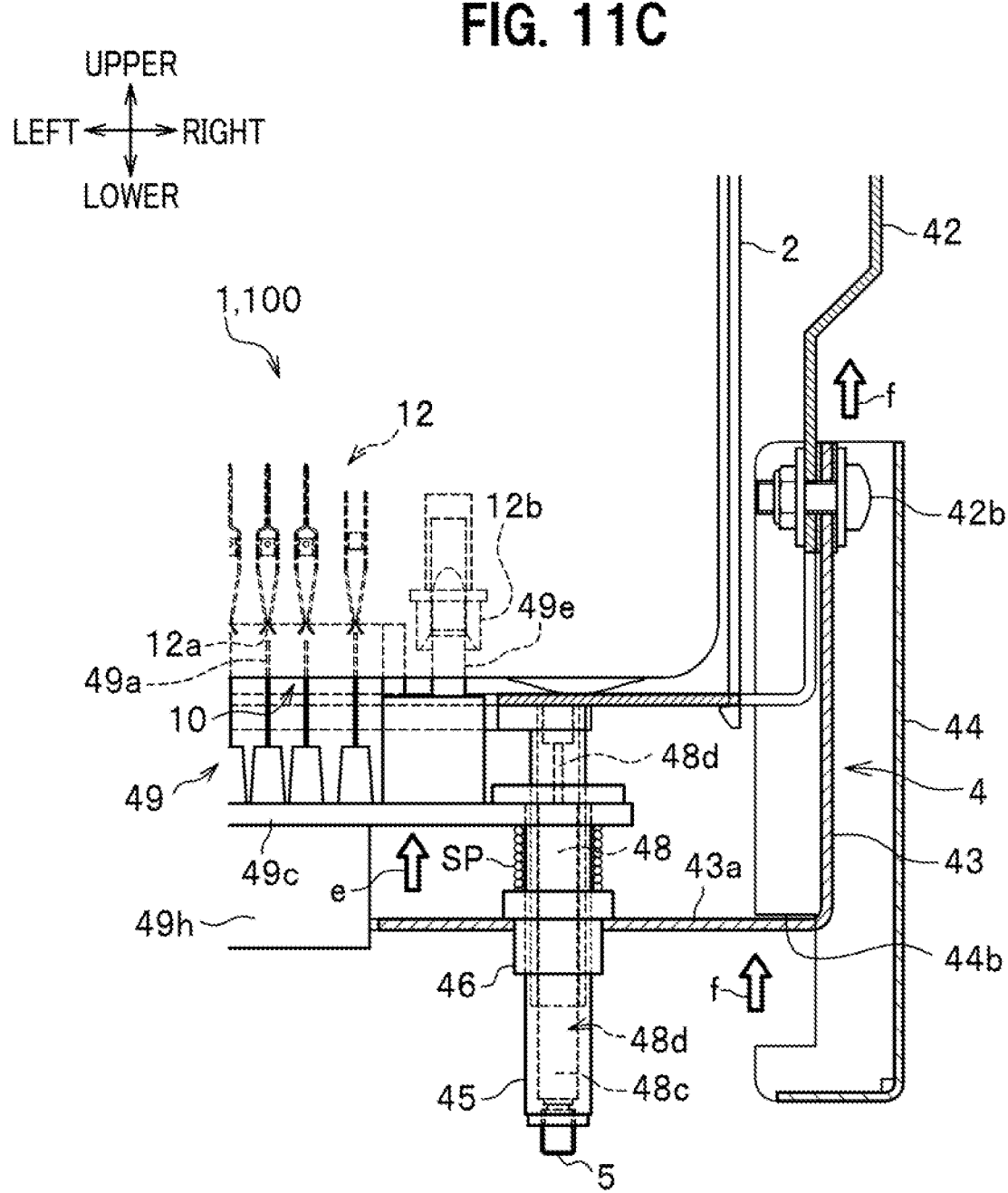

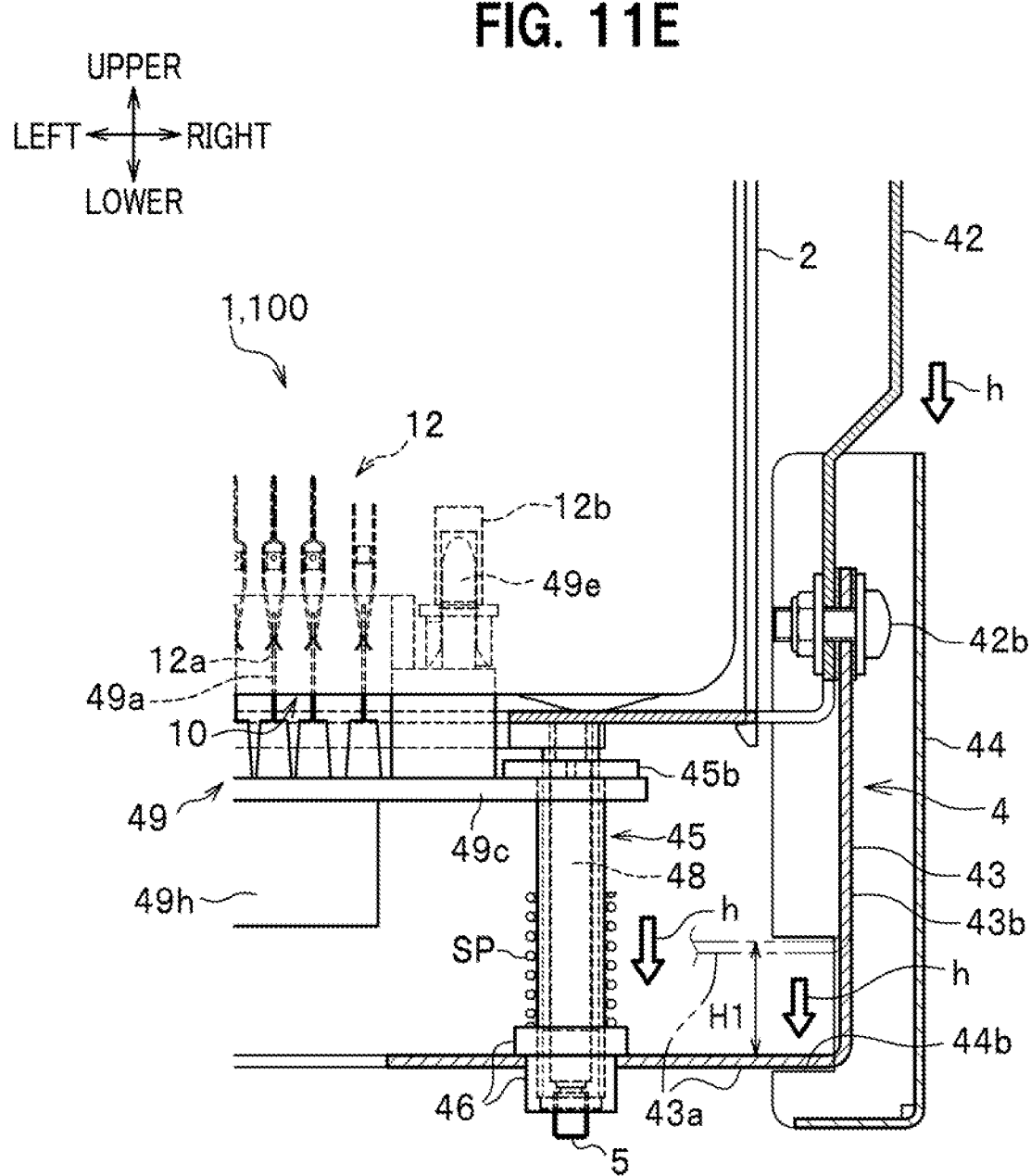

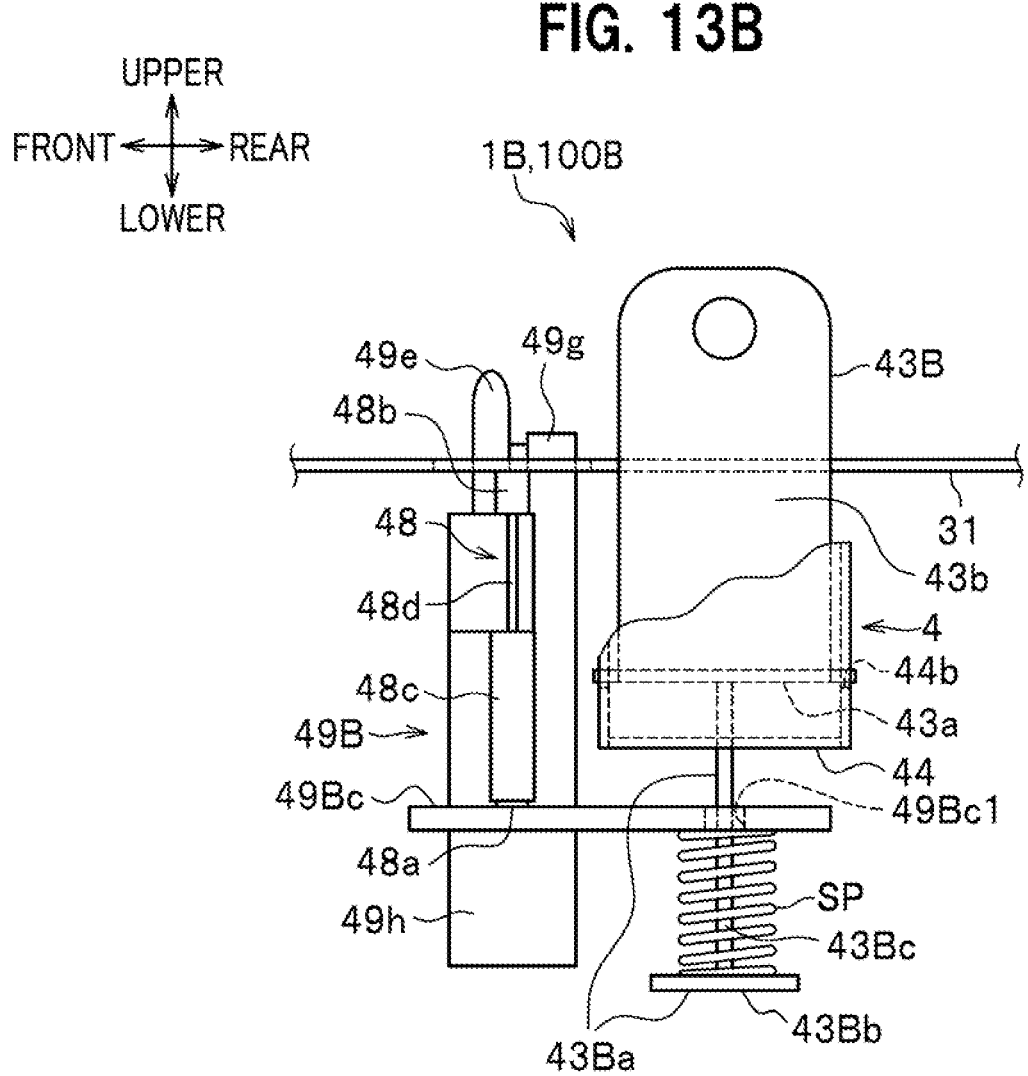

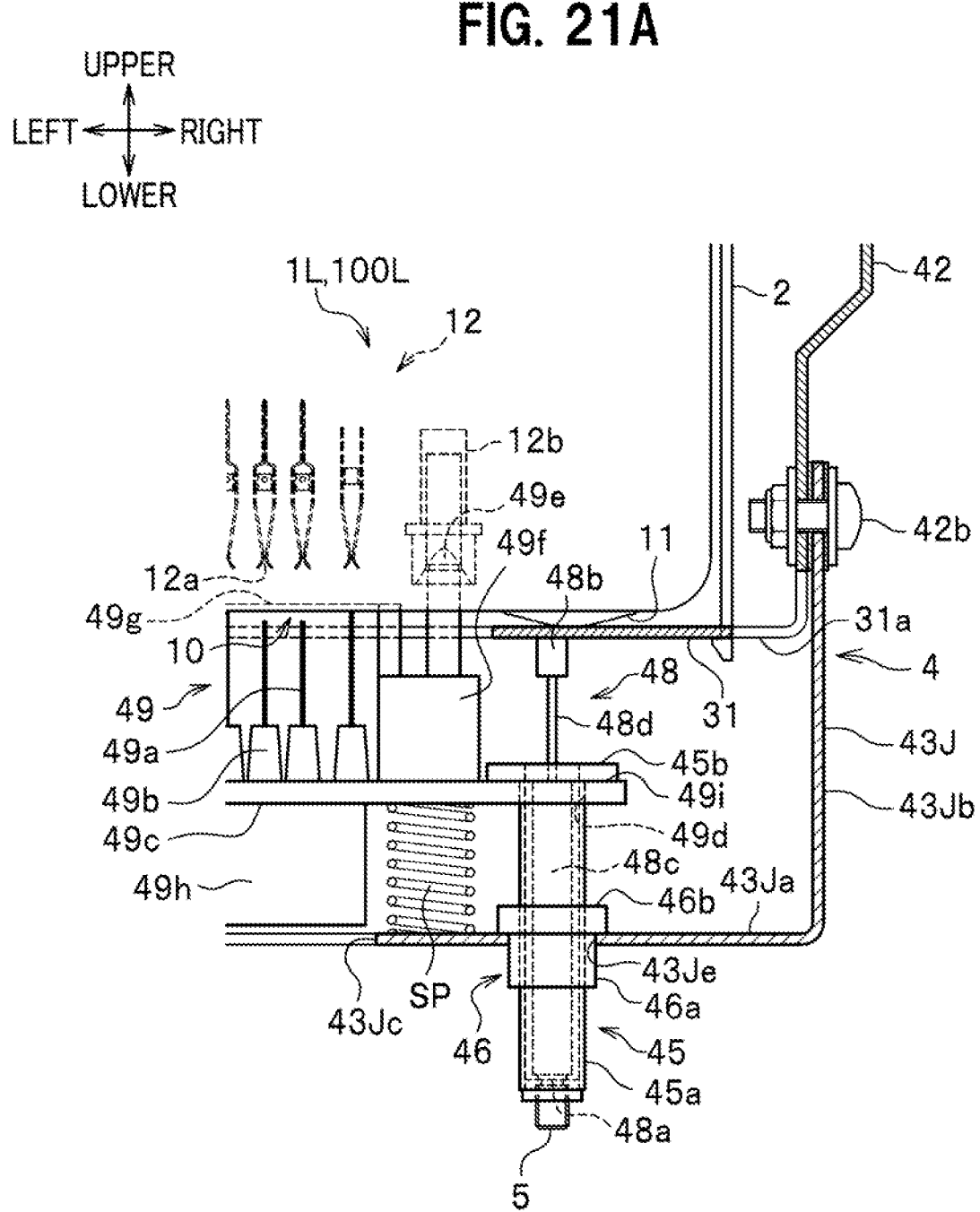

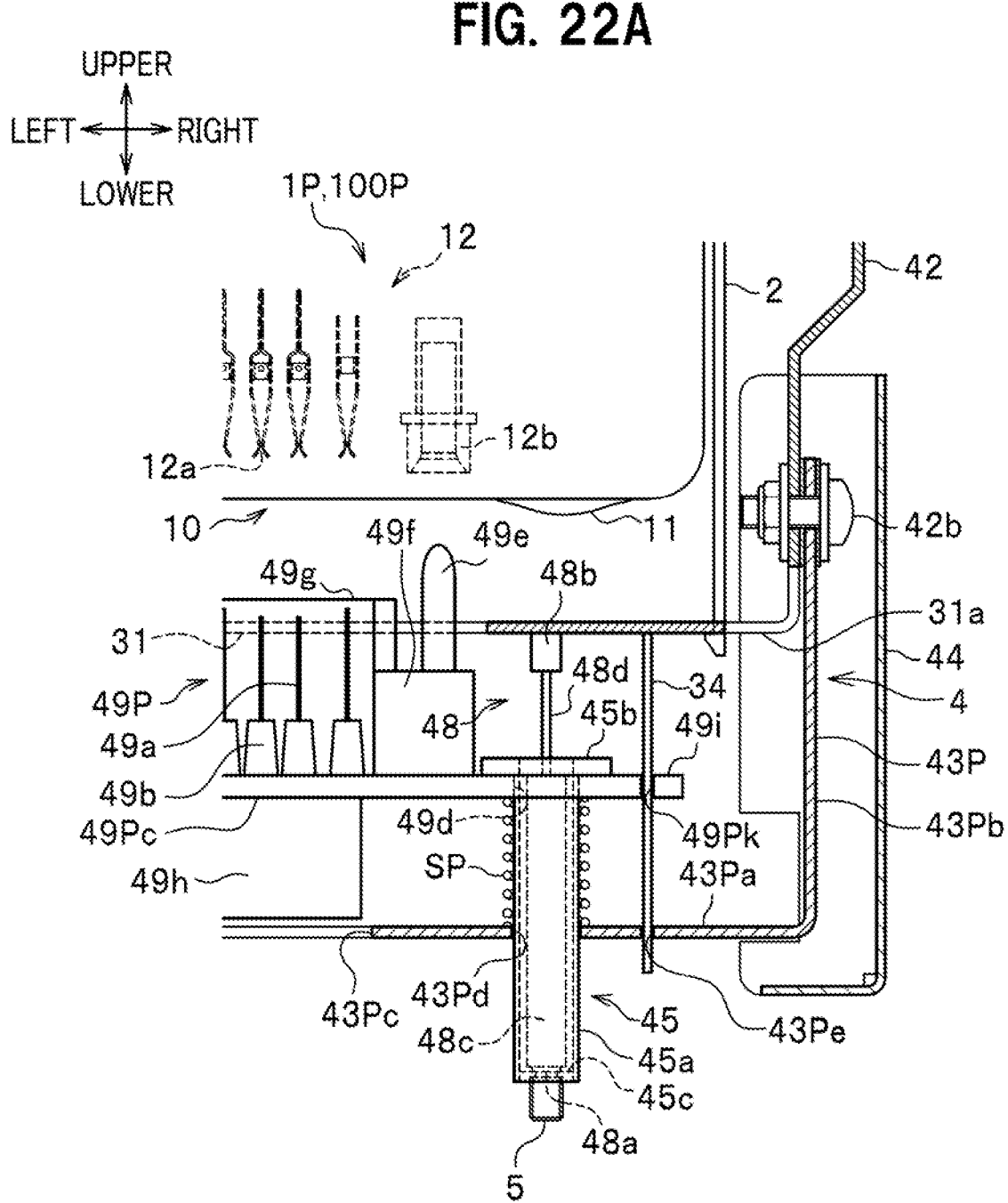

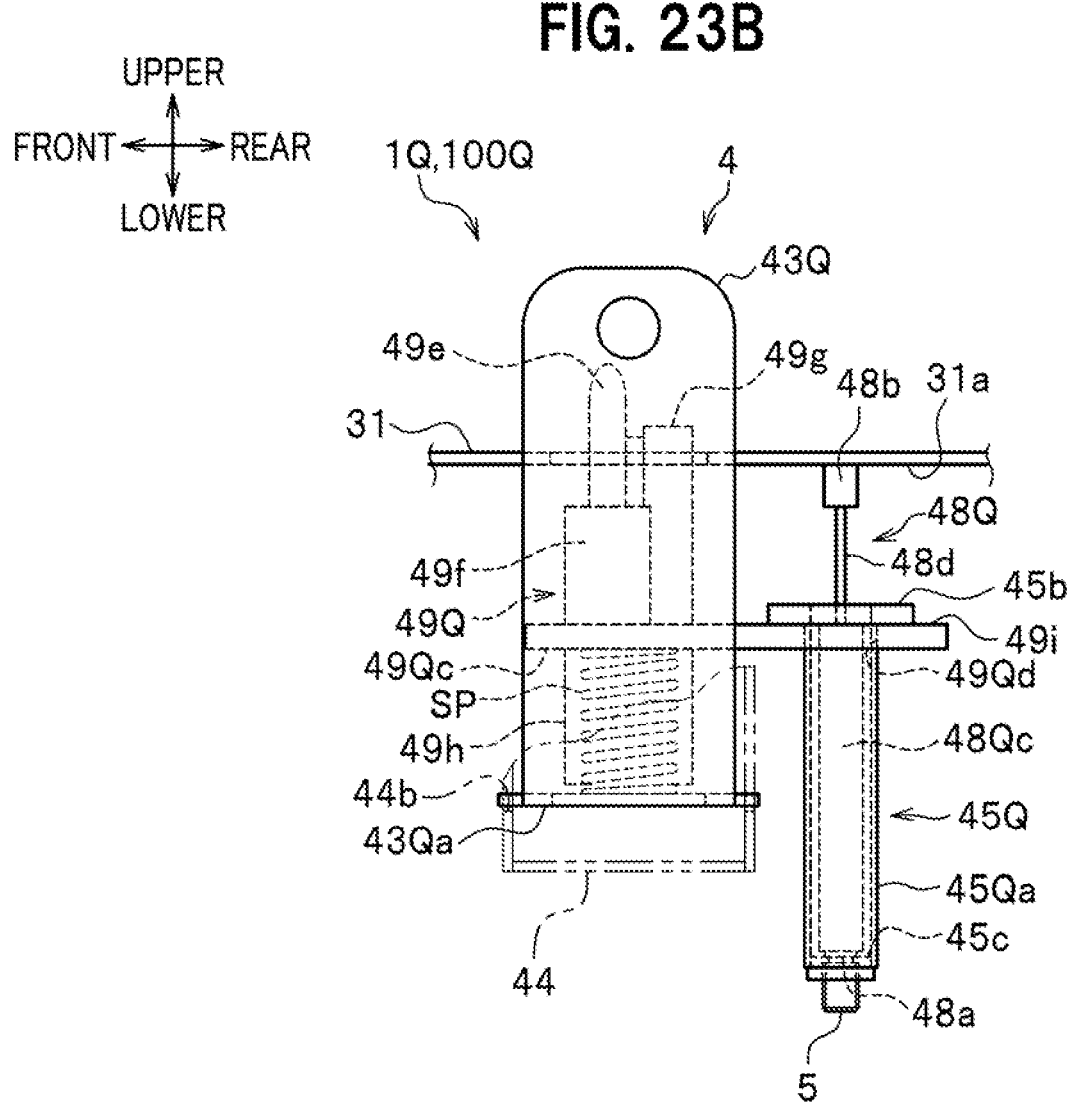

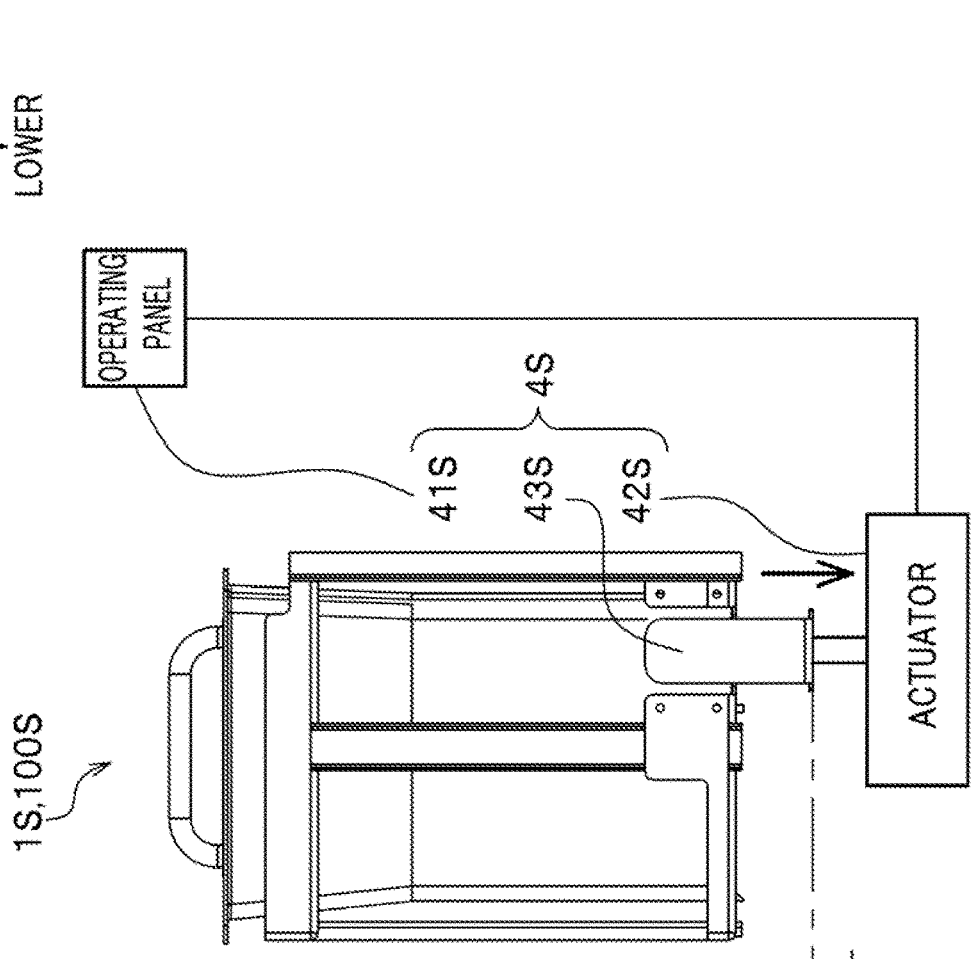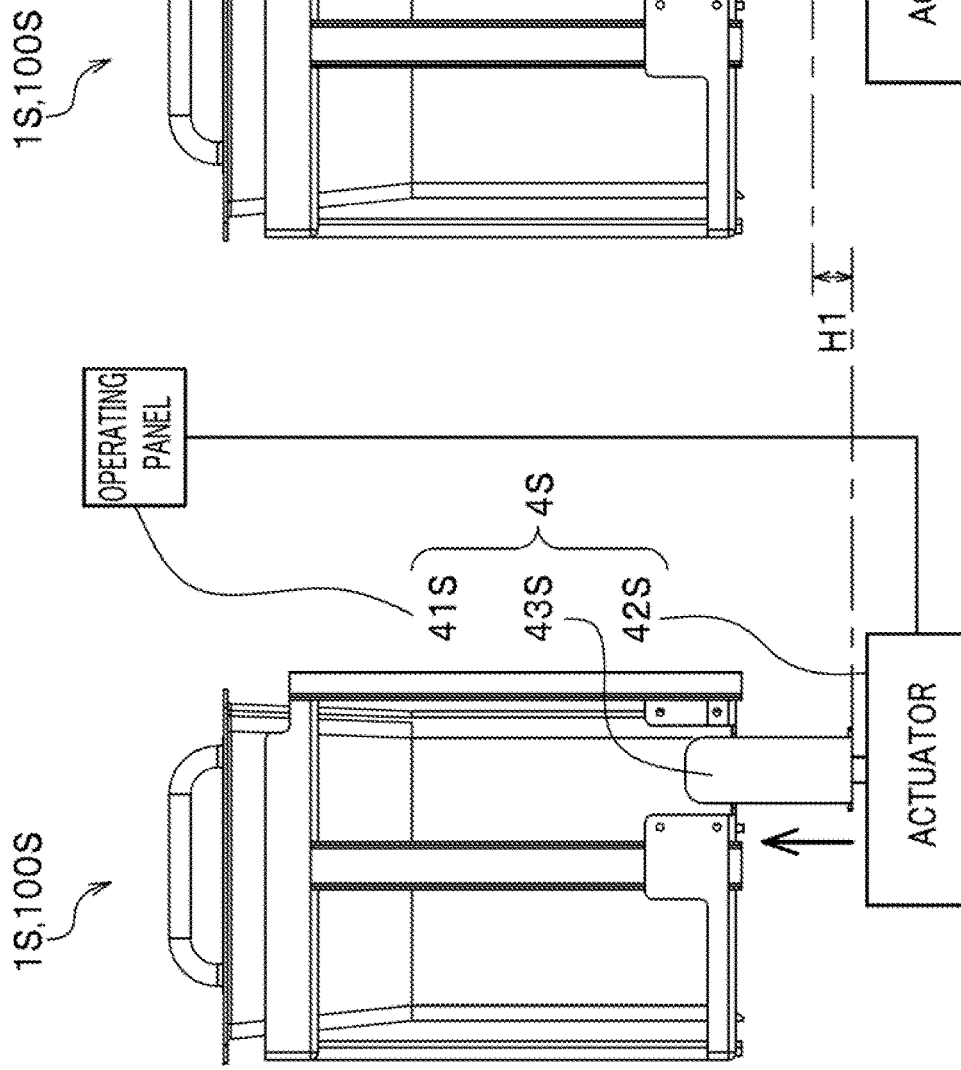

CONNECTOR DRIVING STRUCTURE AND POWER SOURCE APPARATUS HAVING SAME

BACKGROUND OF THE INVENTION

1. Field of the Invention

The present invention relates to a connector driving structure and a power source apparatus having the same.

2. Description of the Related Art

A power source apparatus that supplies power to an electrically-operated machine or the like typically has a battery case in which to place a battery and an operating part used in order to insert case-side connection terminals to a terminal portion of the battery placed in the battery case. For example, a vehicle battery storing apparatus described in Patent Literature 1 is known as an apparatus in which a battery is detachably housed in a battery case.

PRIOR ART DOCUMENT(S)

Patent Literature(s)

Patent Literature 1: WO2019/064593A

In a battery storing apparatus of this type, it is preferable that the speed of performing the operation of inserting the case-side connection terminals to the battery's terminal portion be controlled to a moderate speed.

However, the operation speed varies depending on the power of the arm of or the posture of a user, and it is difficult to require the user to control their operation speed.

SUMMARY OF THE INVENTION

Thus, an object of the present invention is to provide a connector driving structure and a power source apparatus having the same that can make the speed of positional change of a connector a predetermined speed or below.

In order to achieve the above object, a connector driving structure according to the present invention includes an operating part, a driving part that that moves in conjunction with movement of the operating part, a connector supported by the driving part via at least one elastic member, at least one damper supported by the connector, and a battery stand. When the operating part is operated, the driving part changes position between a close position where the driving part is close to the battery stand and an away position where the driving part is away from the battery stand. The connector includes a connector terminal and a terminal holding portion holding the connector terminal. A first end of the damper is supported by the terminal holding portion, while a second end of the damper abuts against the battery stand.

The present invention can provide a connector driving structure and a power source apparatus having the same that can make the speed of positional change of a connector a predetermined speed or below even if the operating part is operated too fast.

BRIEF DESCRIPTION OF THE DRAWINGS

FIG. 7 is an exploded perspective view of a guide member, dampers, damper holding members, a connector, a driving part, and the like.

FIG. 9 is a primary-part enlarged perspective view showing movable parts where the connector is attached.

FIG. 11B is a primary-part enlarged front view showing, partially in section, how the connector is when the battery is placed on a battery stand.

FIG. 11C is a primary-part enlarged front view showing, partially in section, how the connector is when the operating part is operated to the fixed position.

FIG. 11E is a primary-part enlarged front view showing, partially in section, how the connector is when the operating part is operated to the release position.

FIG. 13B is a diagram showing the second modification of the connector driving structure and the power source apparatus having the same according to the embodiment of the present invention and is a primary-part enlarged side view showing how the damper is installed.

FIG. 21A is a primary-part enlarged front view showing, partially in section, how a collar of a tenth modification of the connector driving structure and the power source apparatus having the same according to the embodiment of the present invention is installed.

FIG. 22A is a primary-part enlarged front view showing, partially in section, how a rising-and-lowering guide of an eleventh modification of the connector driving structure and the power source apparatus having the same according to the embodiment of the present invention is installed.

FIG. 23B is a primary-part enlarged side view showing the twelfth modification of the connector driving structure and the power source apparatus having the same according to the embodiment of the present invention.

FIGS. 25A and 25B are diagrams showing a fourteenth modification of the connector driving structure and the power source apparatus having the same according to the embodiment of the present invention, FIG. 25A being a side view of a state where an actuator is actuated to a release position (downward), FIG. 25B being a side view showing a state where the actuator is actuated to a fixed position (upward).

DETAILED DESCRIPTION OF THE EMBODIMENTS

Figure 1:
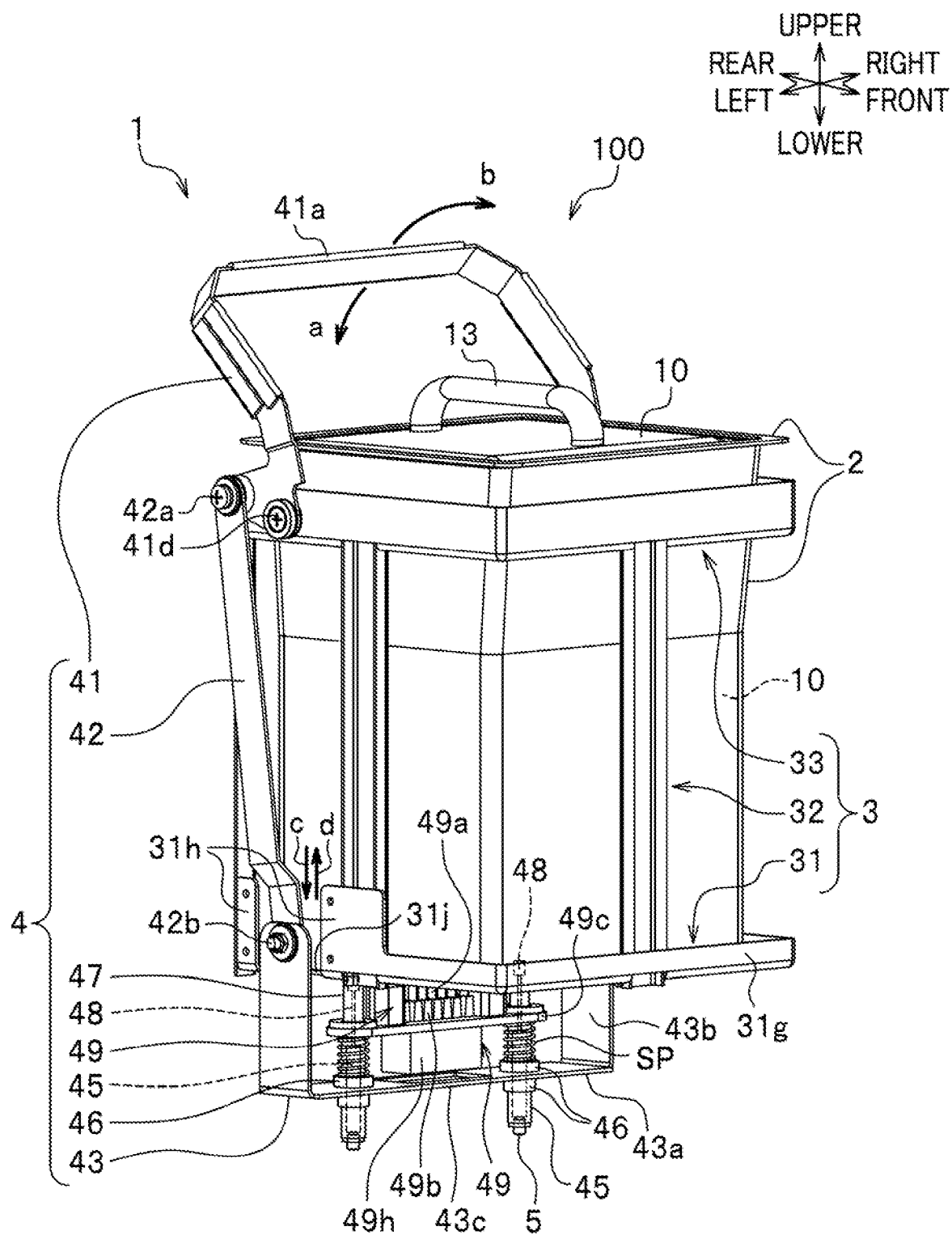
FIG. 1 is a perspective view showing an example of a connector driving structure and a power source apparatus having the same according to an embodiment of the present invention.

Next, with reference to FIGS. 1 to 11F, an example of a connector driving structure 1 and a power source apparatus 100 according to an embodiment of the present invention is described. In the embodiment, the same elements are denoted by the same reference numeral to avoid repetitive descriptions.

Note that directions in which an operating part 41 shown in FIG. 1 turns are described as "front" and "rear," the directions where turning shafts 41d, 41d (see FIG. 2) of the operating part 41 lie are described as "left" and "right," and the upper side of the vertical direction is described as "upper," and the lower side of the vertical direction is described as "lower."

<<Power Source Apparatus>>

The power source apparatus 100 shown in FIG. 1 is a current supply apparatus for supplying a DC current from a battery 10 to a device (not shown) to drive the device. The device driven by the power source apparatus 100 may be any device that is actuated by receiving a DC current from the battery 10, and there are no particular limitations as to its structure, intended purpose of use, type, and the like. An example of the device driven by being supplied with a current by the power source apparatus 100 is an LED floodlight (LED illuminating device) that provides lighting by turning on an LED lamp. As an example of the power source apparatus 100, the following describes a case where a current from the battery 10 is supplied to an LED floodlight (not shown).

The power source apparatus 100 has a battery stand 31, the battery 10 mounted on the battery stand 31, the connector driving structure 1, and the like. A plurality of power source apparatuses 100 may be used as a set, or a single power source apparatus 100 may be used solely.

Note that in a case where a plurality of power source apparatuses 100 are used as a set, they are used by being mounted on a wagon and electrically connected to one another, or by being housed in a casing and electrically connected to one another.

<<Connector Driving Structure>>

Figure 2:
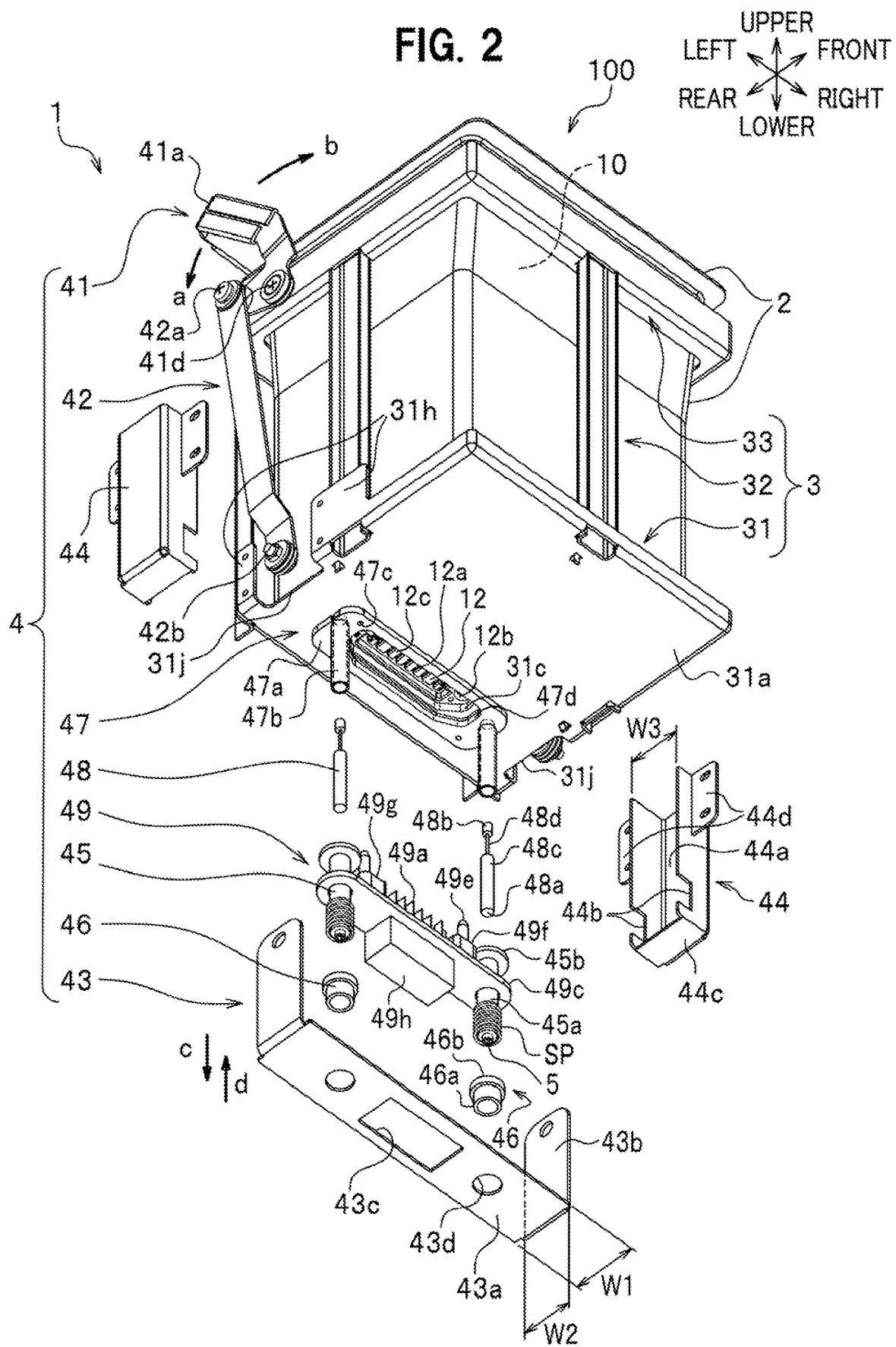
FIG. 2 is an exploded perspective view of a connector driving structure.

As shown in FIG. 2, the connector driving structure 1 is configured mainly including the operating part 41, a driving part 43, elastic members SP, a connector 49, dampers 48, and the battery stand 31. The connector driving structure 1 is configured such that the connector 49 is elastically supported by the driving part 43 that rises and lowers in conjunction with the operation of the operating part 41 and such that the rising speed of the connector 49 is reduced by the dampers 48.

<<Battery>>

Figure 3A:
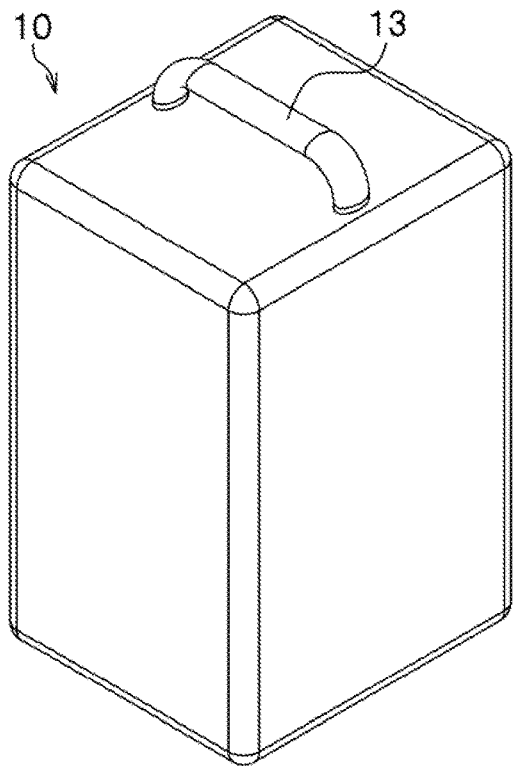
FIG. 3A is a perspective view of a battery.
Figure 3B:
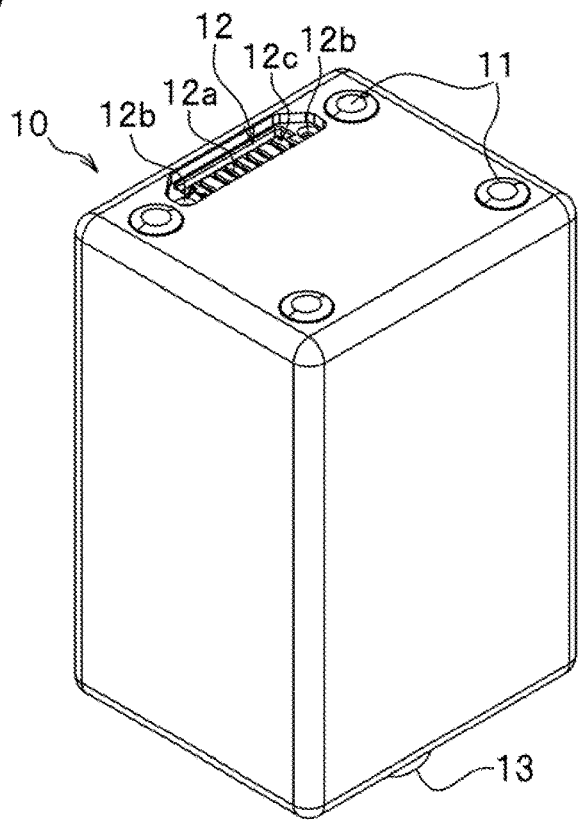
FIG. 3B is a perspective view of the battery shown upside down.

As shown in FIGS. 3A and 3B, the battery 10 is a rechargeable storage battery. The battery 10 is formed in, for example, a rectangular solid which is long in the up-down direction. The battery 10 is formed by, for example, one that weights approximately 10 kg. As shown in FIG. 3A, a grip 13 is provided to the upper surface of the battery 10 for a worker to grip when carrying the battery 10. As shown in FIG. 3B, leg portions 11 and a battery-side connector 12 are provided to the lower surface of the battery 10.

As shown in FIG. 1, the battery 10 is inserted into a battery housing body 2 in such a manner that the battery 10 can be put into and out of (or pulled up from or pushed down into) the battery housing body 2. To charge the battery 10, after the operating part 41 is operated to bring female terminals 12a of the battery 10 (see FIG. 2) away from connector terminals 49a, the grip 13 is pulled up to take the battery 10 out of the battery housing body 2, and the battery 10 is charged using a charger (not shown) after that. The charged battery 10 is housed in the battery housing body 2 when used.

Note that there are no particular limitations as to the shape and the like of the battery 10 as long as the battery 10 can be put into and out of the battery housing body 2.

As shown in FIG. 3B, the leg portions 11 are parts that support the battery 10 from below. The leg portions 11 are formed of four protruding portions protruding from four corners of the lower surface of the battery 10.

Figure 7:
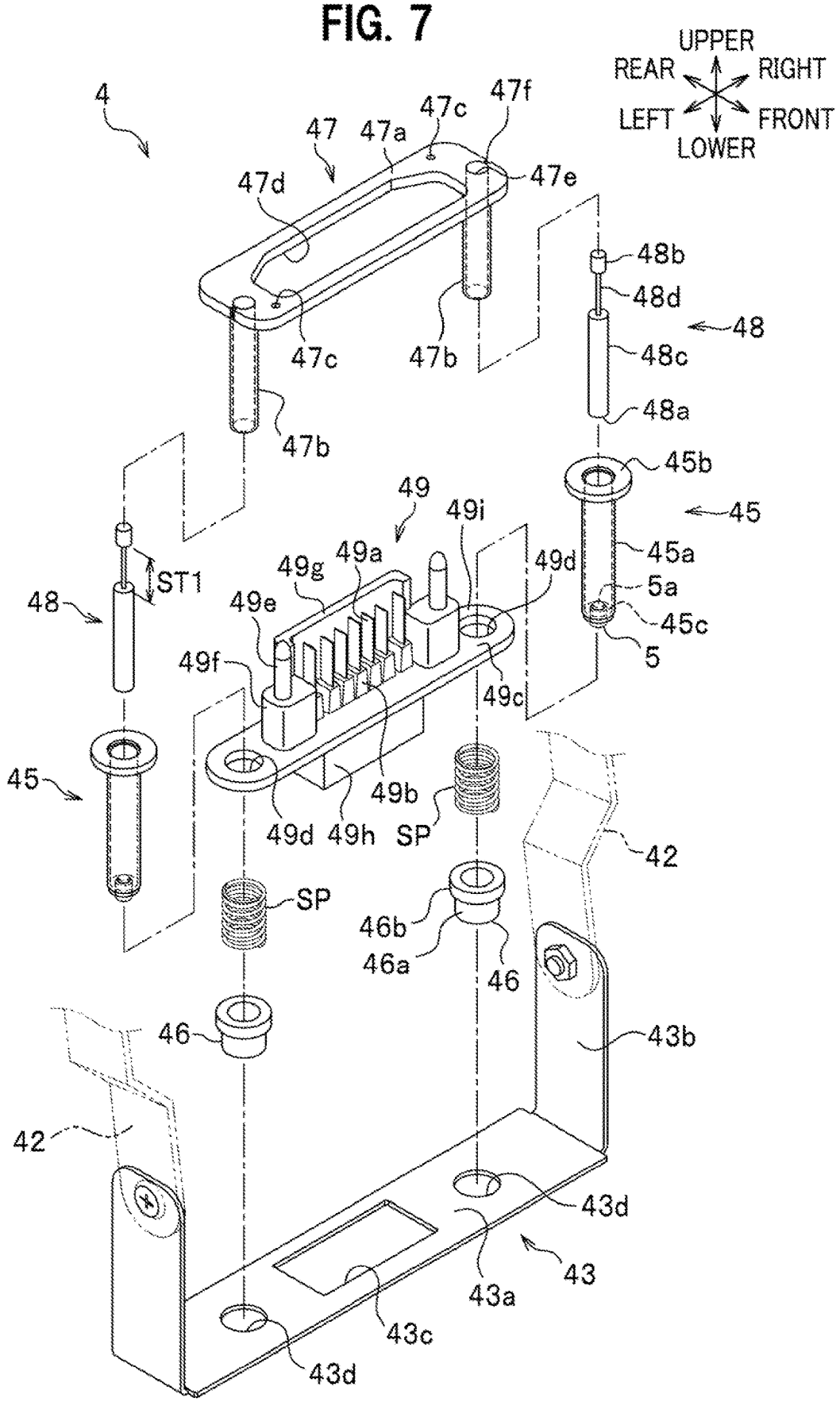

The battery-side connector 12 is an electric connector that establishes electric connection when the case-side connector 49 (see FIG. 2) disposed above the driving part 43 engages with the battery-side connector 12. As shown in FIG. 3B or 7, the battery-side connector 12 has the female terminals 12a with which the connector terminals 49a engage, guide pin engagement portions 12b with which guide pins 49e engage, and a coupler engagement hole 12c with which a coupler 49g engages.

The female terminals 12a are formed of as many terminals as the connector terminals 49a. The female terminals 12a are arranged side by side in a row in the battery-side connector 12 at appropriate intervals.

The guide pin engagement portions 12b are formed of two engagement portions disposed at the left and right sides of the female terminals 12a.

The coupler engagement hole 12c is formed of a through-hole having the same shape as a battery-side connector engagement hole 31c.

As shown in FIG. 3A, the grip 13 is formed protruding from the upper surface of the battery 10 in a substantially inverted concave shape in aside view. The grip 13 is formed by, for example, bending a metal round bar into a substantially angular letter-U shape.

<<Battery Housing Body>>

Figure 4:
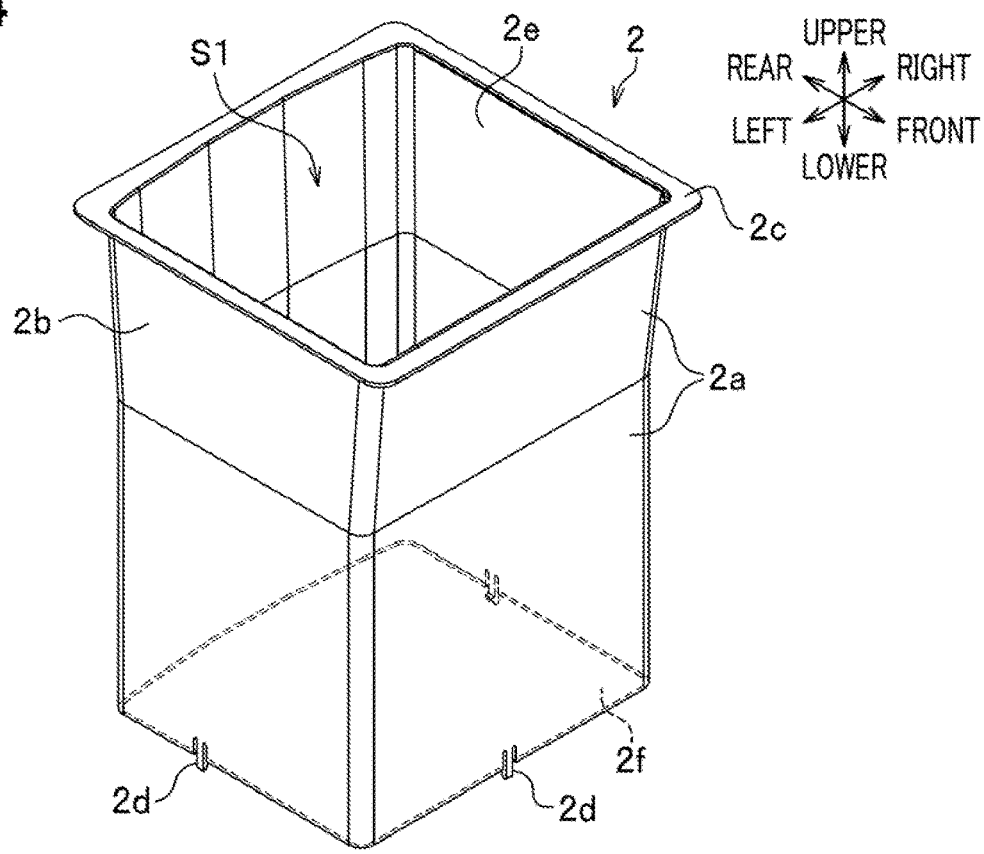
FIG. 4 is a perspective view of a battery housing body.

As shown in FIG. 4, the battery housing body 2 is a box-shaped body made of resin and is for housing the battery 10 (see FIG. 3A). The battery housing body 2 is formed of a tubular body having a square tube portion 2a with upper and lower openings 2e, 2f. The battery housing body 2 has the square tube portion 2a, an expanded portion 2b, a flange portion 2c, a plurality of lock tabs 2d, and the openings 2e, 2f. The battery housing body 2 is disposed inside a battery holding body 3 shown in FIG. 5A. More specifically, the battery housing body 2 is placed on the battery stand 31, inside an upper frame 33 and vertical frames 32 of the battery holding body 3. The lock tabs 2d (see FIG. 4) of the battery housing body 2 are locked into lock holes 31b of the battery stand 31.

Note that the battery housing body 2 shown in FIG. 4 is an example. The battery housing body 2 is not limited to one that is made of resin and may be made of metal. Also, there is no particular limitation as to the shape of the battery housing body 2 as long as the battery housing body 2 can house the battery 10 (see FIG. 3A).

As shown in FIG. 4, the square tube portion 2a is a part having a square tube shape and forms a housing space S1 for housing the battery 10 (see FIG. 3A).

The expanded portion 2b is a portion formed expanding from a substantially center portion to the upper opening 2e of the square tube portion 2a. Because the battery housing body 2 has the expanded portion 2b, the upper opening 2e has a larger opening area than the lower opening 2f. This makes it easy to insert the battery 10 (see FIG. 1) into the housing space S1. In other words, upper portions of the inner wall surfaces of the expanded portion 2b face the side outer peripheral surfaces of the battery 10 with clearance in between and serve as a guide when the battery 10 is inserted into the square tube portion 2a.

The upper opening 2e is an in-and-out opening through which the battery 10 is inserted into the battery housing body 2 and removed from the battery housing body 2. In the present embodiment, the flange portion 2c is formed around the marginal edge of the upper opening 2e (the upper edge of the expanded portion 2b) to increase the strength of the opening 2e.

Figure 5A:
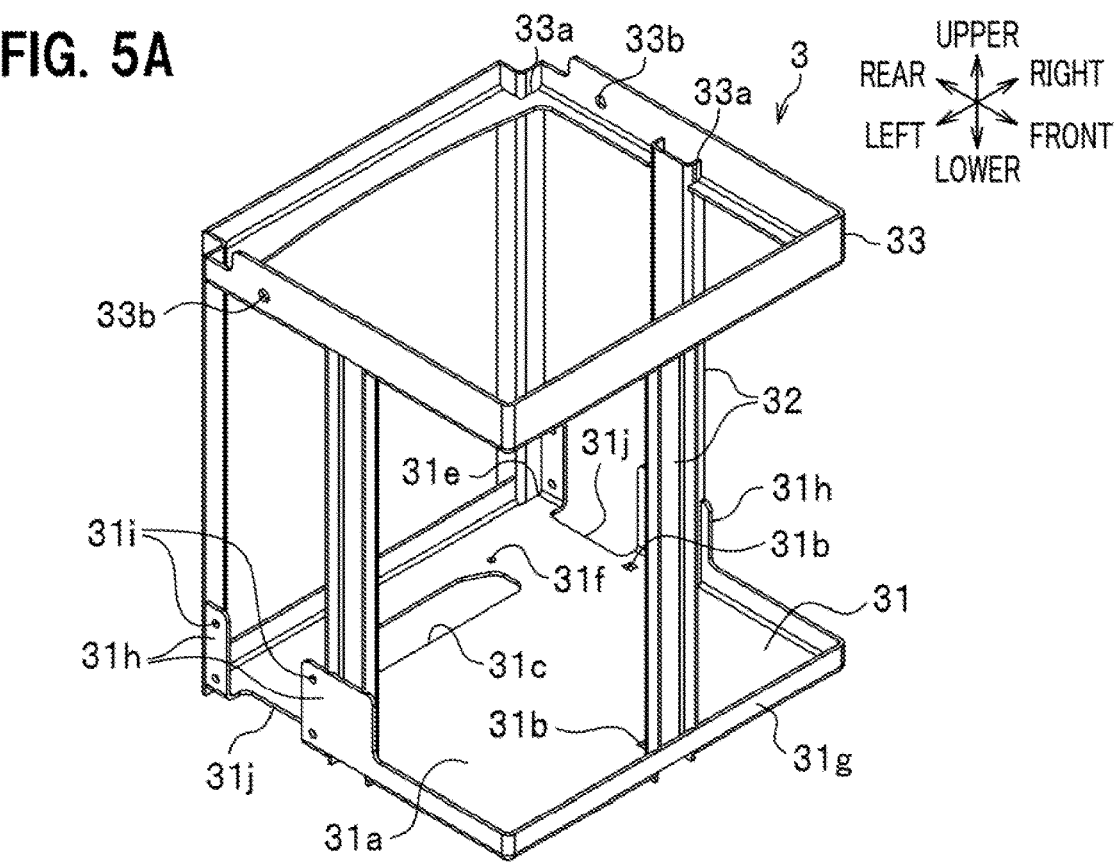
FIG. 5A is a perspective view of a battery holding body.

As shown in FIG. 4 or 5A, the lock tabs 2d are formed at the lower edge portion (the lower opening 2f) of the square tube portion 2a. The lock tabs 2d are each formed at a center portion of a corresponding one of the sides of the lower edge portion of the square tube portion 2a which is quadrangular in shape. The lock tabs 2d engage with the lock holes 31b formed in the battery stand 31 of the battery holding body 3. The lower opening 2f is closed by the battery stand 31. In other words, the battery stand 31 forms the bottom surface of the battery housing body 2.

<<Battery Holding Body>>

As shown in FIG. 1, the battery holding body 3 is a member for placing the battery 10. The battery holding body 3 includes the battery stand 31 on which to place the battery 10, the plurality of vertical frames 32 provided upright at the outer peripheral portion of the battery stand 31, and the upper frame 33 fixed to the upper end portions of the plurality of the vertical frames 32. Base end portions of the operating part 41 are turnably pivotally supported by the upper portion (the upper frame 33) of the battery holding body 3.

<Battery Stand>

Figure 5B:
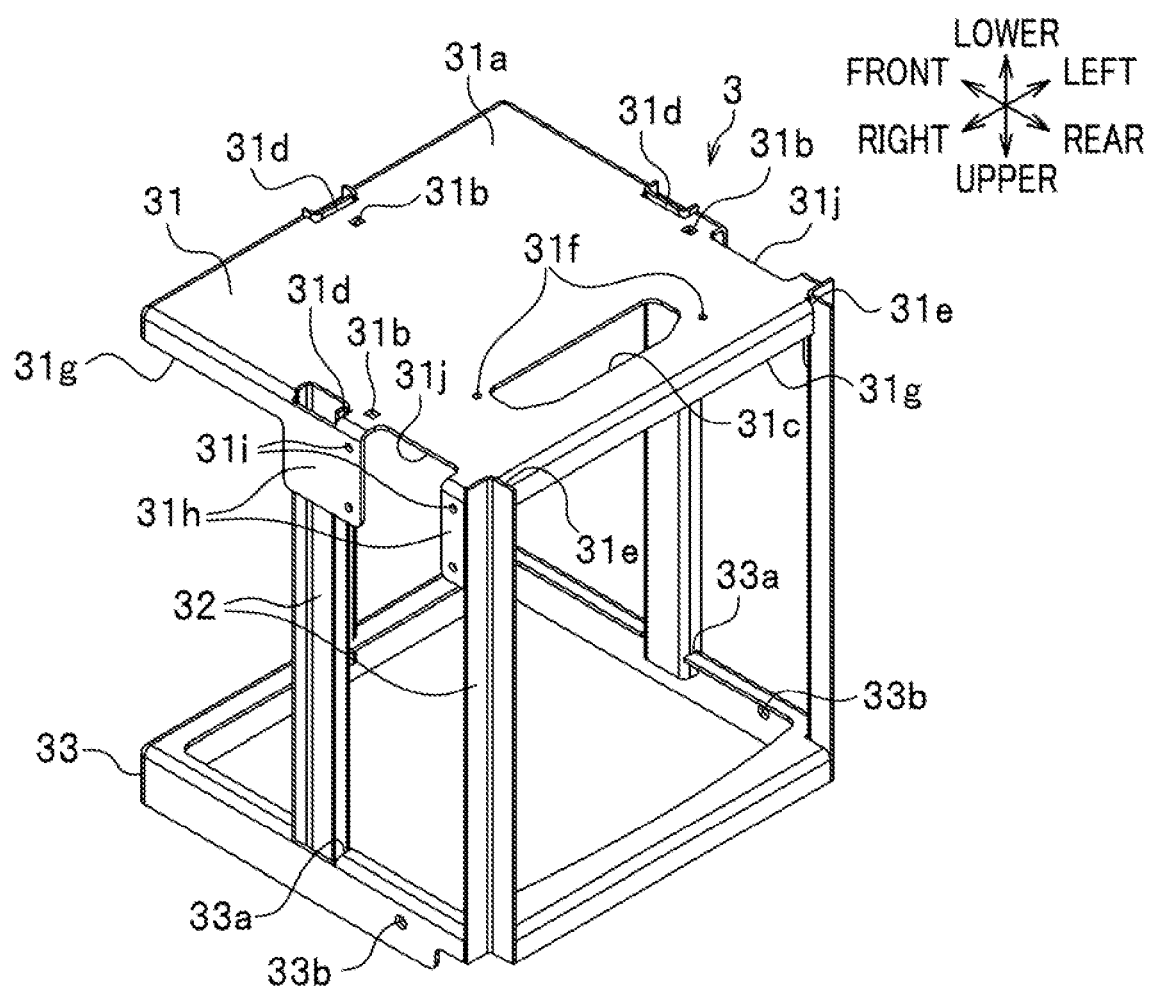
FIG. 5B is a perspective view of the battery holding body shown upside down.

As shown in FIGS. 5A and 5B, the battery stand 31 has a lower surface 31a, the lock holes 31b, the battery-side connector engagement hole 31c, vertical frame engagement portions 31d, 31e, guide member fixation holes 31f, a rim portion 31g, protrusion pieces 31h, a driving-part holding part fixation holes 31i, and notch grooves 31j. The battery stand 31 is formed by bending a metal plate member.

The lower surface 31a is a quadrangular flat surface on which the lower end portion of the battery housing body 2 is placed. The lower surface 31a, the rim portion 31g, and the protrusion pieces 31h are integrally formed of a metal plate member.

The lock holes 31b are through-holes in which the lock tabs 2d at the lower end of the battery housing body 2 (see FIG. 4) are locked. For example, the lock holes 31b are formed at three locations on the outer peripheral portion of the lower surface 31a: a center portion of the front side, a center portion of the left side, and a center portion of the right side.

The battery-side connector engagement hole 31c is a through-hole that coincides with the coupler engagement hole 12c of the battery-side connector 12 (see FIG. 3B). The battery-side connector engagement hole 31c is formed of a through-hole being disposed to face the coupler engagement hole 12c and having the same shape as the coupler engagement hole 12c. The battery-side connector engagement hole 31c is formed in an elongated circular shape that is long in the left-right direction, extending along the front and rear side surfaces of the battery stand 31.

As shown in FIG. 2, a base plate portion 47a of a guide member 47 is screwed to the lower side of the rim of the battery-side connector engagement hole 31c. The guide member 47 has a case-side connector insertion hole 47d that coincides with the battery-side connector engagement hole 31c. When the battery is in, the female terminals 12a, the guide pin engagement portions 12b, and the coupler engagement hole 12c are disposed in the battery-side connector engagement hole 31c. When the operating part 41 is operated in an upright direction (the direction indicated by arrow b) or in a sloping direction (the direction indicated by arrow a), the connector terminals 49a, the guide pins 49e, and the coupler 49g are inserted into or removed from the female terminals 12a, the guide pin engagement portions 12b, and the coupler engagement hole 12c.

The vertical frame engagement portions 31d, 31e shown in FIG. 5B are through-holes or notch grooves with which the lower end portions of the vertical frames 32 engage.

The guide member fixation holes 31f are screw holes into which to fasten screw members (not shown) for fixating the guide member 47 (see FIG. 7). The guide member fixation holes 31f are disposed near the left and right sides of the battery-side connector engagement hole 31c.

The rim portion 31g is an reinforcement portion formed by bending the outer peripheral portion of the lower surface 31a upward.

The protrusion pieces 31h are parts for supporting the lower end portions of the vertical frames 32. The protrusion pieces 31h are formed protruding upward beyond the rim portion 31g.

The notch grooves 31j are grooves in which lower end portions of link plates 42 and upper end portions of the driving part 43 are disposed in such a manner as to be movable up and down. The notch grooves 31j are formed at rearward positions on the left and right end portions of the battery stand 31.

<Vertical Frames>

As shown in FIGS. 5A and 5B, the vertical frames 32 are frame members serving as columns linking the battery stand 31 and the upper frame 33 together, and are disposed in such a manner as to surround the battery housing body 2 (see FIG. 4). The vertical frames 32 extend perpendicularly from the outer peripheral portion of the battery stand 31 and are joined to the frame-shaped upper frame 33. The vertical frames 32 are disposed at the following portions of each of the battery stand 31 and the upper frame 33: a center portion of the front side, a center portion of the left side, a center portion of the right side, a left end portion of the rear side, and a right end portion of the rear side. The vertical frames 32 disposed at the front-side center portion, the left-side center portion, and the right-side center portion of the battery stand 31 and the upper frame 33 are formed of a metal member in the shape of channel steel. The vertical frames 32 disposed at the rear-side left end portion and the rear-side right end portion of the battery stand 31 and the upper frame 33 are formed of a metal member in the shape of equal angle steel.

<Upper Frame>

As shown in FIG. 1, the upper frame 33 is a quadrangular frame-shaped member for supporting the upper end portions of the respective vertical frames 32 and the left and right end portions of the operating part 41. The upper frame 33 is disposed horizontally, facing the rim portion 31g of the battery stand 31. As shown in FIGS. 5A and 5B, the upper frame 33 is formed in the shape of the letter L in a longitudinal section view. The upper frame 33 has notch portions 33a with which the upper end portions of the vertical frames 32 engage and driving-part pivotal support holes 33b in which the turn shafts 41d are fixed (see FIG. 1), the turn shafts 41d pivotally supporting the operating part 41 so that the operating part 41 can turn.

The notch portions 33a are notch grooves with which the upper end portions of the vertical frames 32 engage. The notch portions 33a are formed at the following portions of the upper frame 33: a center portion of the front side, a center portion of the left side, a center portion of the right side, a left end portion of the rear side, and a right end portion of the rear side.

The driving-part pivotal support holes 33b are formed at rearward positions on the left and right sides of the upper frame 33.

<<Operation Mechanism>>

As shown in FIG. 2, an operation mechanism 4 is an operation apparatus for connecting or disconnecting the connector 49 to or from the battery-side connector 12 when the operating part 41 is operated to raise or lower the connector 49. The operation mechanism 4 is configured including the operating part 41, the link plates 42, the driving part 43, driving-part holding parts 44, damper holding members 45, collars 46, the guide member 47, the dampers 48, and the connector 49.

<Operating Part>

As shown in FIGS. 1 and 2, the operating part 41 is operation means used to perform an operation for raising or lowering the driving part 43 and the connector 49. Note that there are no particular limitations as to the structure, material, type, or the like of the operating part 41 as long as the operating part 41 can change the position of the driving part 43 upward and downward.

As an example of the operating part 41, the following description uses an example where the operating part 41 is formed of a turning lever.

Figure 6:
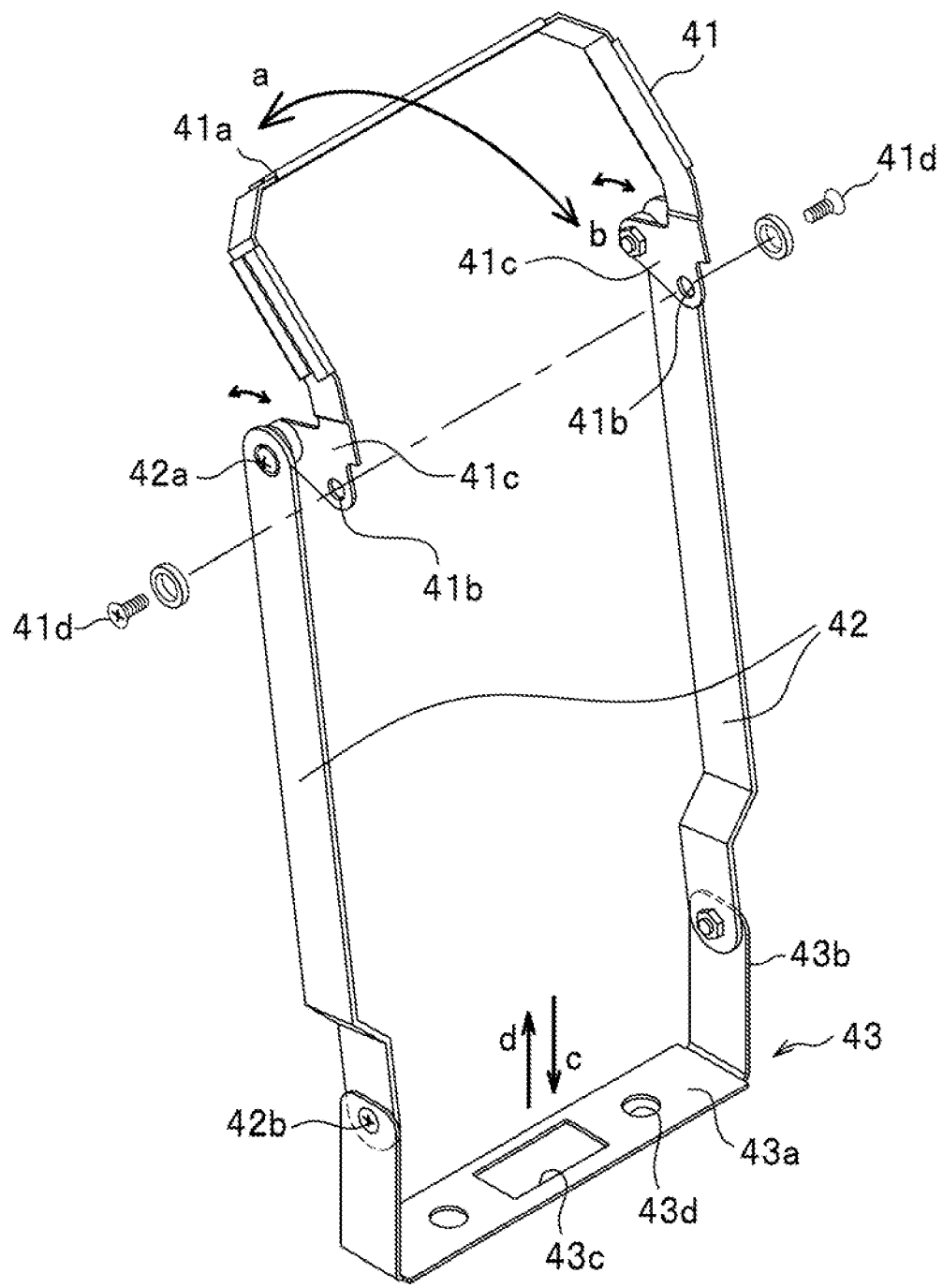
FIG. 6 is a perspective view showing how an operating part, link plates, and a driving part are linked together.

As shown in FIG. 1 or 6, the operating part 41 is a lever having a substantially inverted concave shape (a substantially inverted letter-U shape) disposed to straddle the battery housing body 2. The operating part 41 has a handle 41a, shaft holes 41b formed in both ends of the handle 41a, link portions 41c extending from the vicinities of the shaft holes 41b toward holes for installing linking members 42a, and the turn shafts 41d inserted into the driving-part pivotal support holes 33b of the frame 33 through the shaft holes 41b. The operating part 41 is disposed such that when operated to turn frontward and rearward about the turn shafts 41d, the operating part 41 can change the position of the driving part 43, via the link plates 42, between a close position at which the driving part 43 is close to the battery stand 31 and an away position at which the driving part 43 is away from the battery stand 31.

<Link Plates>

As shown in FIG. 6, the link plates 42 are members for linking the operating part 41 and the driving part 43 together. The linking members 42a are pivotally inserted into the upper end portions of the link plates 42 to link the lower end portions of the operating part 41 turnably. Linking members 42b are pivotally inserted into the lower end portions of the link plates 42 to link the upper end portions of the driving part 43 turnably.

<Driving Part>

As shown in FIG. 2 or 6, the driving part 43 is a member for raising and lowering the connector 49, and moves up and down in conjunction with the operating part 41 being operated and turned frontward and rearward (the directions indicated by arrows b, a).

When the operating part 41 is operated to incline rearward (the direction of arrow a), the driving part 43 moves to the away position away from the battery stand 31, and when the operating part 41 is operated to turn frontward (the direction of arrow b), the driving part 43 moves to the close position close to the battery stand 31.

The driving part 43 is formed of a metal frame member in a substantially concave shape (a substantially letter-U shape) in a front view. The driving part 43 is formed mainly of a connector support plate portion 43a parallel to the lower surface 31a of the battery stand 31 and operating force receiving portions 43b perpendicularly extending upward from the left and right ends of the connector support plate portion 43a.

As shown in FIG. 7, the connector support plate portion 43a is a horizontal flat plate portion for placing the connector 49 thereon. An electric-wire-connecting-portion placement hole 43c and collar installation holes 43d are formed in the connector support plate portion 43a. An electric wire connecting portion 49h is inserted into the electric-wire-connecting-portion placement hole 43c in such a manner as to be movable up and down, and the damper holding members 45 are inserted into the collar installation holes 43d in such a manner as to be movable up and down. As shown in FIG. 2, the connector support plate portion 43a is formed such that its width W1 in the front-rear direction is wider than a width W3 of the driving-part holding parts 44 in the front-rear direction.

As shown in FIGS. 1 and 2, the operating force receiving portions 43b are linking portions to which the lower end portions of the link plates 42 are turnably linked by the linking members 42b. The operating force receiving portions 43b are disposed in such a manner as to be movable upward and downward inside the notch grooves 31j of the battery stand 31 and outward of the lower portions of the left and right side surfaces of the battery housing body 2.

<Driving-Part Holding Parts>

Figure 10A:
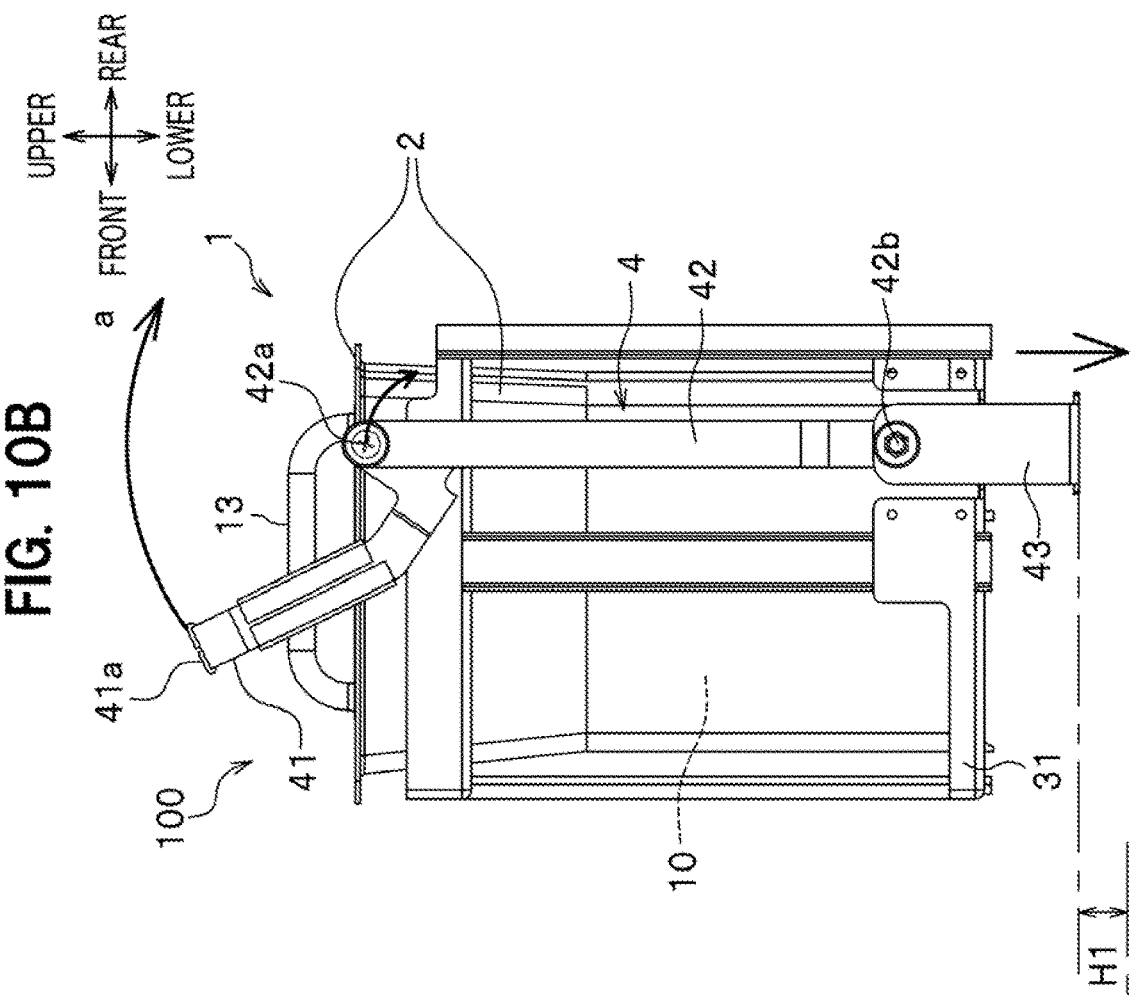
FIG. 10A is a side view showing how an operation mechanism is when the operating part is operated to a release position (rearward)
Figure 10B:
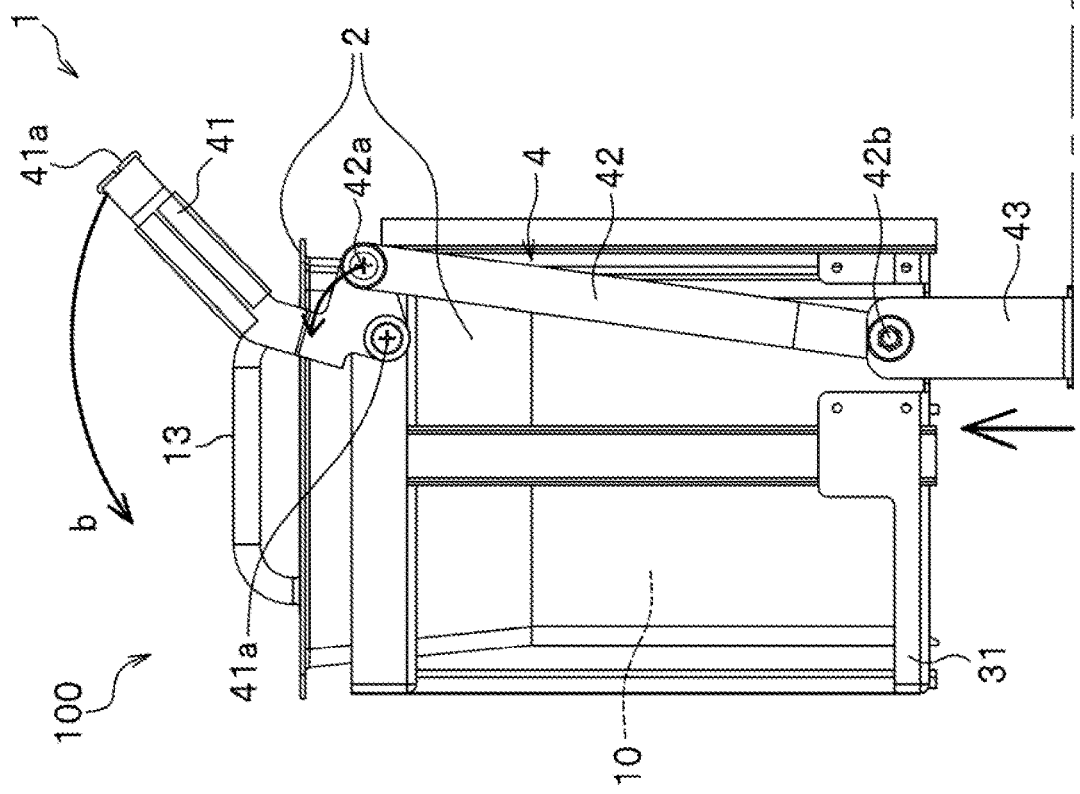
FIG. 10B is a side view showing how the operation mechanism is when the operating part is operated to a fixed position (frontward).

As shown in FIG. 2, the driving-part holding parts 44 are members for restricting the range in which the driving part 43 move up and down (a height H1 shown in FIGS. 10A and 10B). The driving-part holding parts 44 are formed of a pair of left and right metal plate members and each have a guide portion 44a, notch portions 44b, a bottom plate portion 44c, and fixation protruding pieces 44d. Note that the driving-part holding parts 44 are omittable.

Figure 8A:
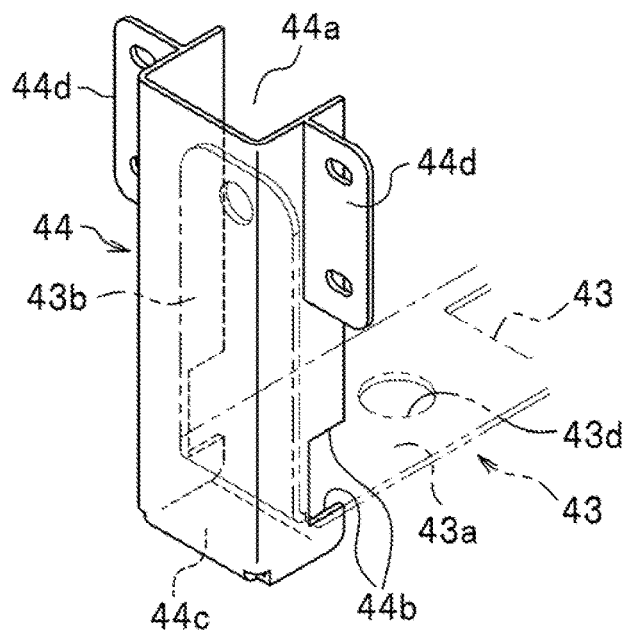
FIG. 8A is a primary-part perspective view showing how driving-part holding parts are installed.
Figure 8B:
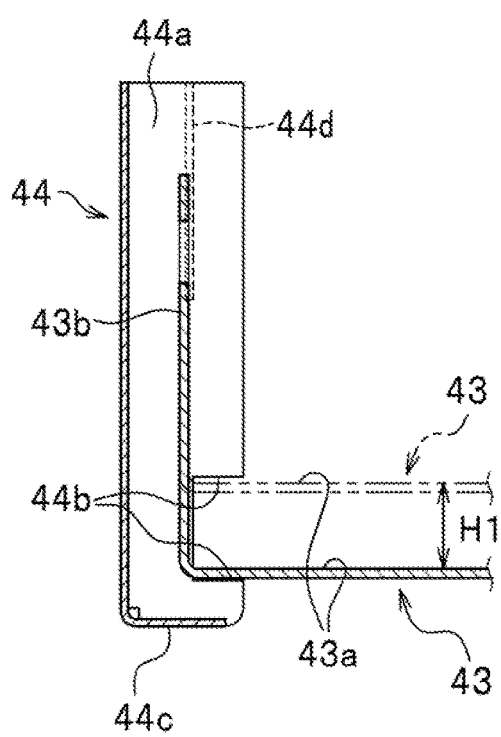
FIG. 8B is a primary-part longitudinal sectional view showing how the driving part and the driving-part holding parts are installed.

As shown in FIGS. 2, 8A, and 8B, the guide portion 44a is a part for restricting the up-down movement range of the corresponding operating force receiving portion 43b of the driving part 43. The guide portion 44a is formed in an angular letter-U shape (a substantially letter-U shape) in a plan view. As shown in FIG. 2, the guide portion 44a is formed such that the width W3 of the inner wall of the guide portion 44a in the front-rear direction is larger than a width W2 of the operating force receiving portions 43b in the front-rear direction and smaller than the width W1 of the connector support plate portion 43a in the front-rear direction. Thus, the operating force receiving portion 43b engaging inside the guide portion 44a is engaged in such a manner as to be movable up and down between the upper side and the lower side of the guide portion 44a. In this way, the driving part 43 is restricted in its range of positional change by up-down movement.

Note that the driving part 43 moves together with the operating part 41 and the link plates 42 of the operation mechanism 4. For this reason, the range of positional change of the driving part 43 by up-down movement may be defined by restriction of the operation of the operating part 41 or the link plates 42.

The notch portions 44b are parts for restricting the up-down movement range of the driving part 43. As shown in FIGS. 8A and 8B, the guide portion 44a is notched at its lower front portion and lower rear portion, forming the notch portions 44b in an angular letter-U shape. The left and right end portions of the connector support plate portion 43a are disposed in the left notch portions 44b and the right notch portions 44b, respectively, and since the width W3 of the inner wall of the guide portion 44a in the front-rear direction is, as described earlier, smaller than the width W1 of the connector support plate portion 43a in the front-rear direction, the left and right end portions of the connector support plate portion 43a abut against the upper and lower edges of the notch portions 44b by the up and down movement, allowing the up and down movement to be within the up-down positional change range (the height H1) (see FIG. 2).

As shown in FIG. 2, the bottom plate portion 44c is a part for reinforcing the guide portion 44a. The bottom plate portion 44c is formed to form a quadrangular bottom plate surface at the lower end portion of the guide portion 44a.

The fixation protruding pieces 44d are bracket portions for screwing the driving-part holding part 44 to the protrusion pieces 31h of the battery stand 31. The fixation protruding pieces 44d are formed of rectangular pieces formed at the front portion and rear portion of the guide portion 44a, protruding therefrom. The fixation protruding pieces 44d each have a plurality of screw insertion holes formed therein.

<Damper Holding Members>

As shown in FIG. 7 or 9, the damper holding members 45 are members for holding the dampers 48 and are disposed at the left and right end portions of the connector 49. The damper holding members 45 are each configured having a bottomed tubular portion 45a, a flange portion 45b formed at the rim of the upper opening of the tubular portion 45a, a bottom portion 45c of the tubular portion 45a, and an adjustment screw 5 provided at the bottom portion 45c.

Into the tubular portion 45a, a guide portion 47b and the damper 48 are inserted with play. The guide portion 47b is movable up and down relative to the tubular portion 45a and the damper 48.

The flange portion 45b is a part for locking the damper holding member 45 against an upper surface 49i of a terminal holding portion 49c. The flange portion 45b is placed on the opening rim of a hole 49d formed in a corresponding one of the left and right portions of the terminal holding portion 49c.

The adjustment screw 5 is a member for adjusting the position of the damper 48 in the up-down direction. The adjustment screw 5 is formed of a screw member, such as a hexagon socket set screw, that is screwed into a female screw portion (not shown) formed in an inner bottom of the damper holding member 45 and moves up and down when turned.

<Elastic Members>

As shown in FIGS. 7 and 9, the elastic members SP are members used for the driving part 43 to elastically support the connector 49. The elastic members SP are members that, in response to positional change of the driving part 43, store energy for generating a restoring force in the direction of the positional change, the restoring force being proportional to the positional change. The elastic members SP are each formed of, for example, a coil spring. The elastic member SP is fitted around the outer peripheral portion of the tubular portion 45a of the damper holding member 45 in such a manner as to be movable up and down between the lower surface of the terminal holding portion 49c and a flange portion 46b of the collar 46.

Note that the elastic members SP do not have to be coil springs as long as they are elastic, and may be leaf springs, rubber, or the like.

<Collars>

As shown in FIG. 7 or 9, the collars 46 are members for holding the tubular portions 45a of the damper holding members 45. The collars 46 are a pair of left and right flanged circular tube bodies each having the flange portion 46b locked against a corresponding one of the pair of left and right collar installation holes 43d and a circular tube portion 46a inserted into the corresponding collar installation hole 43d of the driving part 43.

<Guide Member>

As shown in FIG. 7, the guide member 47 is a member for guiding rising and lowering of the connector 49. The guide member 47 has the base plate portion 47a, the guide portions 47b, stand fixation holes 47c, the case-side connector insertion hole 47d, guide portion installation holes 47e, and notch grooves 47f.

Note that the outer peripheral shape of the guide member 47 is not limited to a particular shape as long as it serves a function to guide lifting and lowering of the connector 49.

As shown in FIG. 2, the base plate portion 47a is fixed to the lower surface of the outer peripheral portion of the battery-side connector engagement hole 31c of the battery stand 31. The base plate portion 47a is formed of a rectangular flat plate which is long in the left-right direction along the battery-side connector engagement hole 31c.

As shown in FIG. 7 or 9, the guide portions 47b protrude downward from the lower surfaces of the left and right portions of the base plate portion 47a. The left and right guide portions 47b extend from the lower surface 31a of the battery stand 31, parallel to the positional change direction of the connector 49. The guide portions 47b are formed of hollow members (tubular members in the present embodiment). Piston rods 48d of the dampers 48 are inserted into the guide portions 47b. The guide portions 47b are inserted into the tubular portions 45a of the damper holding members 45 in such a manner as to be movable up and down. The outer peripheral shape of the guide portions 47b is similar to but smaller than the inner peripheral shape of the damper holding members 45, and the inner peripheral shape of the guide portions 47b is larger than the outer peripheral shape of the dampers 48. When the driving part 43 is at the away position, at least part of the total length of each guide portion 47b is housed in the corresponding damper holding member 45.

The guide portion installation holes 47e are formed of circular through-holes into which the guide portions 47b are inserted and attached. The guide portion installation holes 47e are formed in left and right end portions of the base plate portion 47a.

The notch grooves 47f are provided to, at the time of manufacturing the guide member 47, weld the guide portions 47b inserted and fitted into the guide portion installation holes 47e to the base plate portion 47a. The notch grooves 47f are formed to cut through the base plate portion 47a, with one of them extending from a leftward edge of the left guide portion installation hole 47e to a left end portion of the base plate portion 47a and the other one extending from a rightward edge of the right guide portion installation hole 47e to a right end portion of the base plate portion 47a. Providing the notch grooves 47f makes it possible to reduce the size of a portion to weld when welding the guide portions 47b fitted into the guide portion installation holes 47e and thus makes it easier to achieve the perpendicularity between the base plate portion 47a and the guide portions 47b. Also, the welding takes place at locations where spatter is less likely to be created inside the guide portions 47b, and thus, man-hours required for spatter removal can be reduced.

Screw members (not shown) are inserted into the stand fixation holes 47c to fix the base plate portion 47a to the battery stand 31 (see FIG. 2). The stand fixation holes 47c are formed at left and right end portions of the base plate portion. The guide member 47 is screwed into the lower surface 31*a* of the battery stand 31 as a single removable component. This, when compared to a mode where the guide portions 47*b* are directly welded to the battery stand 31, allows the guide member 47 to have better dimensional accuracy for its left and right guide portions 47*b* and to be replaced easily when the guide portions 47*b* are worn down.

As shown in FIG. 9, the case-side connector insertion hole 47*d* is a through-hole into which the connector terminals 49*a*, the guide pins 49*e*, and the coupler 49*g* are inserted. As shown in FIG. 2, the case-side connector insertion hole 47*d* is disposed below and coincides with the battery-side connector engagement hole 31*c* having the same shape.

<Connector>

As shown in FIG. 2, the connector 49 is connected to the female terminals 12*a* of the battery 10. As shown in FIG. 7, the connector 49 includes the connector terminals 49*a*, terminal support portions 49*b*, the terminal holding portion 49*c*, the holes 49*d*, the guide pins 49*e*, guide pin holding portions 49*f*, the coupler 49*g*, and the electric wire connecting portion 49*h*.

Note that the shape, structure, and the like of the connector 49 may be changed as needed.

The connector terminals 49*a* are formed by a plurality of male terminals. The upper portions of the connector terminals 49*a* protrude upward from the terminal holding portion 49*c*, with the lower ends of the connector terminals 49*a* being disposed inside the electric wire connecting portion 49*h*.

The terminal support portions 49*b* are protrusions formed at the base end portions of the respective connector terminals 49*a* to support the base end portions of the connector terminals 49*a*. The terminal support portions 49*b* are formed at suitable intervals, protruding from the upper surface of the terminal holding portion 49*c*.

As shown in FIG. 7, the terminal holding portion 49*c* is a flat plate portion made of resin and shaped like a base plate into which the connector terminals 49*a* have been insert-molded. The terminal holding portion 49*c* is elastically supported on the driving part 43 with the elastic members SP and the collars 46 interposed therebetween.

The holes 49*d* are through-holes into which the tubular portions 45*a* of the damper holding members 45 are inserted. The holes 49*d* are formed in left and right end portions of the terminal holding portion 49*c*. The dampers 48 are inserted into the damper holding members 45 inserted in the holes 49*d*. The damper holding members 45 are inserted into the elastic members SP and the collars 46. Thus, the connector 49 is elastically supported on the driving part 43 by the elastic members SP and are also movable up and down along the guide portions 47*b*.

The guide pins 49*e* are members for guiding the movement of the connector terminals 49*a*. The guide pins 49*e* are formed of rod-shaped members protruding upward from positions near the respective left and right end portions of the terminal holding portion 49*c*. The guide pins 49*e* are disposed in such a manner as to be inserted into the guide pin engagement portions 12*b* of the battery 10 when the connector 49 rises. Thus, the connector 49 forms a male connector.

The guide pin holding portions 49*f* are protrusions formed at the base end portions of the respective guide pins 49*e* to support the base end portions of the respective guide pins 49*e*. The guide pin holding portions 49*f* are formed at a suitable interval, protruding from the upper surface of the terminal holding portion 49*c*.

The coupler 49*g* is a protrusion for guiding the movement of the connector terminals 49*a*, and engages into the coupler engagement hole 12*c* when the connector 49 rises. The coupler 49*g* is formed of a plate-shaped member protruding upward from the terminal holding portion 49*c* in such a manner as to surround the rear side of the connector terminals 49*a* with suitable clearance in between. Note that the guide pins 49*e* and the coupler 49*g* are omittable.

The electric wire connecting portion 49*h* is a connection portion for electrically connecting the connector terminals 49*a* connected to the female terminals 12*a* of the battery 10 to the LED floodlight (not shown). An electric wire or the like (not shown) extends from the electric wire connecting portion 49*h* so as to be connected to a lead wire from the LED floodlight (not shown).

<Dampers>

As shown in FIG. 2, 7, or 9, the dampers 48 are members supported by the connector 49. The dampers 48 have a function to reduce the rising speed at which the connector 49 is raised by the operation of the operating part 41 (the insertion speed at which the connector terminals 49*a* are inserted into the female terminals 12*a*).

The dampers 48 are each configured including a cylinder 48*c*, a piston (not shown), the piston rod 48*d*, oil (not shown), and a spring (not shown). Although an example where two dampers 48 are disposed at the left and right of the connector 49 is shown in FIG. 7, there only needs to be at least one damper 48.

Also, there are no particular limitations as to the structure and the like of the damper 48 as long as it biases the connector 49 downward. In the following description, a SoftAbsorber (product name), which is a hydraulic damper, is used as an example of the damper 48.

Figure 11A:
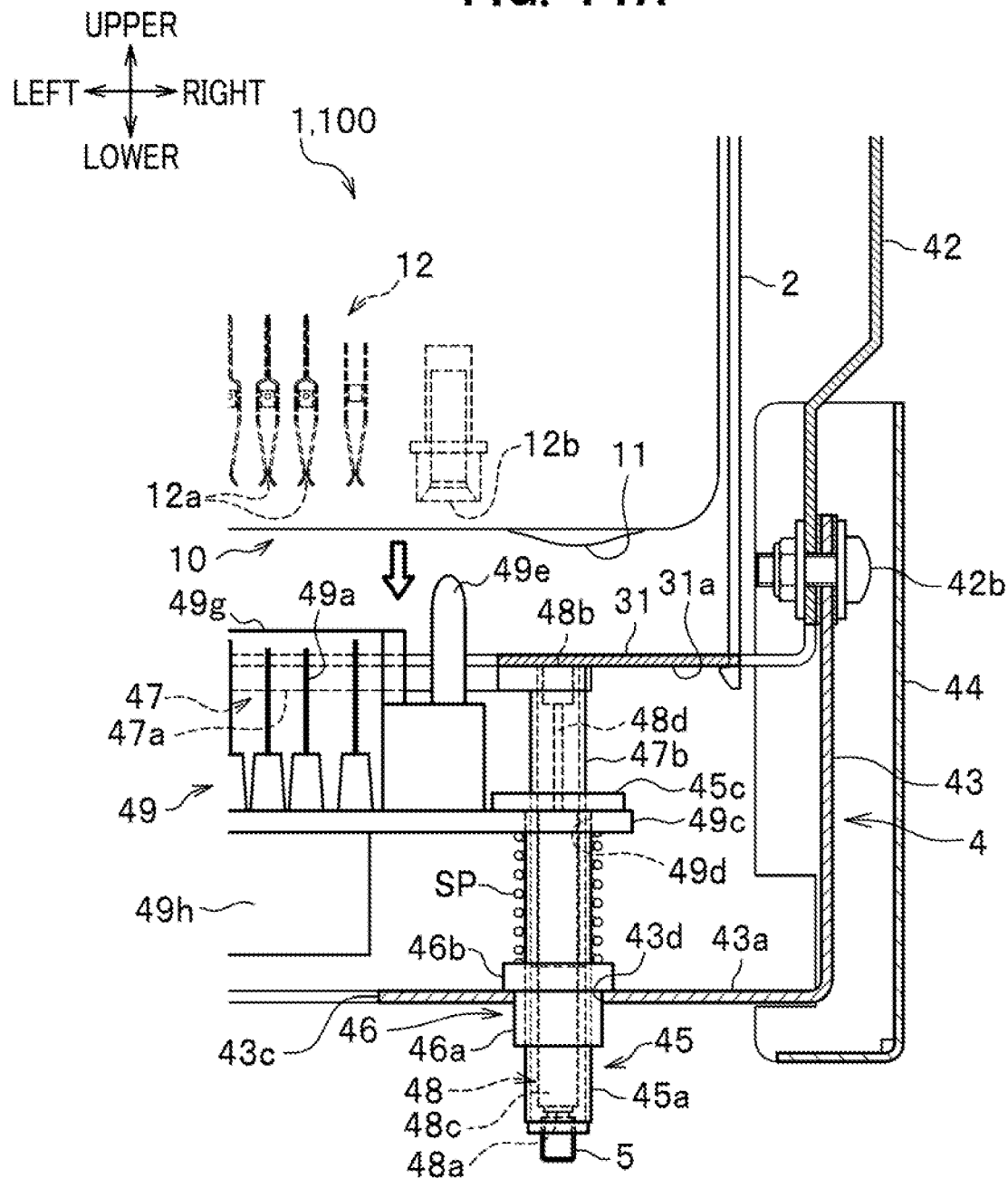
FIG. 11A is a primary-part enlarged front view showing, partially in section, how the connector is when the battery is put into the battery housing body.

As shown in FIG. 7 or 11A, the damper 48 is inserted into the damper holding member 45. An abutment surface 48*a*, which is at the lower end of the damper 48, abuts against an upper end portion 5*a* of the adjustment screw 5.

As shown in FIG. 11A, a solid-cylinder-shaped member is provided at the upper end portion of the damper 48 (the upper end portion of the piston rod 48*d*). An abutment surface 48*b* at the upper end of the damper 48 abuts against the lower surface 31*a* of the battery stand 31.

As shown in FIGS. 7 and 11A, the cylinder 48*c* is a bottomed circular-tubular outer tube member in which the piston, the oil, and the spring (none of them is shown) are housed. The cylinder 48*c* is inserted into the tubular portion 45*a* of the damper holding member 45. The lower surface of the cylinder 48*c* abuts against the upper end portion 5*a* of the adjustment screw 5.

The piston (not shown) is a solid-cylindrical member housed in the cylinder 48*c* in such a manner as to be able to rise and lower. The piston (not shown) is disposed in such a manner as to, for example, divide the inside of the cylinder 48*c* into a compression-side pressure chamber and a tension-side pressure chamber. The piston (not shown) is provided with a pressure regulation valve (not shown) for the oil (not shown) to flow between the compression-side pressure chamber and the tension-side pressure chamber. Note that the pressure regulation valve (not shown) may be an interspace provided between the outer peripheral surface of the piston (not shown) and the inner wall of the cylinder 48*c* or a small through-hole provided to the piston (not shown).

The piston rod 48*d* is a rod-shaped member that moves up and down relative to the cylinder 48*c*. The lower end portion of the piston rod 48*d* is linked to the piston (not shown).

The oil (not shown) is a viscous fluid sealed inside the cylinder 48*c*. The damper 48 is structured such that the linear motion of the piston and the piston rod 48*d* is reduced in speed by utilizing viscosity resistance generated when the oil (not shown) passes through the regulation value or through a hole with a small flow-channel area.

The spring (not shown) is a member having a spring force for giving a restoring force to the piston (the piston rod 48*d*) provided inside the cylinder 48*c*. The spring (not shown) is formed of a compression coil spring interposed between the inner bottom of the cylinder 48*c* and the piston (not shown). Thus, the damper 48 generates a resistance force by combination of a resistance force generated when the piston (not shown) changes its position in the oil and a restoring force of the spring (not shown) that is extended and compressed in accordance with the positional change of the piston rod 48*d*.

Note that it is not essential that the damper 48 itself have a function to generate a restoring force. For example, the damper 48 that generates only a resistance force due to viscosity resistance in the direction of the piston's positional change may be used, and in place of the spring in the damper 48, an elastic member such as a spring may be provided between the damper holding member 45 (a damper abutment member) and the battery stand 31. A pulling force for pulling the connector terminals 49*a* from the female terminals 12*a* of the battery-side connector 12 can be generated in this case as well. Also, the damper 48 that generates only a resistance force due to viscosity resistance in the direction of the piston's position change may be used, and the upper and lower ends of the elastic member SP may be fixed to portions where they abut against the connector support plate portion 43*a* of the driving part 43 and against the terminal holding portion 49*c* of the connector 49. In this case, as shown in FIG. 11E, when the driving part 43 is down, the elastic member SP is extended to and beyond its natural length, which allows generation of a pulling force for pulling the connector terminals 49*a* from the female terminals 12*a* of the battery-side connector 12. Also, irrespective of whether an elastic member is provided inside or outside of the damper, the elastic member does not necessarily have to be one that generates a pulling force that is enough to pull the connector terminals 49*a* from the female terminals 12*a* of the battery-side connector 12. In this case, the connector terminals 49*a* are removed from the female terminals 12*a* of the battery-side connector 12 when a user pulls the battery 10 up.

<<Operation of the Connector Driving Structure and the Power Source Apparatus Having the Same>>

Next, with reference to FIGS. 1 to 11F, a description is given of the operation of the connector driving structure 1 and the power source apparatus 100 having the same according to the embodiment of the present invention.

In a case where the power source apparatus 100 shown in FIG. 10B is used to supply a current from the battery 10 to the LED floodlight (not shown), first, the operating part 41 is operated rearward (the direction of arrow a) to a release position state. Then, as shown in FIG. 10A, the handle 41*a* turns to be located away from a position immediately above the battery 10 to a position above and rearward of the battery 10. The driving part 43 is in conjunction with the operating part 41 and is therefore lowered by the height H1. The connector 49, as shown in FIG. 11A, lowers in conjunction with the driving part 43 lowering, and the connector terminals 49*a* move away from the female terminals 12*a* of the battery-side connector 12.

Next, the grip 13 of the battery 10 in the release position state in FIG. 10A is grabbed to pull up the battery 10 out of the battery housing body 2. The battery 10 thus pulled up is charged using a suitable charger.

After the battery 10 is charged completely, as shown in FIG. 11A, the battery 10 is slowly inserted into the battery housing body 2. Note that before the battery 10 is inserted, the operating part 41 is brought to the release position state shown in FIG. 10A.

After the battery 10 is inserted, as shown in FIG. 11B, the leg portions 11 abut against the battery stand 31 and are placed on the battery stand 31. Then, the upper end portions of the guide pins 49*e* engage with the guide pin engagement portions 12*b*. The operating part 41 (see FIG. 10A) is in the release position state here. Thus, the connector support plate portion 43*a* of the driving part 43 of the operation mechanism 4 is down, abutting against the lower sides of the notch portions 44*b*.

Next, the operating part 41 in the release position in FIG. 10A is operated frontward (the direction of arrow b) to a fixed position state shown in FIG. 10B. Then, the driving part 43 rises as shown in FIG. 11C in conjunction with the operating part 41 and the link plates 42. Note that the connector support plate portion 43*a* of the driving part 43 in abutment with the lower sides of the notch portions 44*b* now abuts against the upper sides of the notch portions 44*b*. Due to the rise of the driving part 43, the elastic members SP are compressed between the collars 46 and the terminal holding portion 49*c*, and after that, the terminal holding portion 49*c* is raised by the spring force (restoring force) of the elastic members SP.

The terminal holding portion 49*c* thus raised raises the damper holding members 45, the dampers 48, and the guide pins 49*e*. The dampers 48 slowdown the rising movement of the connector 49 because the rising damper holding members 45 push the cylinders 48*c* up, lowering the pistons (not shown). Thus, a distance e by which the connector 49 rises is smaller than a distance f by which the link plates 42 and the driving part 43 of the operation mechanism 4 rise. Also, the raised terminal holding portion 49*c* enters the coupler engagement hole 12*c*. The connector terminals 49*a* rise to positions near the female terminals 12*a* of the battery-side connector 12.

Figure 11D:
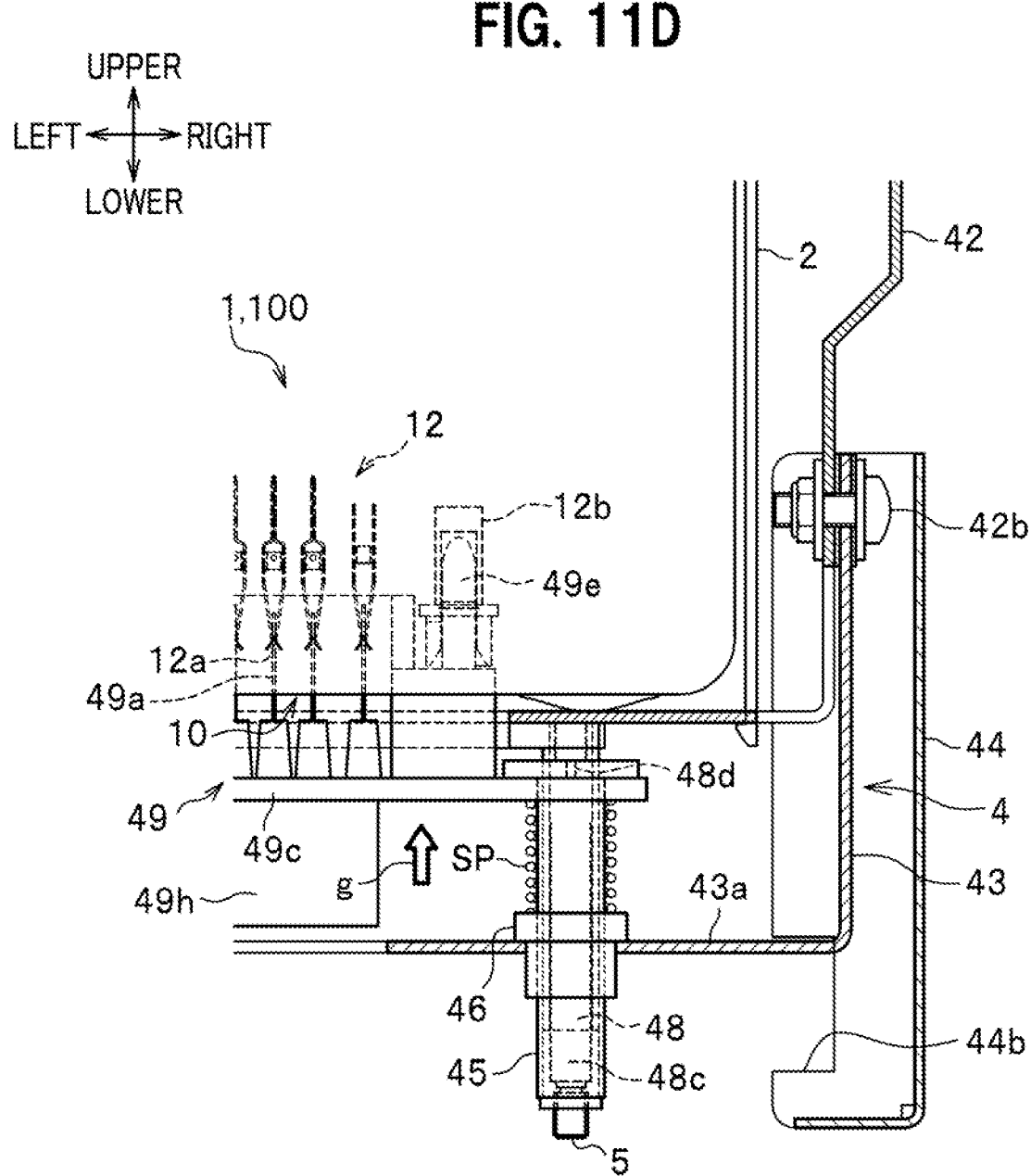
FIG. 11D is a primary-part enlarged front view showing, partially in section, how the connector is immediately after the operating part is operated to the fixed position.

As shown in FIG. 11D, the elastic members SP compressed by the rise of the driving part 43 raise the connector 49 by a distance g due to their restoring force while compressing the dampers 48. Then, the connector terminals 49*a* are inserted into the female terminals 12*a* of the battery-side connector 12. Consequently, the female terminals 12*a* and the connector terminals 49*a* are connected to each other, allowing the battery 10 to supply power to the LED floodlight (not shown).

Note that the force that raises the connector 49 here is (the restoring force exerted by the two elastic members SP)—(the resistance force exerted by the two dampers 48). Thus, in the connector driving structure 1 (the power source apparatus 100), the impact force exerted when the connector terminals 49*a* are connected to the female terminals 12*a* by the restoring force of the elastic members SP is lessened by the provision of the dampers 48.

In other words, because the connector driving structure 1 has the dampers 48 and the elastic members SP, even if a user operates the operating part 41 too fast, the connector driving structure 1 reduces the insertion speed at which the connector terminals 49*a* are inserted into the female terminals 12*a* to a low speed of a certain value or below. Also, when the connector terminals 49*a* are connected to the female terminals 12*a* of the battery-side connector 12, the connector driving structure 1 can also help prevent the connector terminals 49a and the female terminals 12a from being deformed or damaged due to the impact of the connection.

To charge the battery 10, the operating part 41 in the fixed state in FIG. 10B is operated rearward (the direction of arrow a) to the release state shown in FIG. 10A. As a result, the handle 41a of the operating part 41 moves away rearward from the position above the battery 10 and therefore allows the battery 10 to be taken in and out of the battery housing body 2.

When the operating part 41 (see FIG. 10A) is operated and turned to the release position, as shown in FIG. 11E, the driving part 43 moves in the direction of arrow h by the height H1 in conjunction with the operating part 41 and the link plates 42. Thus, the collars 46 in the driving part 43 lower along with the elastic members SP. By lowering, the elastic members SP move away from the terminal holding portion 49c and return to their natural length. In this state, the connector terminals 49a are still inside the female terminals 12a. The guide pins 49e are also still inside the guide pin engagement portions 12b.

Figure 11F:
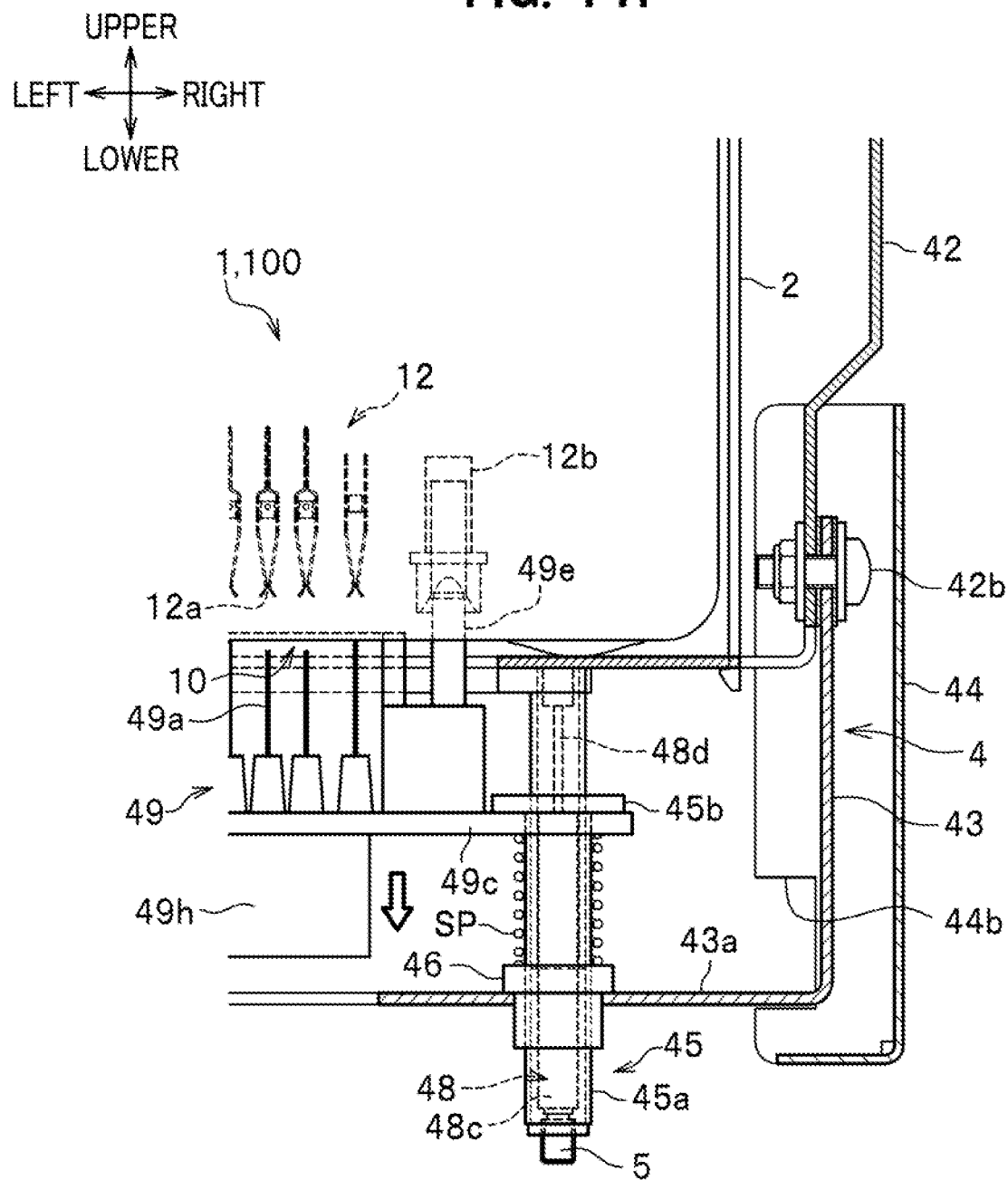
FIG. 11F is a primary-part enlarged front view showing, partially in section, how the connector is immediately after the operating part is operated to the release position.

After the elastic members SP move away from the terminal holding portion 49c, as shown in FIG. 11F, the adjustment screws 5 are pushed downward by the restoring force of the springs (not shown) provided inside the dampers 48. In other words, the damper holding members 45 are given downward force by the dampers 48.

When the damper holding members 45 are thus given downward force, the terminal holding portion 49c of the connector 49 is pushed downward via the flange portion 45b, and a force for pulling the connector terminals 49a off from the female terminals 12a of the battery-side connector 12 is generated. Then, the connector terminals 49a are automatically pulled off from the female terminals 12a by the downward force from the dampers 48, and the state is returned to the state in FIG. 11B described above.

When a user grips the grip 13 and pulls the battery 10 up in this state, the battery 10 rises from the battery stand 31 and can be pulled out of the battery housing body 2.

As thus described, as shown in FIG. 2, the battery stand 31 of the connector driving structure 1 according to the present invention has the guide portions 47b extending in the direction of positional change of the connector 49. The guide portions 47b are hollow members having an outer peripheral shape smaller than the inner peripheral shape of the damper holding members 45 and having an inner peripheral shape larger than the outer peripheral shape of the dampers 48. When the driving part 43 is at the away position, at least parts of the total lengths of the guide portions 47b are housed in the damper holding members 45.

This configuration allows the guide portions 47b to guide the movement of the connector 49. Thus, the guide portions 47b can smoothly raise and lower the connector 49.

Because the dampers 48 are housed inside the guide portions 47b and the damper holding members 45 and are not exposed to the outside, damage to the dampers 48 due to contact with the outside and functional failure of the dampers 48 due to accumulation of dust and the like can be prevented.

Also, in the connector driving structure 1, the guide portions 47b and the dampers 48 are housed and disposed inside the damper holding members 45 coaxially, space for installing the parts can be reduced to make the overall configuration of the connector driving structure 1 compact.

Also, as shown in FIG. 7, the adjustment screws 5 are disposed at the bottom portions 45c of the damper holding members 45, screwed into the damper holding members 45.

According to this configuration, turning the adjustment screws 5 enables fine adjustments of the position of the cylinders 48c and the distances from the upper end portions 5a of the adjustment screws 5 to the lower surface 31a of the battery stand 31. When such adjustment screws 5 are provided, dimensional error due to tolerances of the parts of the operation mechanism 4 can be absorbed. Also, the adjustment screws 5 can not only adjust a stroke length ST1 of the dampers 48 but also adjust the interspace between the battery stand 31 and the connector terminals 49a.

Also, as shown in FIG. 9, the elastic members SP are coil springs and are provided around the damper holding members 45. In other words, the damper holding members 45 are provided in the internal spaces of the elastic members SP.

This configuration allows effective use of the internal spaces of the elastic members SP and therefore can make the overall configuration of the operation mechanism 4 compact. Also, because the damper holding members 45 function as guides when the elastic members SP are extended and compressed, the elastic members SP do not collapse to the side or are not displaced radially at the time of compression, and are not displaced in position at the time of returning to their natural length.

Also, as shown in FIGS. 1 and 2, the power source apparatus 100 having the connector driving structure 1 is configured to be able to mount the battery 10 onto the battery stand 31.

This configuration allows smooth connection and disconnection of the connector 49 to and from the battery 10 mounted on the battery stand 31.

First Modification

Note that the present invention is not limited to the above-described embodiment and can be variously altered and changed without departing from its technical concept, and it goes without saying that the present invention includes such altered and changed inventions as well.

Figure 12A:
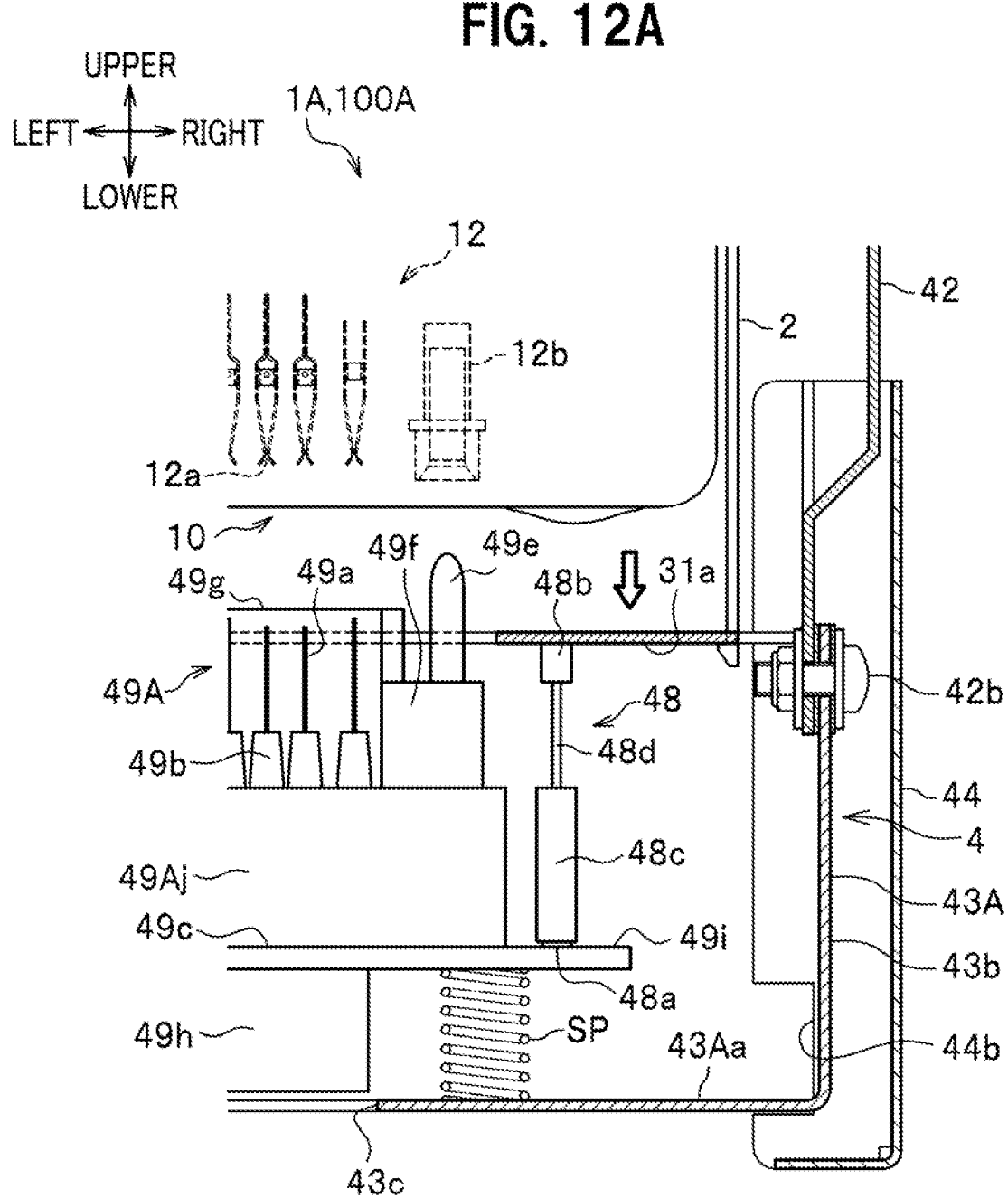
FIG. 12A is a diagram showing a first modification of the connector driving structure and the power source apparatus having the same according to the embodiment of the present invention and is a primary-part enlarged front view showing, partially in section, how a connector is when the battery is put in the battery housing body after the operating part is operated to the release position.

FIG. 12A is a diagram showing a first modification of the connector driving structure 1 and the power source apparatus 100 having the same according to the embodiment of the present invention and is a primary-part enlarged front view showing, partially in section, how a connector 49A is when the operating part 41 is operated to the released position and the battery 10 is in the battery housing body 2.

Figure 12B:
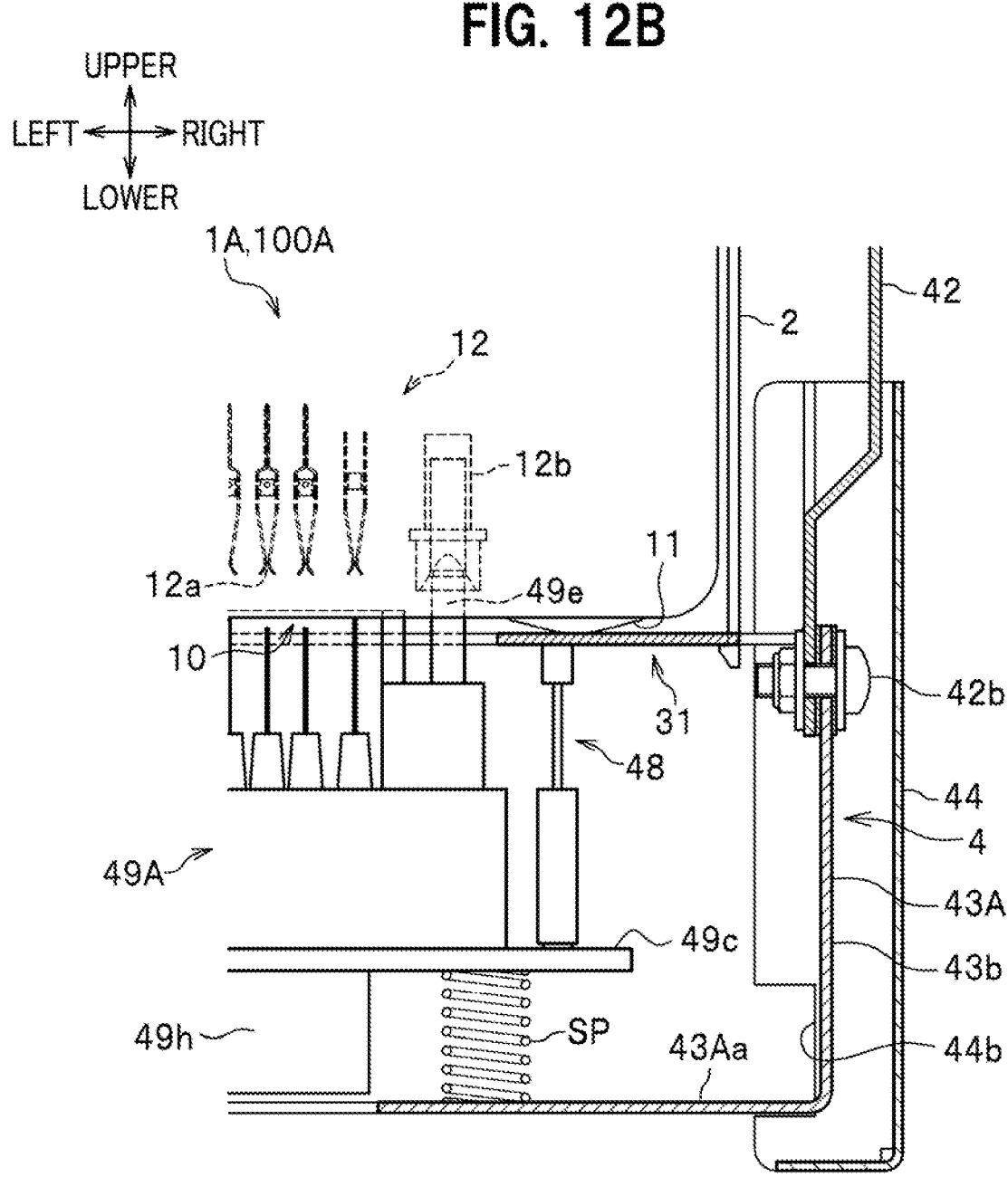
FIG. 12B is a diagram showing the first modification of the connector driving structure and the power source apparatus having the same according to the embodiment of the present invention and is a primary-part enlarged front view showing, partially in section, how the connector is when the battery is placed on the battery stand.

FIG. 12B is a diagram showing the first modification of the connector driving structure 1 and the power source apparatus 100 having the same according to the embodiment of the present invention and is a primary-part enlarged front view showing, partially in section, a state in which the battery 10 is placed on the battery stand 31.

Figure 12C:
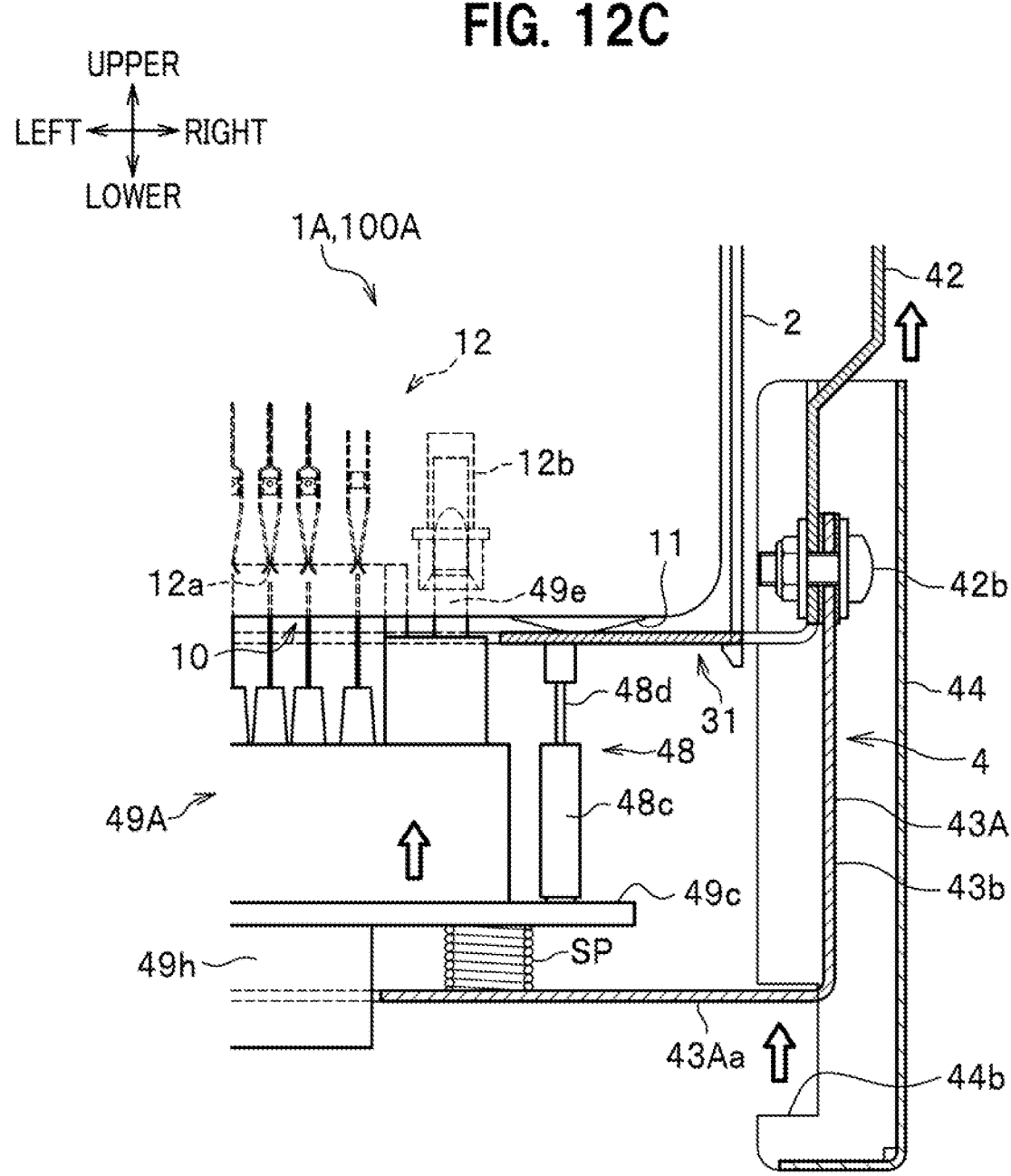
FIG. 12C is a diagram showing the first modification of the connector driving structure and the power source apparatus having the same according to the embodiment of the present invention and is a primary-part enlarged front view showing, partially in section, how the connector is when the operating part is operated to the fixed position.

FIG. 12C is a diagram showing the first modification of the connector driving structure 1 and the power source apparatus 100 having the same according to the embodiment of the present invention and is a primary-part enlarged front view showing, partially in section, how the connector 49A is when the operating part 41 is operated to the fixed position.

Figure 12D:
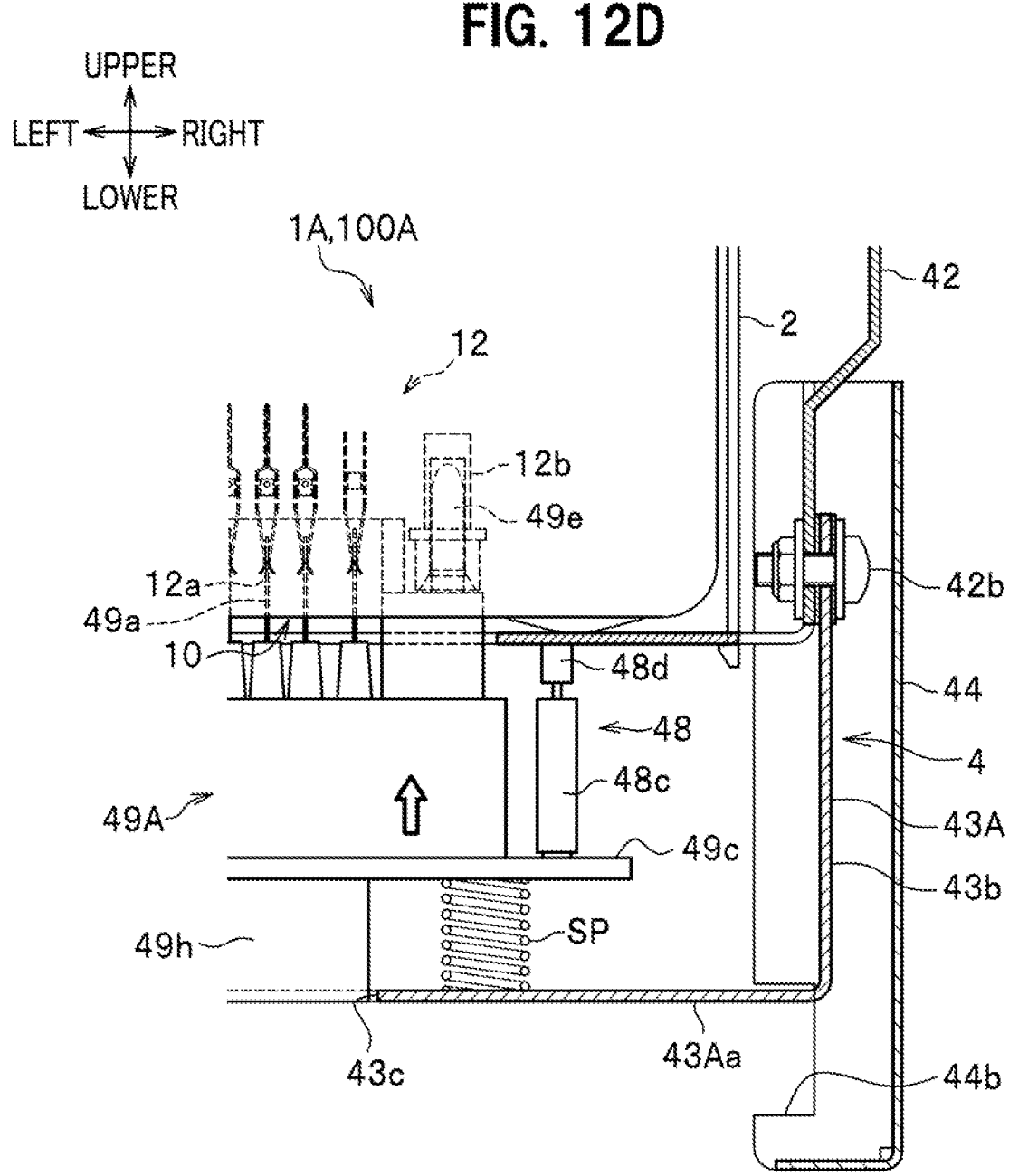
FIG. 12D is a diagram showing the first modification of the connector driving structure and the power source apparatus having the same according to the embodiment of the present invention and is a primary-part enlarged front view showing, partially in section, how the connector is immediately after the operating part is operated to the fixed position.

FIG. 12D is a diagram showing the first modification of the connector driving structure 1 and the power source apparatus 100 having the same according to the embodiment of the present invention and is a primary-part enlarged front view showing, partially in section, how the connector 49A is immediately after the operating part 41 is operated to the fixed position.

Figure 12E:
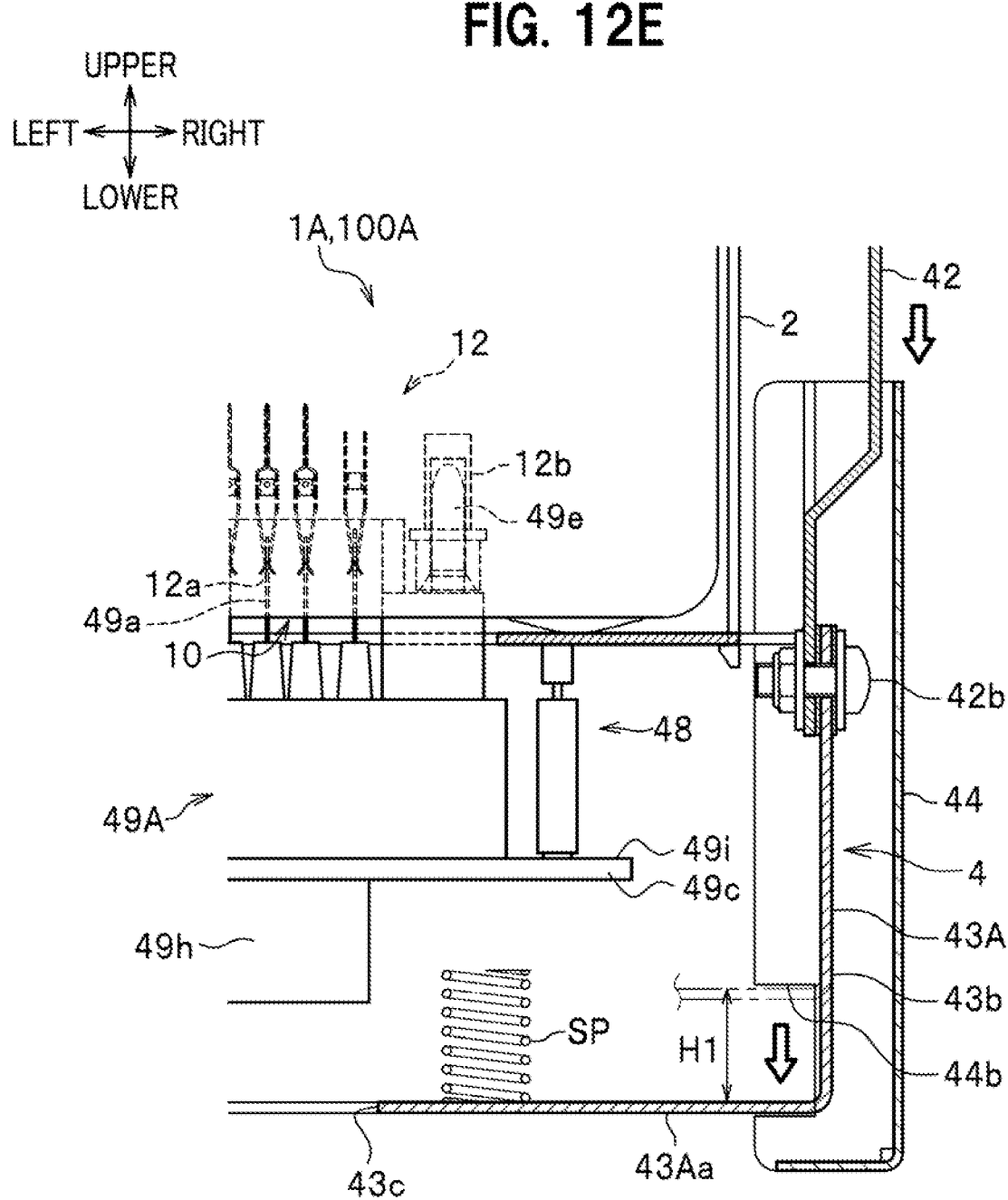
FIG. 12E is a diagram showing the first modification of the connector driving structure and the power source apparatus having the same according to the embodiment of the present invention and is a primary-part enlarged front view showing, partially in section, how the connector is when the operating part is operated to the release position.

FIG. 12E is a diagram showing the first modification of the connector driving structure 1 and the power source apparatus 100 having the same according to the embodiment of the present invention and is a primary-part enlarged front view showing, partially in section, how the connector 49A is when the operating part 41 is operated to the released position.

In the example described in the above embodiment, each damper 48 is disposed inside the damper holding member 45 as shown in FIGS. 7 and 11A. However, the placement of the damper 48 is not limited to this.

As shown in FIG. 12A, the damper 48 may be disposed in any way as long as they can reduce the speed at which the connector terminals 49a are inserted into the female terminals 12a. For example, the damper 48 may be placed between the battery stand 31 and the terminal holding portion 49c of the connector 49A. In other words, one end (the abutment surface 48a) of each damper 48 may abut against the upper surface 49i of the terminal holding portion 49c facing the lower surface 31a of the battery stand 31, and the other end (the abutment surface 48b) may abut against the lower surface 31a of the battery stand 31.

In this case, at least one of the abutment surfaces 48a, 48b of the damper 48 may be fixed to the terminal holding portion 49c or the battery stand 31. This makes it possible to restrict the damper 48 from moving when the operation mechanism 4 is operated.

The mode in FIGS. 12A and 12B can eliminate the damper holding members 45 and the collars 46 described in the above embodiment and thus simplify a connector driving structure LA.

Also, the connector 49A may be provided with a terminal block 49Aj to adjust the height between the upper surface 49i of the terminal holding portion 49c and the connector terminals 49a. The terminal block 49Aj is, for example, formed with resin integrally with the terminal holding portion 49c and the terminal support portions 49b.

This mode also allows the connector terminals 49a to be coupled with the female terminals 12a of the battery-side connector 12 before the damper 48 changes its position to the lower limit of the stroke length ST1 (i.e., becomes shortest).

Also, in the example described in the above embodiment, the elastic member SP is provided around the damper holding member 45 as shown in FIGS. 7 and 11A, but the present invention is not limited to such a mode. The elastic member SP may be, as shown in FIG. 12A, simply interposed between the terminal holding portion 49c and a connector support plate portion 43Aa of a driving part 43A. This configuration also makes the connector 49A elastically supported by the driving part 43A.

This can eliminate the collar 46 and the damper holding member 45 that support the elastic member SP and simplify the structure because there are fewer parts.

Also, in the connector support plate portion 43Aa of the driving part 43A, only the electric-wire-connecting-portion placement hole 43c is formed, and the collar installation hole 43d (see FIG. 7) described in the embodiment is not formed. Note that the electric-wire-connecting-portion placement hole 43c may be a notch.

Next, with reference to FIGS. 12A to 12E, the operation of the connector driving structure 1A and a power source apparatus 100A having the same is described.

As shown in FIG. 12A, in order for the power source apparatus 100A to supply a current to the LED floodlight (not shown), first, the operating part 41 (see FIG. 1) is operated to the release position state, and the charged battery 10 is inserted into the battery housing body 2.

Then, the battery 10 is lowered until the leg portions 11 abut against the battery stand 31 and is thereby placed on the battery stand 31, as shown in FIG. 12B. In this event, in the operation mechanism 4, because the operating part 41 (see FIG. 1) is in the release position state, the connector support plate portion 43Aa of the driving part 43A is down, abutting against the lower sides of the notch portions 44b.

Next, the operating part 41 (see FIG. 1) in the release position state is operated to the fixed position state. Then, as shown in FIG. 12C, the link plates 42 and the driving part 43A rise to positions where the connector support plate portion 43Aa of the driving part 43A abutting against the lower sides of the notch portions 44b now abut against the upper sides of the notch portions 44b. As the driving part 43A rises, the elastic member SP is compressed between the connector support plate portion 43Aa and the terminal holding portion 49c, and after that, the terminal holding portion 49c is raised by the spring force (restoring force) of the elastic member SP.

The raised terminal holding portion 49c raises the damper 48 and the connector 49A. The piston (not shown) in the damper 48 is lowered when the cylinder 48c is pushed up by the rising terminal holding portion 49c, and thus, the damper 48 can slow down the rising movement of the connector 49A.

As shown in FIG. 12D, the elastic member SP compressed by the rise of the driving part 43A raises the connector 49A further while compressing the damper 48 with its restoring force. Then, the connector terminals 49a are inserted into the female terminals 12a of the battery-side connector 12 before the elastic member SP extends completely to its natural length and the damper 48 is compressed completely (note that in order for this requirement to be met, the length of the connector 49A and the stroke length ST1 of the damper 48 need to be set appropriately). Consequently, the connector terminals 49a and the female terminals 12a are connected to each other, allowing the battery 10 to supply power to the LED floodlight (not shown).

If the lengths of the portions are set so that the connector terminals 49a and the female terminals 12a may be coupled to each other before the elastic member SP extends completely, the spring force of the elastic member SP can apply suitable force for maintaining the coupling to the connector 49A even after the coupling.

In the connector driving structure 1A (the power source apparatus 100A), the provision of the damper 48 can reduce the insertion speed at which the connector terminals 49a are connected to the female terminals 12a by the elastic member SP, thereby lessening force of impact and drastic positional change.

Also, when the operating part 41 (see FIG. 1) is operated to the release position, in conjunction with the operating part 41 (see FIG. 1) turning, the driving part 43A lowers by the height H1 via the link plates 42 as shown in FIG. 12E. When the driving part 43A is lowered, the elastic member SP moves away from the terminal holding portion 49c and returns to its natural length. In this event, the connector terminals 49a are still in the female terminals 12a, and the guide pins 49e are also still in the guide pin engagement portions 12b.

After the elastic member SP moves away from the terminal holding portion 49c, the damper 48 pushes down the terminal holding portion 49c located at the lower end of the damper 48 due to the restoring force of the spring (not shown) provided inside the damper 48, thereby pulling the connector terminals 49a off from the female terminals 12a. Thus, the connector terminals 49a are automatically taken out of the female terminals 12a by the downward force exerted by the damper 48, and the state is returned to the state in FIG. 12B described above.

In this way, the connector driving structure 1A can achieve operations and advantageous effects similar to those offered by the embodiment even though the damper 48 is interposed between the battery stand 31 and the terminal holding portion 49c and the elastic member SP is interposed between the terminal holding portion 49c and the connector support plate portion 43Aa.

As shown in FIG. 12A, the first modification of the connector driving structure 1 includes the operating part 41, the driving part 43A which moves in conjunction with the movement of the operating part 41, the connector 49A elastically supported by the driving part 43A via at least one elastic member SP, at least one damper 48 supported by the connector 49A, and the battery stand 31. By the operation of the operating part 41, the driving part 43A changes position between the close position close to the battery stand 31 and the away position away from the battery stand 31. The connector 49A includes the connector terminals 49a and the terminal holding portion 49c that holds the connector terminals 49a. An end (the abutment surface 48a) of the damper 48 is supported by the terminal holding portion 49c, while the other end (the abutment surface 48b) of the damper 48 abuts against the lower surface 31a of the battery stand 31.

This configuration makes the connector 49A not respond to the operation of the operating part 41 (see FIG. 1) instantaneously. In other words, sudden rise of the connector 49A supported on the driving part 43A with the elastic member SP interposed in between can be restricted by the resistance force of the damper 48 provided between connector 49A and the battery stand 31. Due to the restoring force of the elastic member SP that has absorbed the upward positional change of the driving part 43A, the connector 49A rises while competing with the resistance force of the damper 48. Thus, the rising speed of the connector 49A can be reduced.

In this way, the connector driving structure 1A can make constant the speed at which the connector 49A changes position irrespective of the speed at which the operating part 41 is operated. Thus, even if the operating part 41 is operated too fast, the speed at which the connector 49A changes position can be made to a predetermined speed or below.

Second Modification

Figure 13A:
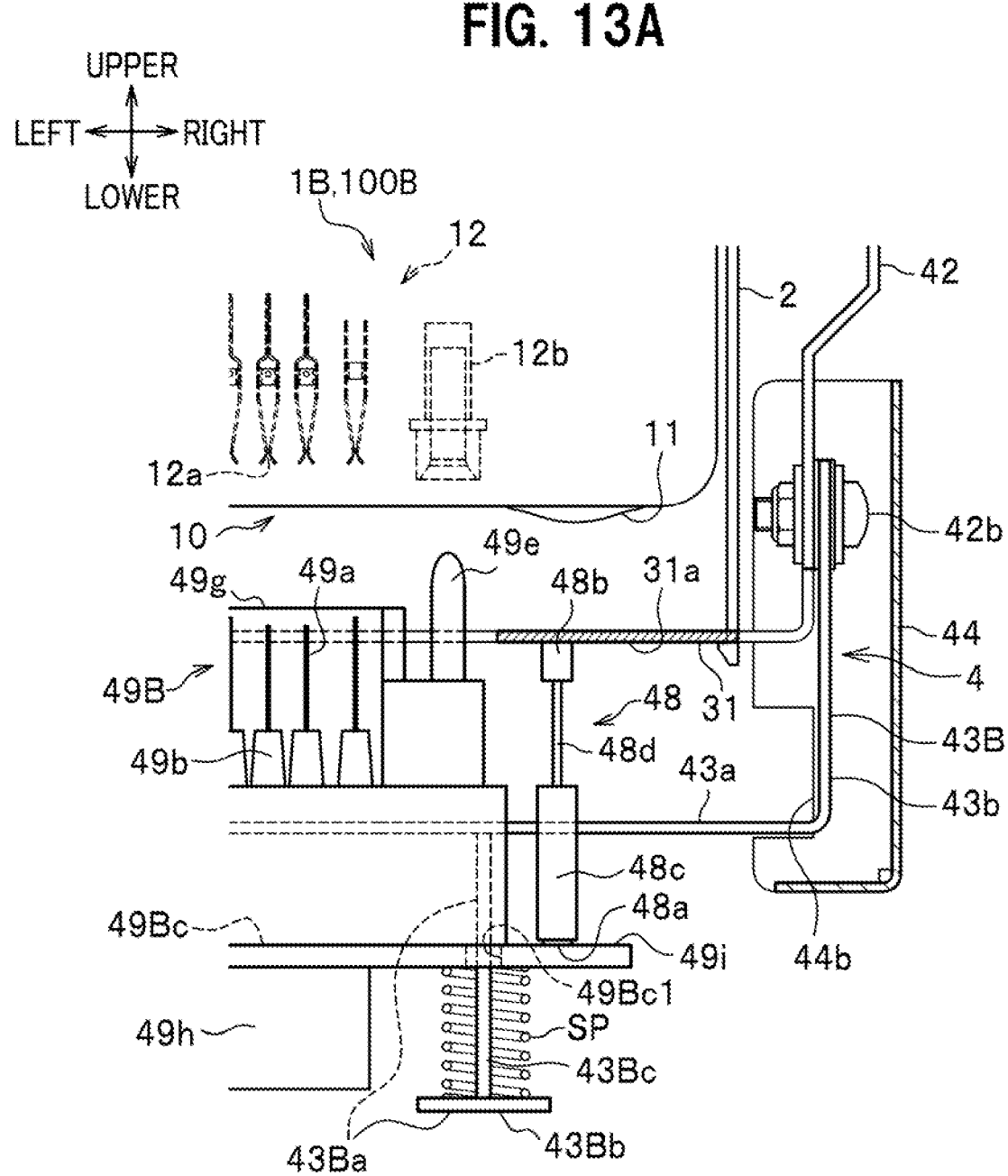
FIG. 13A is a diagram showing a second modification of the connector driving structure and the power source apparatus having the same according to the embodiment of the present invention and is a primary-part enlarged front view showing, partially in section, how the damper is installed.

FIG. 13A is a diagram showing a second modification of the connector driving structure 1 and the power source apparatus 100 having the same according to the embodiment of the present invention and is a primary-part enlarged front view showing, partially in section, how the damper 48 is installed.

FIG. 13B is a diagram showing the second modification of the connector driving structure 1 and the power source apparatus 100 having the same according to the embodiment of the present invention and is a primary-part enlarged side view showing how the damper 48 is installed.

In the example shown in FIG. 11A, the damper 48 has its upper end side inserted into the guide portion 47b and its lower end side inserted in the collar 46 and the hole 49d in the terminal holding portion 49c, but the present invention is not limited to such a configuration.

As shown in FIGS. 13A and 13B, the damper 48 only needs to be interposed between the battery stand 31 and a terminal holding portion 49Bc. In this case, the damper 48 may be disposed at a position offset from a driving part 43B in, e.g., the front-rear direction so as not to penetrate through the driving part 43B.

Also, the driving part 43B may be provided with an elastic member support portion 43Ba that supports the elastic member SP. The elastic member support portion 43Ba has a receiving portion 43Bb that receives the elastic member SP from below and a support portion 43Bc provided upright at a center portion of the upper surface of the receiving portion 43Bb. The support portion 43Bc penetrates through an insertion hole 49Bc1 of the terminal holding portion 49Bc, and the upper end of the support portion 43Bc is fixed to the connector support plate portion 43a.

According to a connector driving structure 1B of the second modification, the elastic member SP is extended and compressed while being guided by the elastic member support portion 43Ba and can thus be prevented from being dislocated.

Third Modification

Figure 14:
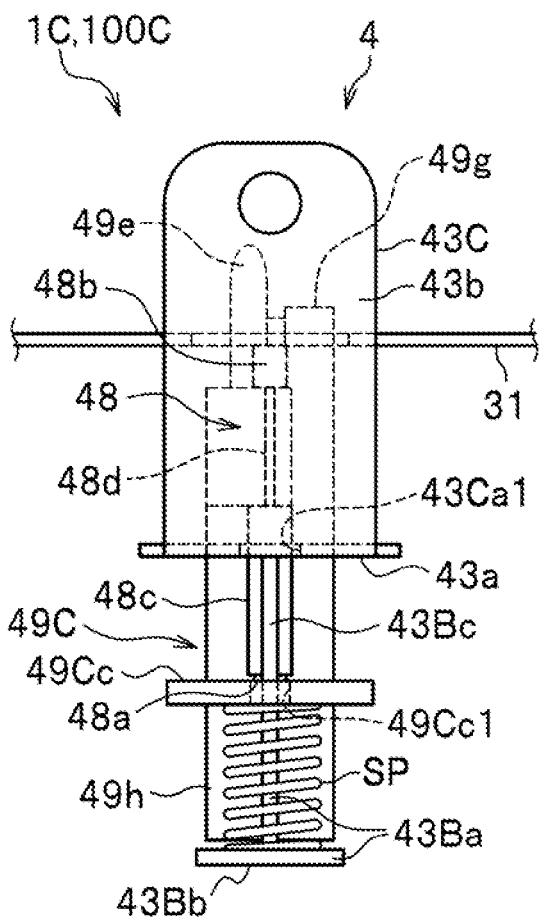
FIG. 14 is a diagram showing a third modification of the connector driving structure and the power source apparatus having the same according to the embodiment of the present invention and is a primary-part enlarged side view showing how the damper is installed.

FIG. 14 is a diagram showing a third modification of the connector driving structure 1 and the power source apparatus 100 having the same according to the embodiment of the present invention and is a primary-part enlarged side view showing how the damper 48 is installed.

In the second modification shown in FIG. 13B, the damper 48 is disposed away from the driving part 43B and does not penetrate through the driving part 43B, but the damper 48 may be disposed differently.

As shown in FIG. 14, the damper 48 may be disposed to penetrate through a through-hole 43Ca1 formed in the connector support plate portion 43a of a driving part 43C in such a manner as to be movable up and down.

Specifically, the damper 48 is inserted into the through-hole 43Ca1, and the abutment surface 48a at the lower end of the damper 48 is placed on a terminal holding portion 49Cc, and the abutment surfaces 48b at the upper end of the damper 48 is fixed to the lower surface 31a of the battery stand 31. The damper 48 is disposed on the axis of the support portion 43Bc of the driving part 43C in a side view.

According to a connector driving structure 1C of the third modification, the damper 48, the driving part 43C, and a connector 49C can be disposed compactly, achieving a reduction in size.

Fourth Modification

Figure 15:
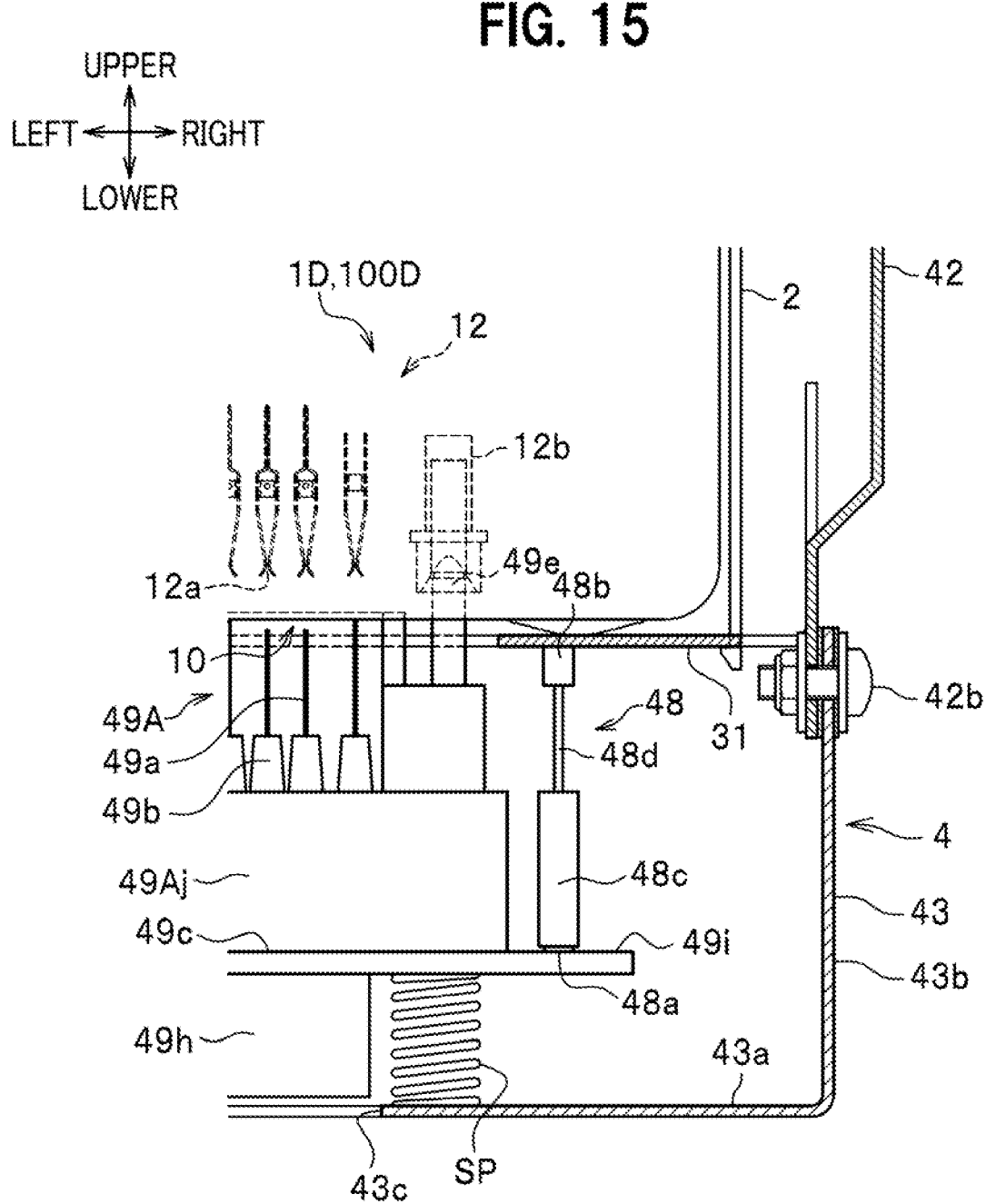
FIG. 15 is a diagram showing a fourth modification of the connector driving structure and the power source apparatus having the same according to the embodiment of the present invention and is a primary-part enlarged front view showing, partially in section, how the damper is installed.

FIG. 15 is a diagram showing a fourth modification of the connector driving structure 1 and the power source apparatus 100 having the same according to the embodiment of the present invention and is a primary-part enlarged front view showing, partially in section, how the damper 48 is installed.

As shown in FIG. 15, the damper 48 may be fixed to at least one of the terminal holding portion 49c and the battery stand 31.

Specifically, in the fourth modification, the damper 48 is disposed such that its one end abuts against the terminal holding portion 49c. The damper 48 may have the abutment surface 48a at its lower end fixed to the terminal holding portion 49c or have the abutment surfaces 48b at its upper end fixed to the battery stand 31.

According to this configuration, members for holding the damper 48 are eliminated, which allows a reduction in the number of parts. Thus, a connector driving structure 1D of the fourth modification can have a simple, slimmed-down structure.

Also, because at least one of the abutment surface 48a on the terminal holding portion 49c side and the abutment surfaces 48b on the battery stand 31 side of the damper 48 is fixed, a simple fixation structure can be obtained.

Fifth Modification

Figure 16A:
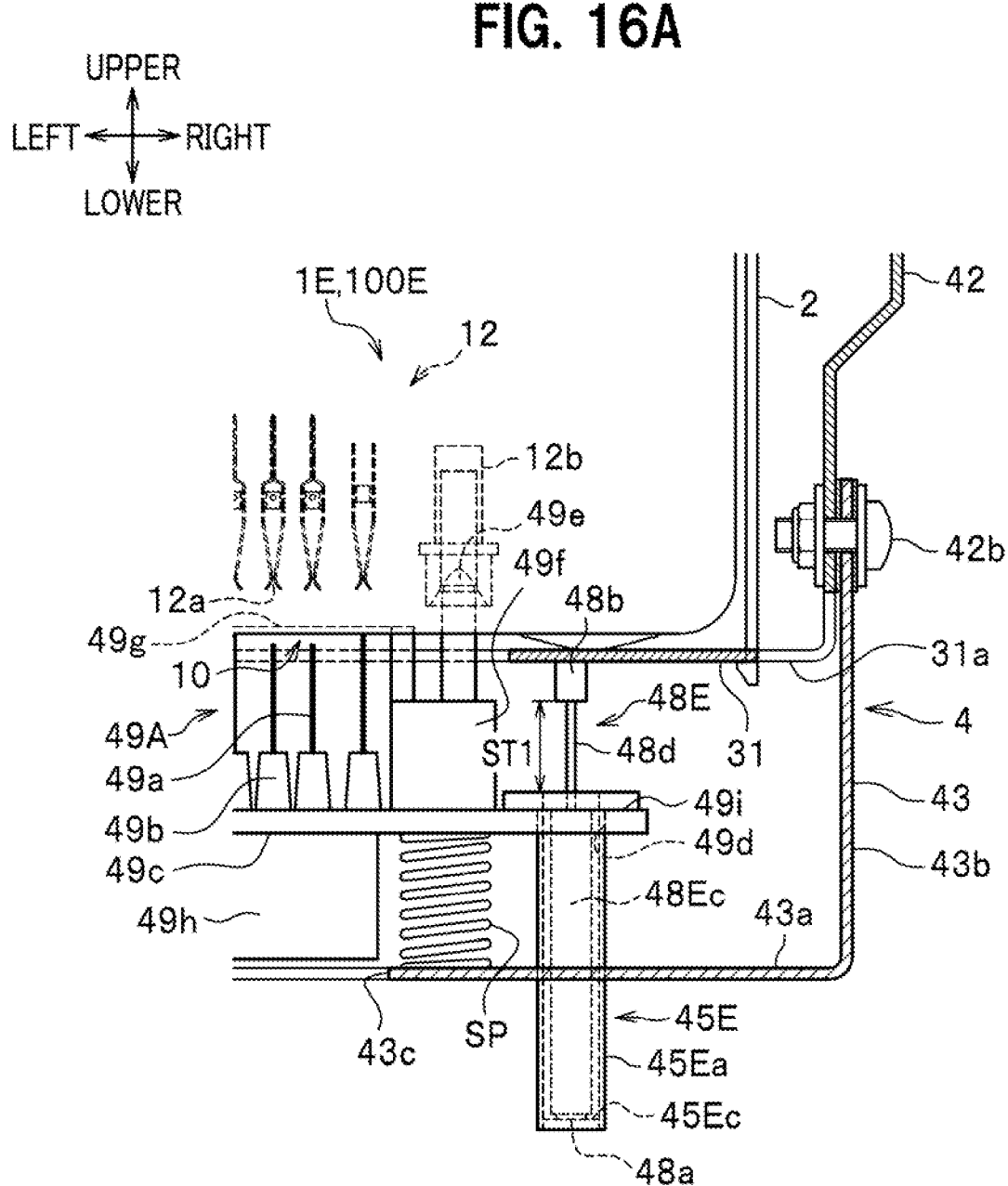
FIG. 16A is a diagram showing a fifth modification of the connector driving structure and the power source apparatus having the same according to the embodiment of the present invention and is a primary-part enlarged front view showing, partially in section, how a damper holding member is installed.

FIG. 16A is a diagram showing a fifth modification of the connector driving structure 1 and the power source apparatus 100 having the same according to the embodiment of the present invention and is a primary-part enlarged front view showing, partially in section, how a damper holding member 45E is installed.

Figure 16B:
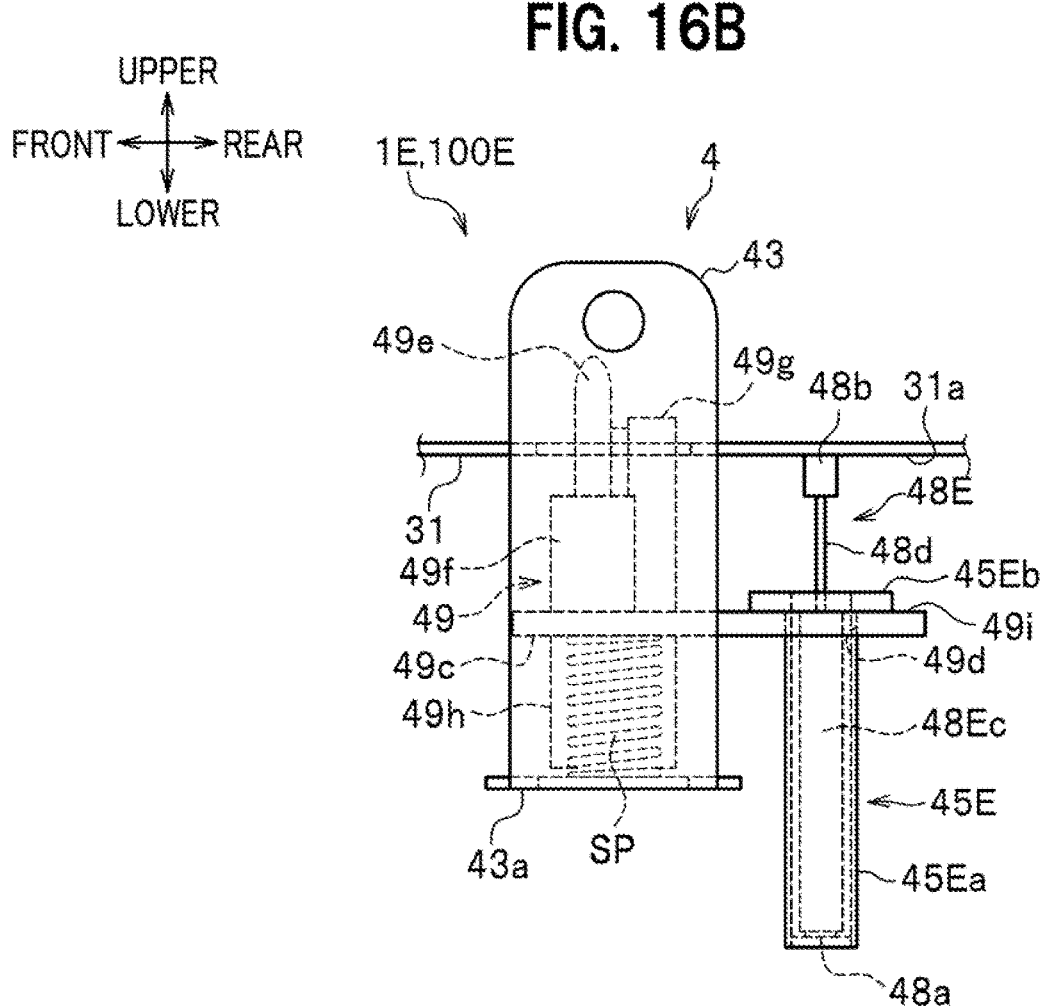
FIG. 16B is a diagram showing the fifth modification of the connector driving structure and the power source apparatus having the same according to the embodiment of the present invention and is a primary-part enlarged side view showing how the damper holding member is installed.

FIG. 16B is a diagram showing the fifth modification of the connector driving structure 1 and the power source apparatus 100 having the same according to the embodiment of the present invention and is a primary-part enlarged side view showing how the damper holding member 45E is installed.

Figure 16C:
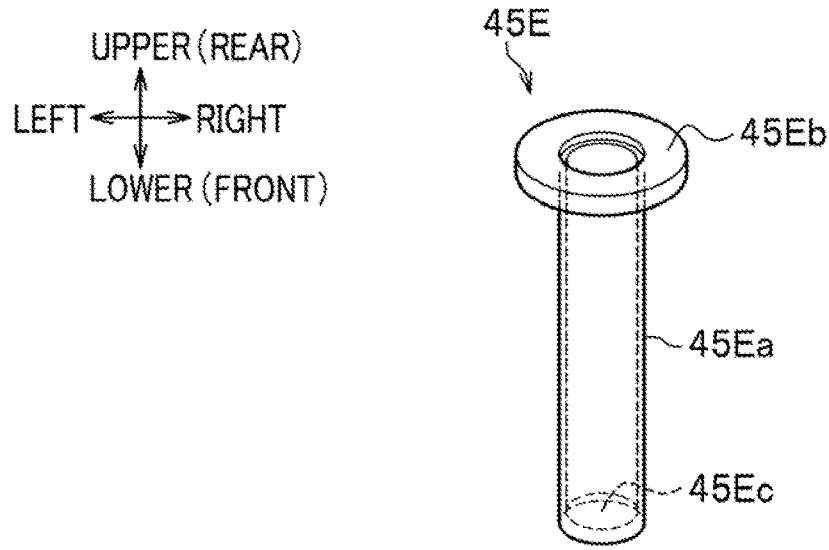
FIG. 16C shows the fifth modification of the connector driving structure and the power source apparatus having the same according to the embodiment of the present invention and is an enlarged perspective view of the damper holding member.

FIG. 16C shows the fifth modification of the connector driving structure 1 and the power source apparatus 100 having the same according to the embodiment of the present invention and is an enlarged perspective view of the damper holding member 45E.

As shown in FIGS. 16A to 16C, a damper 48E is supported by the bottomed tubular damper holding member 45E. One end (the abutment surface 48a at the lower end) of the damper 48E abuts against a bottom portion 45Ec of the damper holding member 45E, and at least part of the total length of the damper 48E is housed in the damper holding member 45E.

The damper holding member 45E is, as shown in FIG. 16C, formed of a tubular body having a tube portion 45Ea with the bottom portion 45Ec and a flange portion 45Eb at an upper end portion of the tube portion 45Ea. The flange portion 45Eb is locked onto the upper opening rim of the hole 49d in the terminal holding portion 49c. As shown in FIGS. 16A and 16B, the damper holding member 45E extends downward of the terminal holding portion 49c, which allows the space for installing the damper 48E not to be restricted by the distance by which the battery stand 31 and the terminal holding portion 49c are away from each other. In other words, the length of the damper 48E in the up-down direction can be made to an appropriate length.

Note that in accordance with the rising and lowering of the connector 49A, the damper 48E rises and lowers together with the damper holding member 45E.

According to this configuration in which at least part of the total length of the damper 48E is housed in the damper holding member 45E, the damper 48E with an appropriate length can be used. Also, because there is no adjustment screw (see FIG. 7) at the bottom portion 45Ec of the damper holding member 45E, the number of parts can be reduced.

Sixth Modification

Figure 17A:
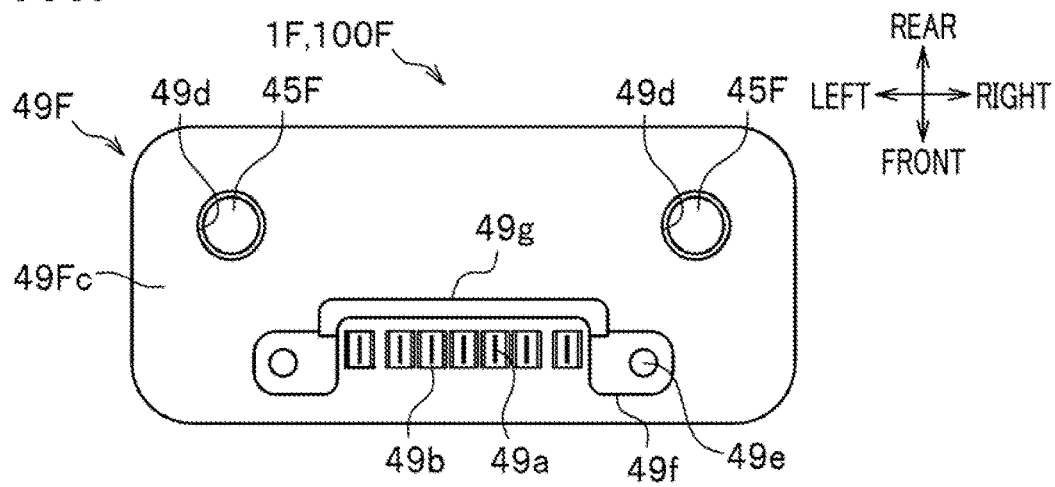
FIGS. 17A to 17C are diagrams showing a sixth modification of the connector driving structure and the power source apparatus having the same according to the embodiment of the present invention, FIG. 17A being an enlarged plan view of a connector, FIG. 17B being an enlarged front view of the connector, FIG. 17C being an enlarged perspective view of a damper holding member.
Figure 17B:
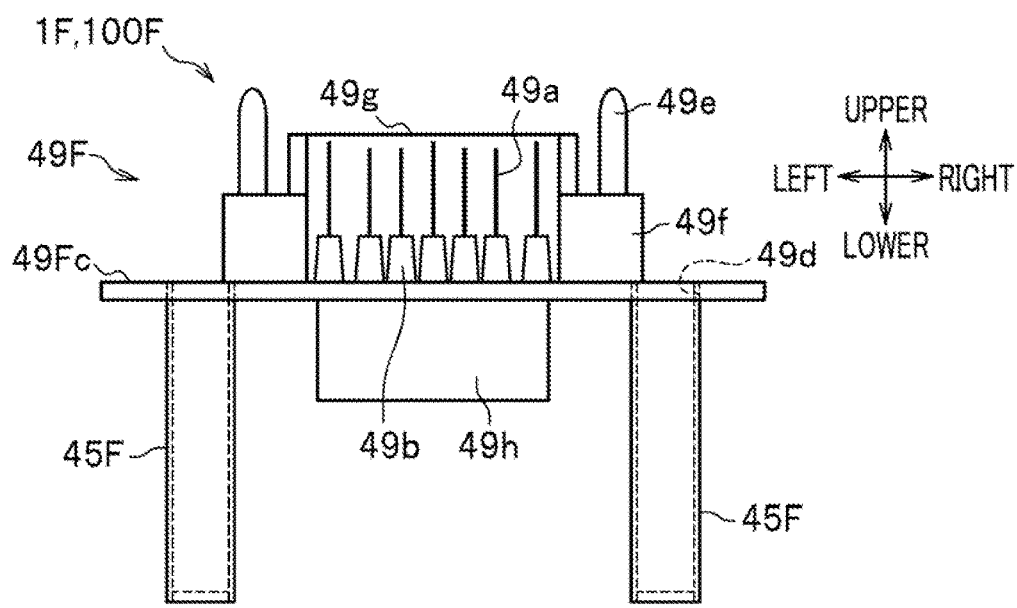
Figure 17C:
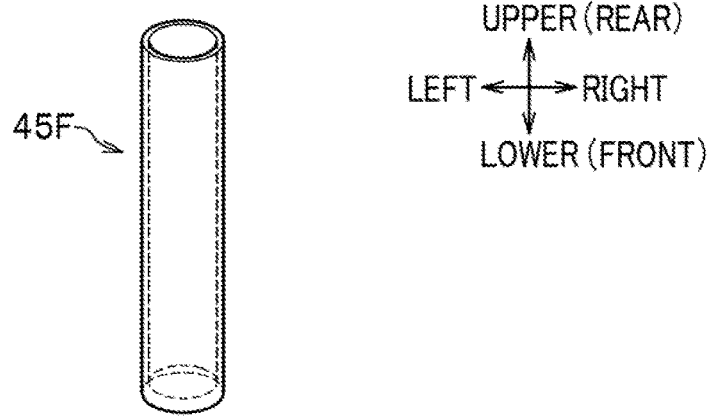

FIGS. 17A to 17C are diagrams showing a sixth modification of the connector driving structure 1 and the power source apparatus 100 having the same according to the embodiment of the present invention, FIG. 17A being an enlarged plan view of a connector 49F, FIG. 17B being an enlarged plan view of the connector 49F, FIG. 17C being an enlarged perspective view of a damper holding member 45F.

Although the damper holding member 45E of the fifth modification described above has the flange portion 45Eb, the flange portion 45Eb may be omitted to make the damper holding member 45E a bottomed circular tube shape like the damper holding member 45F shown in FIGS. 17A to 17C.

The damper holding member 45F is either inserted and attached into the hole 49d in a terminal holding portion 49Fc of the connector 49F or formed integrally with the terminal holding portion 49Fc.

This can simplify the shape of the damper holding member 45F. Also, forming the damper holding member 45F integrally with the connector 49F allows a reduction in the number of parts.

Seventh Modification

Figure 18:
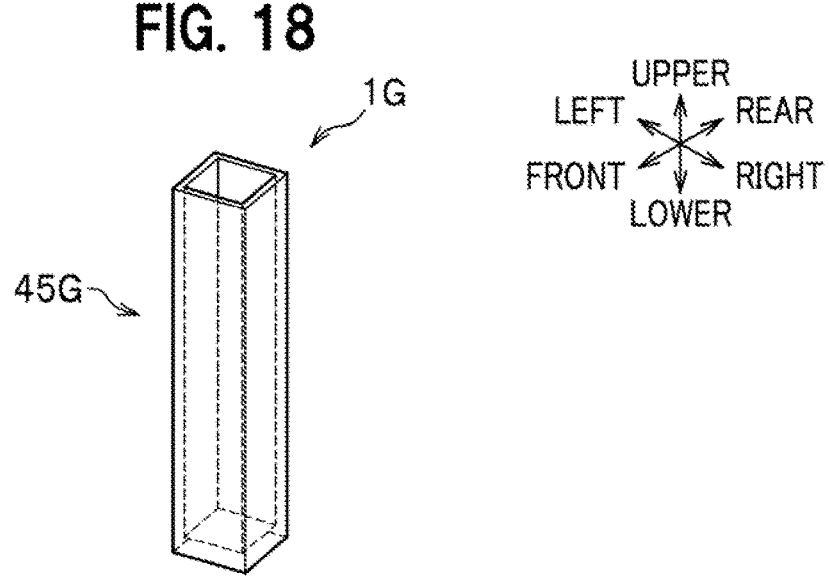
FIG. 18 shows a seventh modification of the connector driving structure and the power source apparatus having the same according to the embodiment of the present invention and is an enlarged perspective view of a damper holding member.

FIG. 18 shows a seventh modification of the connector driving structure 1 and the power source apparatus 100 having the same according to the embodiment of the present invention and is an enlarged perspective view of a damper holding member 45G.

The damper holding member 45F in the sixth modification described above may have a bottomed square tube shape, like the damper holding member 45G shown in FIG. 18.

The damper holding member 45G either has its upper end portion inserted and attached into the circular or quadrangular hole 49d formed in the terminal holding portion 49c of the connector 49 or is formed integrally with the terminal holding portion 49c (see FIGS. 17A and 17B).

The damper holding member 45G can thus have a simple shape.

Eighth Modification

Figure 19A:
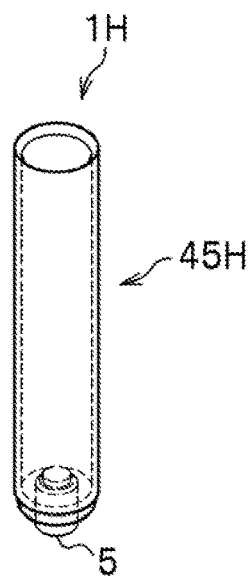
FIGS. 19A to 19B are diagrams showing an eighth modification of the connector driving structure and the power source apparatus having the same according to the embodiment of the present invention, FIG. 19A being an enlarged perspective view of a damper holding member having a bottomed circular tube shape, FIG. 19B being an enlarged perspective view of a damper holding member having a bottomed square tube shape.
Figure 19B:
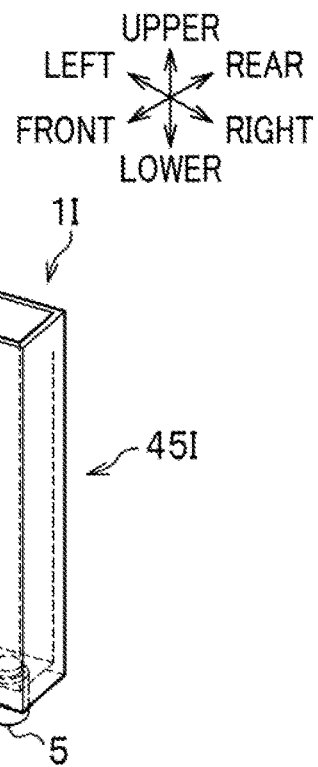

FIGS. 19A and 19B are diagrams showing an eighth modification of the connector driving structure 1 and the power source apparatus 100 having the same according to the embodiment of the present invention, FIG. 19A being an enlarged perspective view of a damper holding member 45H having a bottomed circular tube shape, FIG. 19B being an enlarged perspective view of a damper holding member 45I having a bottomed square tube shape.

The damper holding member 45 in the above embodiment is not limited to a tubular member having the flange portion 45b as shown in FIG. 7.

As shown in FIG. 19A, the damper holding member 45H having the adjustment screw 5 may be of a bottomed circular tube shape without the flange portion 45b (see FIG. 7) like in the sixth modification (see FIG. 17C). Also, as shown in FIG. 19B, the damper holding member 45I having the adjustment screw 5 may be of a bottomed square tube shape without the flange portion 45b (see FIG. 7) like in the seventh modification (see FIG. 18).

In this case, the damper holding member 45H, 45I is formed integrally by, e.g., having its upper end portion inserted and attached into the hole 49d formed in the terminal holding portion 49c of the connector 49 or being formed integrally with the terminal holding portion 49c (see FIGS. 17A and 17B).

A connector driving structure 1H, 1I of the eighth modification of the present invention can thus simplify the shape of the damper holding member 45H, 45I. Also, integrally forming the damper holding member 45H, 45I with the connector 49 (see FIG. 9) can reduce the number of parts.

Ninth Modification

Figure 20A:
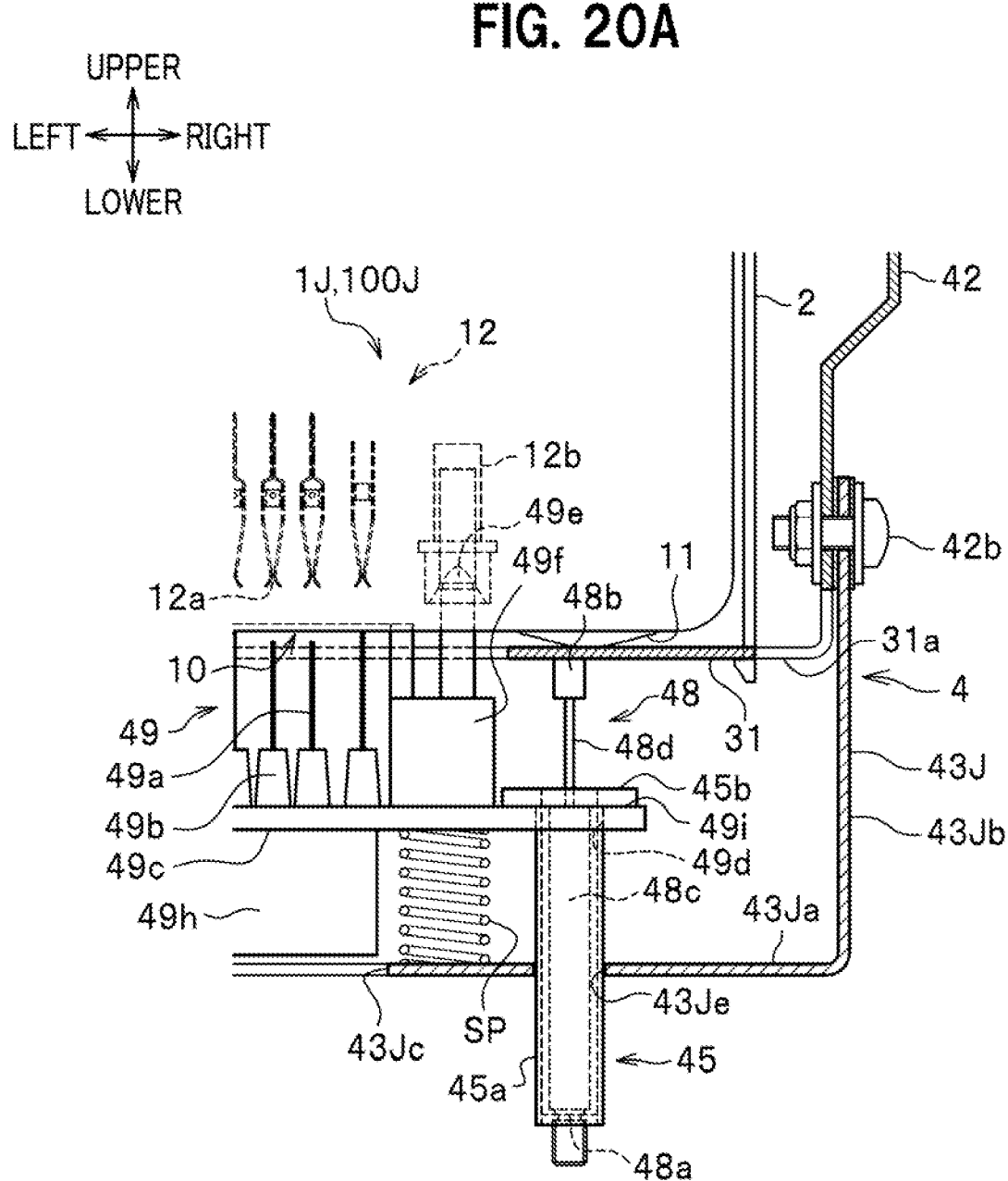
FIG. 20A is a primary-part enlarged front view showing, partially in section, how a driving part of a ninth modification of the connector driving structure and the power source apparatus having the same according to the embodiment of the present invention is installed.

FIG. 20A is a primary-part enlarged front view showing, partially in section, how a driving part 43J of a ninth modification of the connector driving structure 1 and the power source apparatus 100 having the same according to the embodiment of the present invention is installed.

Figure 20B:
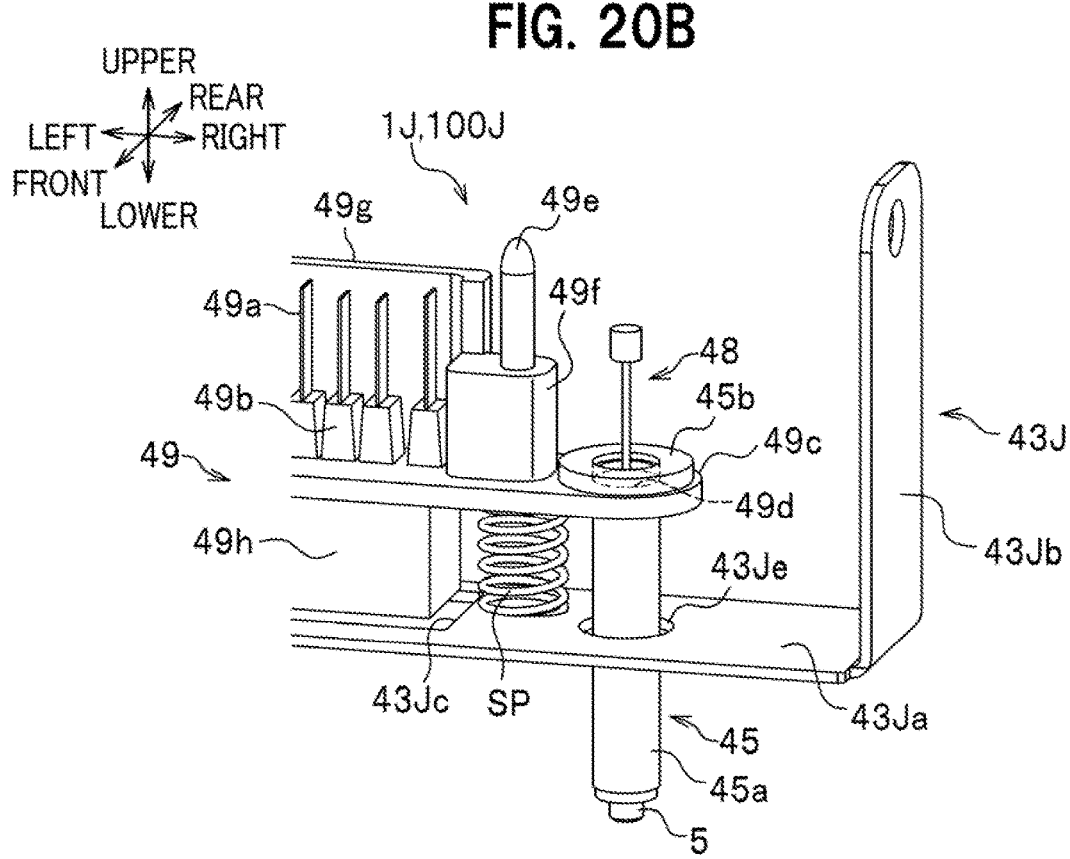
FIG. 20B is a primary-part enlarged perspective view showing, partially in section, how the driving part of the ninth modification of the connector driving structure and the power source apparatus having the same according to the embodiment of the present invention is installed.

FIG. 20B is a primary-part enlarged perspective view showing, partially in section, how the driving part 43J of the ninth modification of the connector driving structure 1 and the power source apparatus 100 having the same according to the embodiment of the present invention is installed.

Figure 20C:
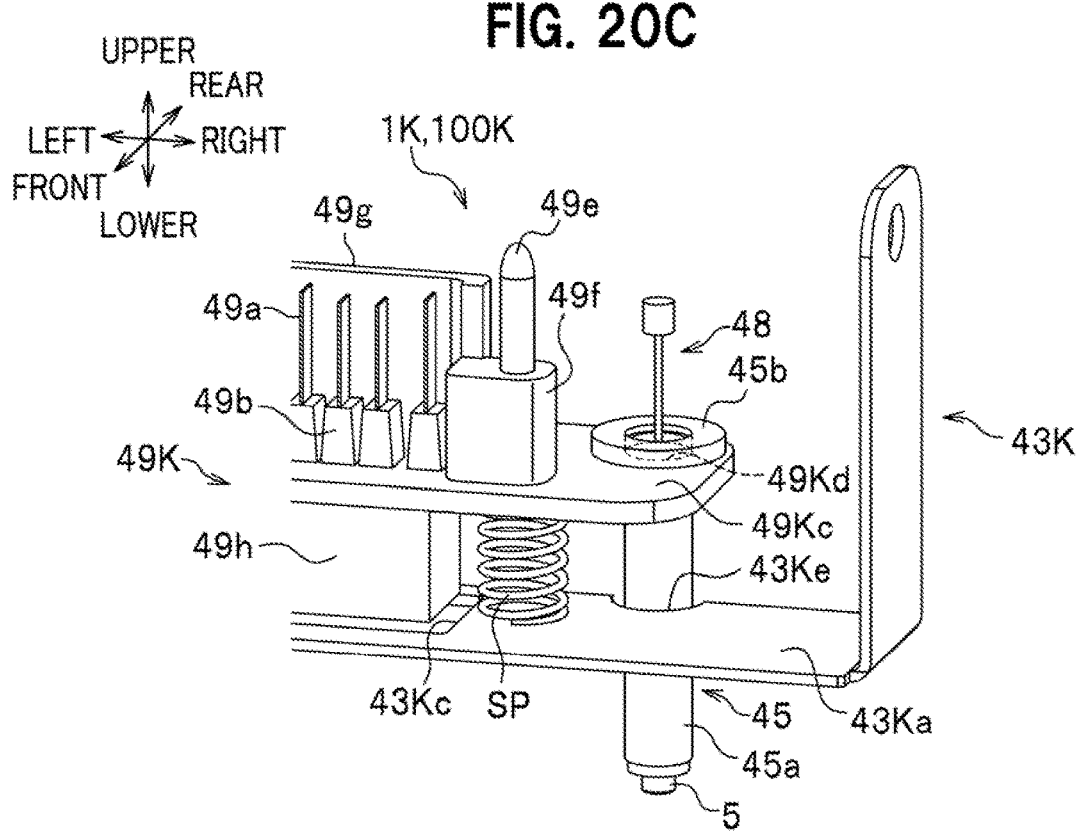
FIG. 20C is a primary-part enlarged perspective view showing, partially in section, a modification of the ninth modification of the connector driving structure and the power source apparatus having the same according to the embodiment of the present invention.

FIG. 20C is a primary-part enlarged perspective view showing, partially in section, a modification of the ninth modification of the connector driving structure 1 and the power source apparatus 100 having the same according to the embodiment of the present invention.

As shown in FIG. 20A, 20B, or 20C, the damper holding member 45 may extend downward of the driving part 43J, 43K through a hole 43Je or a notch portion 43Ke formed in the driving part 43J, 43K.

In this case, the driving part 43J shown in FIGS. 20A and 20B has a connector support plate portion 43Ja and operating force receiving plate portions 43Jb. The connector support plate portion 43Ja has an electric wire connection portion placement hole 43Jc and the hole 43Je formed therein. The electric wire connecting portion 49h is inserted into the electric wire connection portion placement hole 43Jc in such a manner as to be movable up and down. The hole 43Je is formed of a circular through-hole formed in a center portion, in the front-rear direction, of the connector support plate portion 43Ja. The tubular portion 45a of the damper holding member 45 is inserted into the hole 43Je in such a manner as to be movable up and down. The hole 43Je is formed on the axis of the hole 49d in the terminal holding portion 49c and sized to be able to guide up-down movement of the tubular portion 45a.

Also, the hole 43Je of the driving part 43J only needs to be able to guide up-down movement of the damper holding members 45. Thus, the hole 43Je may be, as shown in FIG. 20C, the notch portion 43Ke formed in a connector support plate portion 43Ka of the driving part 43K.

The notch portion 43Ke is formed of a semicircular notch groove formed in an edge portion (e.g., a rear edge portion), in the front-rear direction, of the connector support plate portion 43Ka. The notch portion 43Ke is formed on the axis of a hole 49Kd in a terminal holding portion 49Kc and sized to be able to guide up-down movement of the tubular portion 45a. Thus, the front-rear-direction width of the terminal holding portion 49Kc is larger than the front-rear-direction width of the terminal holding portion 49c shown in FIG. 20B because the notch portion 43Ke shown in FIG. 20C is formed at a position close to the rear edge portion of the connector support plate portion 43Ka. Also, the axis of the damper holding member 45 and the damper 48 is, in a side view, located at a position offset from the up-down direction center line of a connector 49K.

As shown in FIGS. 20A to 20C, the driving part 43J, 43K may have either one of the hole 43Je and the notch portion 43Ke as long as the damper holding member 45 is disposed to be movable up and down and guided for its up-down movement by the driving part 43J, 43K. Also, the shape of the hole 43Je or the notch portion 43Ke is not limited to a circle or a semicircle and may be appropriately selected to suit the outer peripheral shape of the damper holding member 45.

When the hole 43Je or the notch portion 43Ke is thus formed in the driving part 43J, 43K, the driving part 43J, 43K can be placed close to the battery stand 31 while creating enough space for installing the damper 48. Thus, the overall configuration of a connector driving structure 1K, 1J can be made compact. Also, in the connector driving structure 1K, 1J, the hole 43Je or the notch portion 43Ke serves as a guide for the connector 49, 49K and can therefore reduce displacement of the connector 49, 49K.

Tenth Modification

FIG. 21A is a primary-part enlarged front view showing, partially in section, how the collar 46 of a tenth modification of the connector driving structure 1 and the power source apparatus 100 having the same according to the embodiment of the present invention is installed.

Figure 21B:
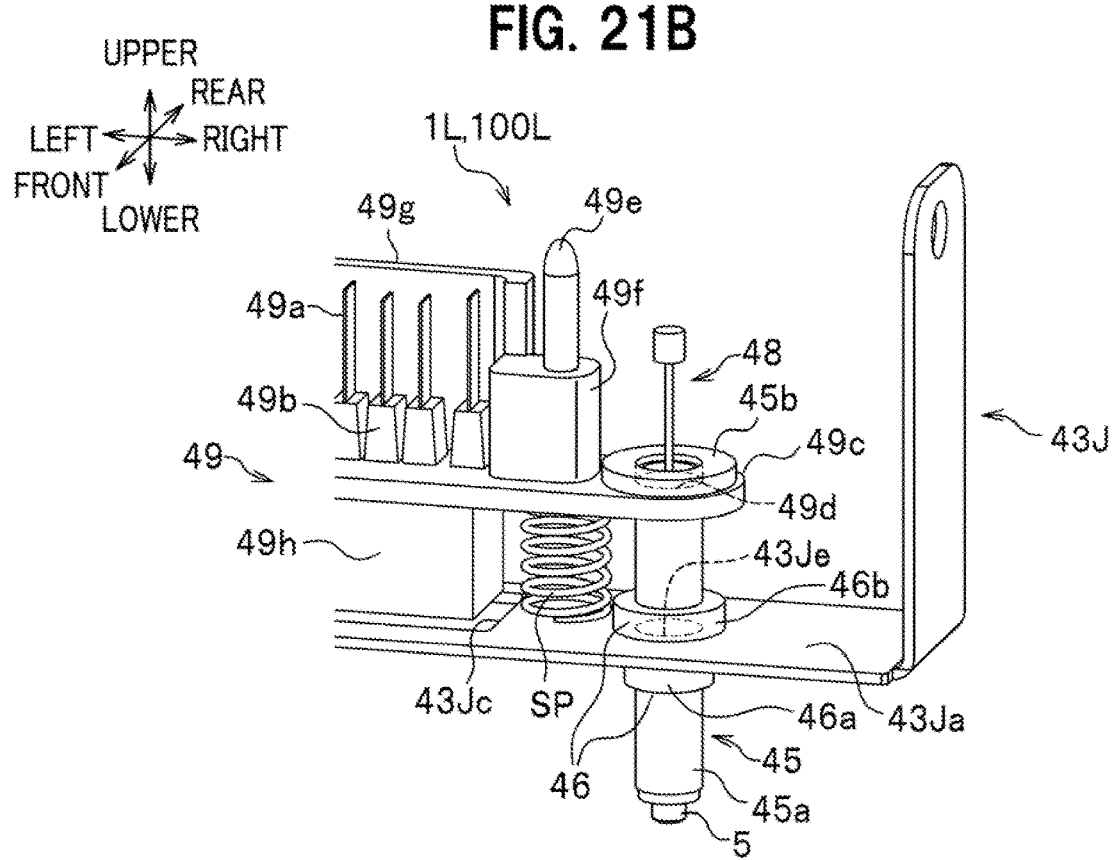
FIG. 21B is a primary-part enlarged perspective view showing how the collar of the tenth modification of the connector driving structure and the power source apparatus having the same according to the embodiment of the present invention is installed.
Figure 21C:
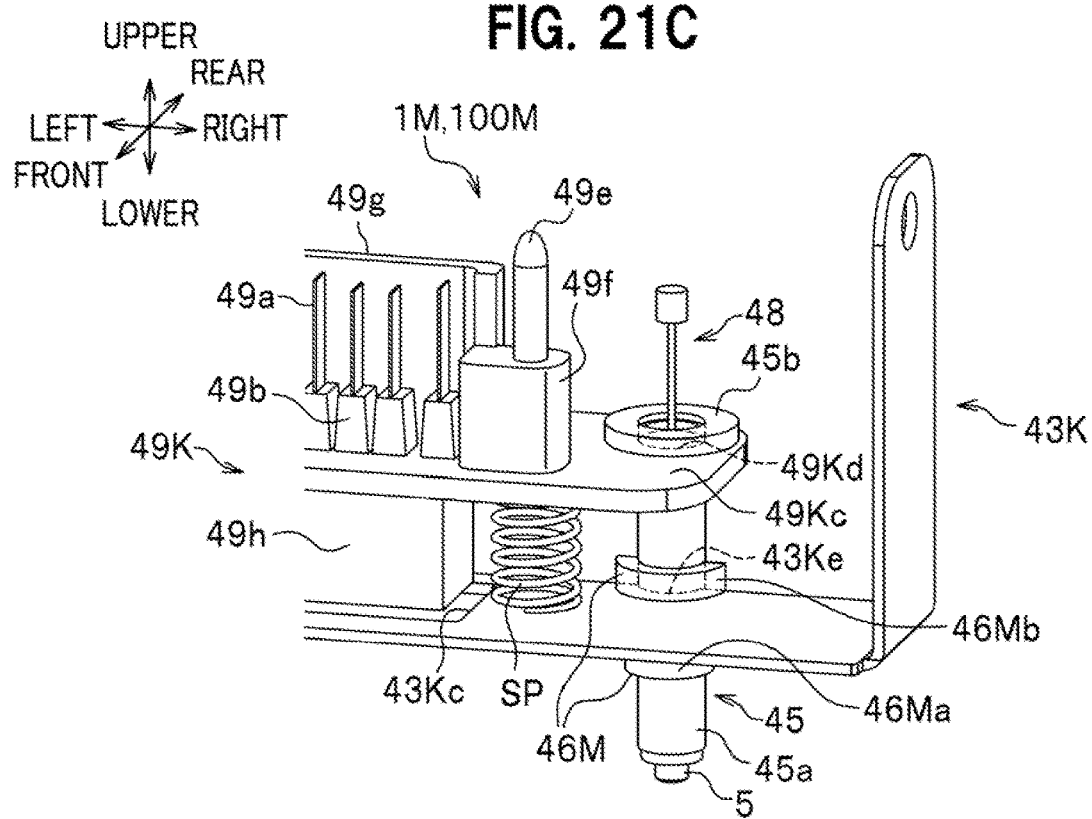
FIG. 21C is a primary-part enlarged perspective view showing a modification of the tenth modification of the connector driving structure and the power source apparatus having the same according to the embodiment of the present invention.

FIG. 21B is a primary-part enlarged perspective view showing how the collar 46 of the tenth modification of the connector driving structure 1 and the power source apparatus 100 having the same according to the embodiment of the present invention is installed. FIG. 21C is a primary-part enlarged perspective view showing a modification of the tenth modification of the connector driving structure 1 and the power source apparatus 100 having the same according to the embodiment of the present invention.

As shown in FIGS. 21A to 21C, the collar 46, 46M made of resin may be provided in the hole 43Je or the notch portion 43Ke of the ninth modification shown in FIGS. 20A to 20C.

As shown in FIGS. 21A and 21B, the hole 43Je in the driving part 43J is formed on the axis of the hole 49d in the terminal holding portion 49c. The collar 46 of a flanged circular tube shape is provided at the hole 43Je. The collar 46 includes the circular tube portions 46a and the flange portion 46b. The flange portion 46b is formed at the edge portion of the opening of the hole 43Je.

Also, as shown in FIG. 21C, the notch portion 43Ke in the driving part 43K is formed on the axis of the hole 49Kd in the terminal holding portion 49Kc. The collar 46M of a semicircular tube shape is provided at the notch portion 43Ke. The collar 46M includes a semicircular tube portion 46Ma and a semi-annular flange portion 46Mb.

According to a connector driving structure 1L, 1M in which the collar 46, 46M made of resin is provided in the hole 43Je or the notch portion 43Ke in the driving part 43J, 43K, the damper holding member 45 can smoothly slide. Also, when members wear out after repeated use of the connector driving structure 1L, 1M, it can be solved by replacement of only the collar 46, 46M, which allows reduction in the maintenance cost for the operation mechanism 4. Also, making the collar 46, 46M from resin can reduce the cost and weight of the part. Note that the inner and outer peripheral shapes of the collar 46, 46M are not limited to a circle or a semicircle and may be selected appropriately to suit the outer peripheral shape of the damper holding member 45 and the shape of the hole 43Je or the notch portion 43Ke.

Eleventh Modification

FIG. 22A is a primary-part enlarged sectional view showing how a rising-and-lowering guide 34 of an eleventh modification of the connector driving structure 1 and the power source apparatus 100 having the same according to the embodiment of the present invention is installed.

Figure 22B:
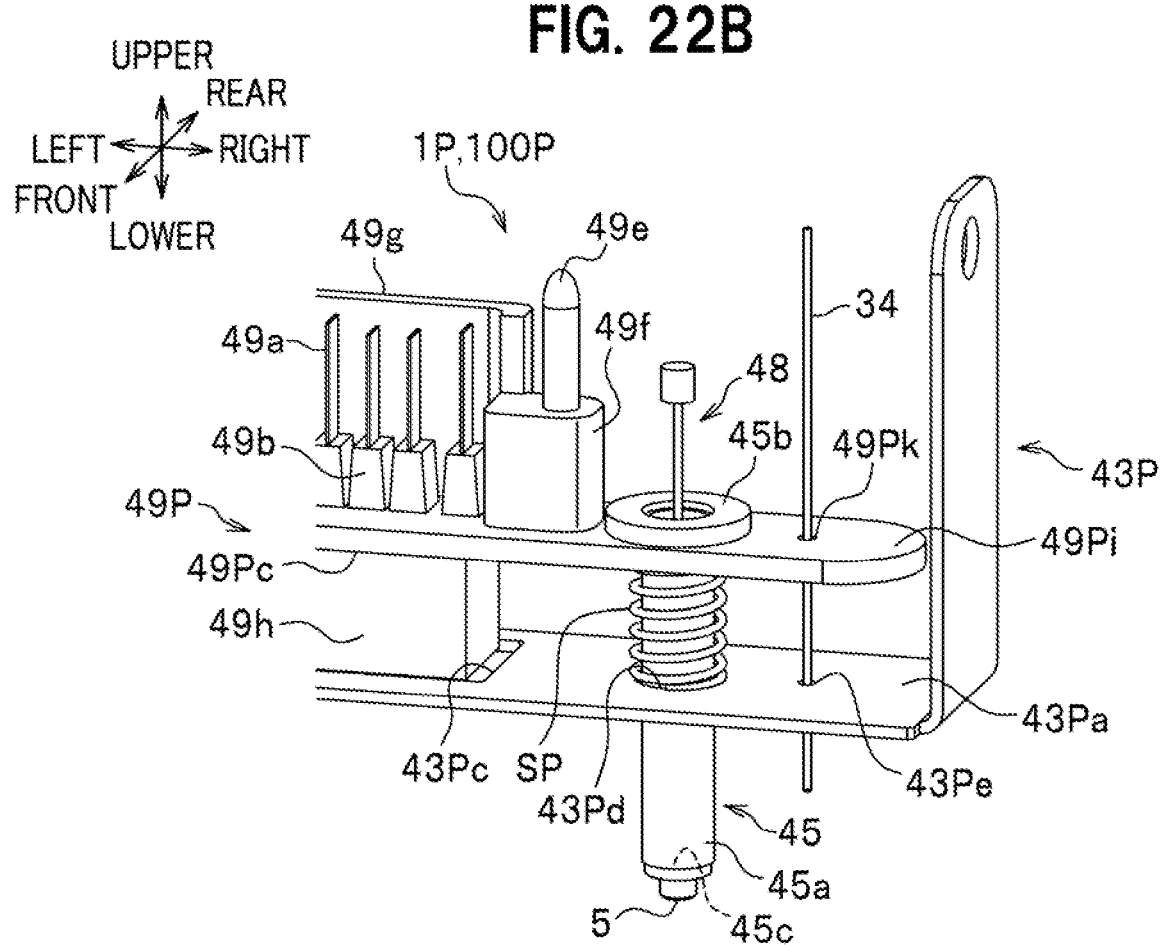
FIG. 22B is a primary-part enlarged perspective view showing how the rising-and-lowering guide of the eleventh modification of the connector driving structure and the power source apparatus having the same according to the embodiment of the present invention is installed.

FIG. 22B is a primary-part enlarged perspective view showing how the rising-and-lowering guide 34 of the eleventh modification of the connector driving structure 1 and the power source apparatus 100 having the same according to the embodiment of the present invention is installed.

As shown in FIGS. 22A and 22B, the battery stand 31 may be provided with the rising-and-lowering guide 34 extending in a direction parallel to the direction in which the connector 49 changes position. The rising-and-lowering guide 34 is, for example, inserted through a guide insertion hole 49Pk formed in the terminal holding portion 49c.

The rising-and-lowering guide 34 is a member for raising and lowering a connector 49P and a driving part 43P without them moving laterally. The rising-and-lowering guide 34 is formed of a member extending from the lower surface 31a of the battery stand 31 in the direction of the connector's positional change (downward). The upper end of the rising-and-lowering guide 34 is fixed to the lower surface 31a of the battery holding body 3. The guide insertion hole 49Pk is formed in a terminal holding portion 49Pc, and a guide insertion hole 43Pe is formed in the connector support plate portion 43a. The rising-and-lowering guide 34 is inserted through the guide insertion hole 49Pk and the guide insertion hole 43Pe. The shape of the outer peripheral surface of the rising-and-lowering guide 34 may be any shape as long as the rising-and-lowering guide 34 can serve as a guide, and the rising-and-lowering guide 34 may be formed of one that is, for example, circular in a cross sectional view like the guide insertion hole 49Pk and the guide insertion hole 43Pe. The guide insertion hole 49Pk and the guide insertion hole 43Pe are also not limited to having a circular shape as long as they can guide the rising-and-lowering guide 34.

Note that the rising-and-lowering guide 34 only needs to guide rising and lowering of at least the connector 49P, and may be configured not to guide the driving part 43P by omitting the guide insertion hole 43Pe in the driving part 43P. Also, the sectional shape and thickness of the rising-and-lowering guide 34 are not limited to any particular ones, and may be other shapes such as a polygon.

Having the rising-and-lowering guide 34, the battery stand 31 allows the connector 49P to rise and lower stably. Because the rising-and-lowering guide 34 is inserted through the guide insertion hole 49Pk in the terminal holding portion 49c, the connector terminals 49a of the connector 49P are less likely to be laterally displaced.

Twelfth Modification

Figure 23A:
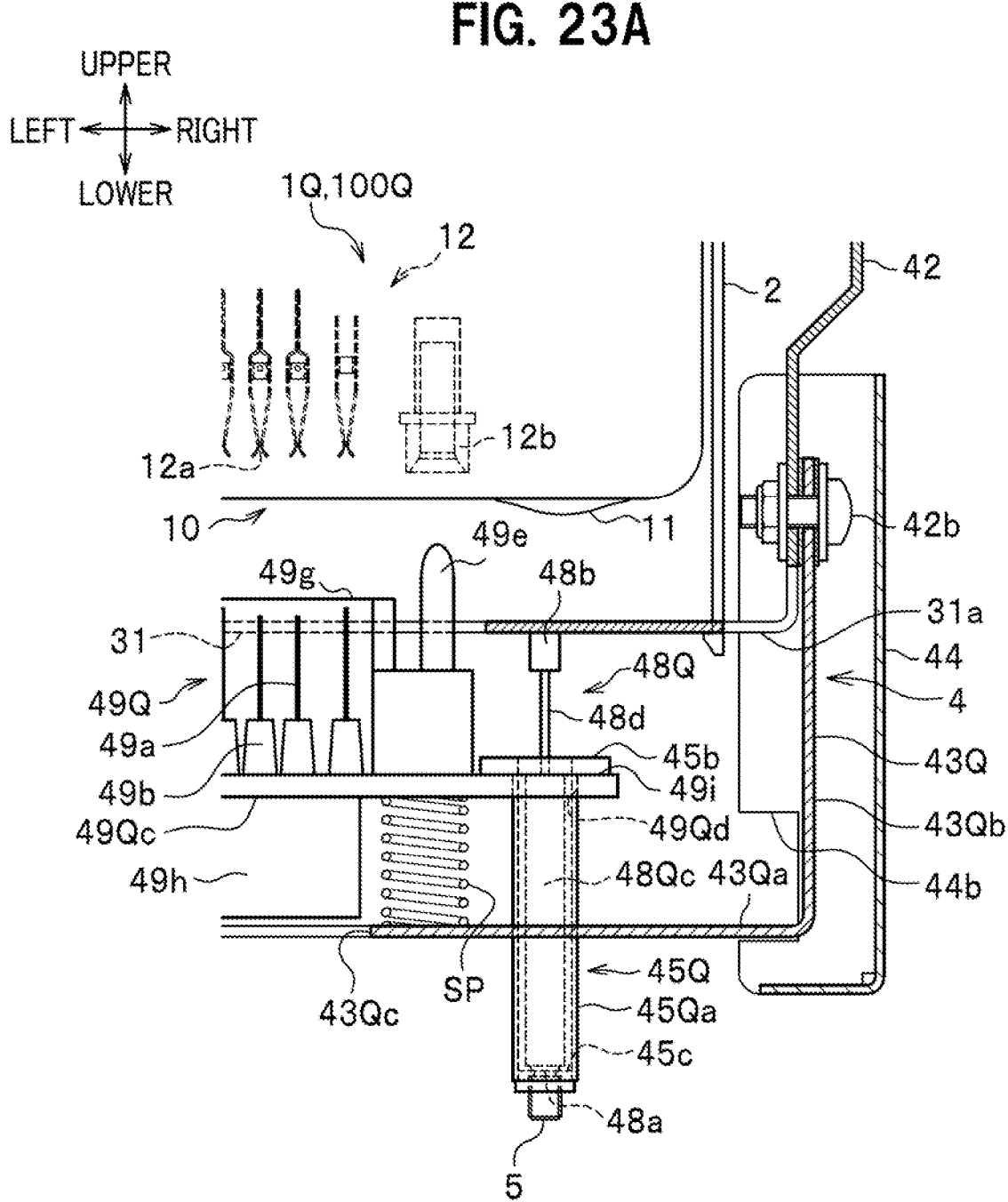
FIG. 23A is a primary-part enlarged front view showing, partially in section, a twelfth modification of the connector driving structure and the power source apparatus having the same according to the embodiment of the present invention.

FIG. 23A is a primary-part enlarged front view showing, partially in section, a twelfth modification of the connector driving structure 1 and the power source apparatus 100 having the same according to the embodiment of the present invention.

FIG. 23B is a primary-part enlarged side view showing the twelfth modification of the connector driving structure 1 and the power source apparatus 100 having the same according to the embodiment of the present invention.

As shown in FIGS. 23A and 23B, the damper holding member 45 and the driving part 43 may be disposed offset from each other in the front-rear direction so as not to interfere with each other.

A hole 49Qd formed in a terminal holding portion 49Qc of a connector 49Q is disposed away from the driving part 43 rearward. This configuration also allows a damper holding members 45Q to move up and down integrally with the connector 49Q.

A connector driving structure 1Q of the twelfth modification thus configured can operate like the embodiment described above.

Thirteenth Modification

Figure 24A:
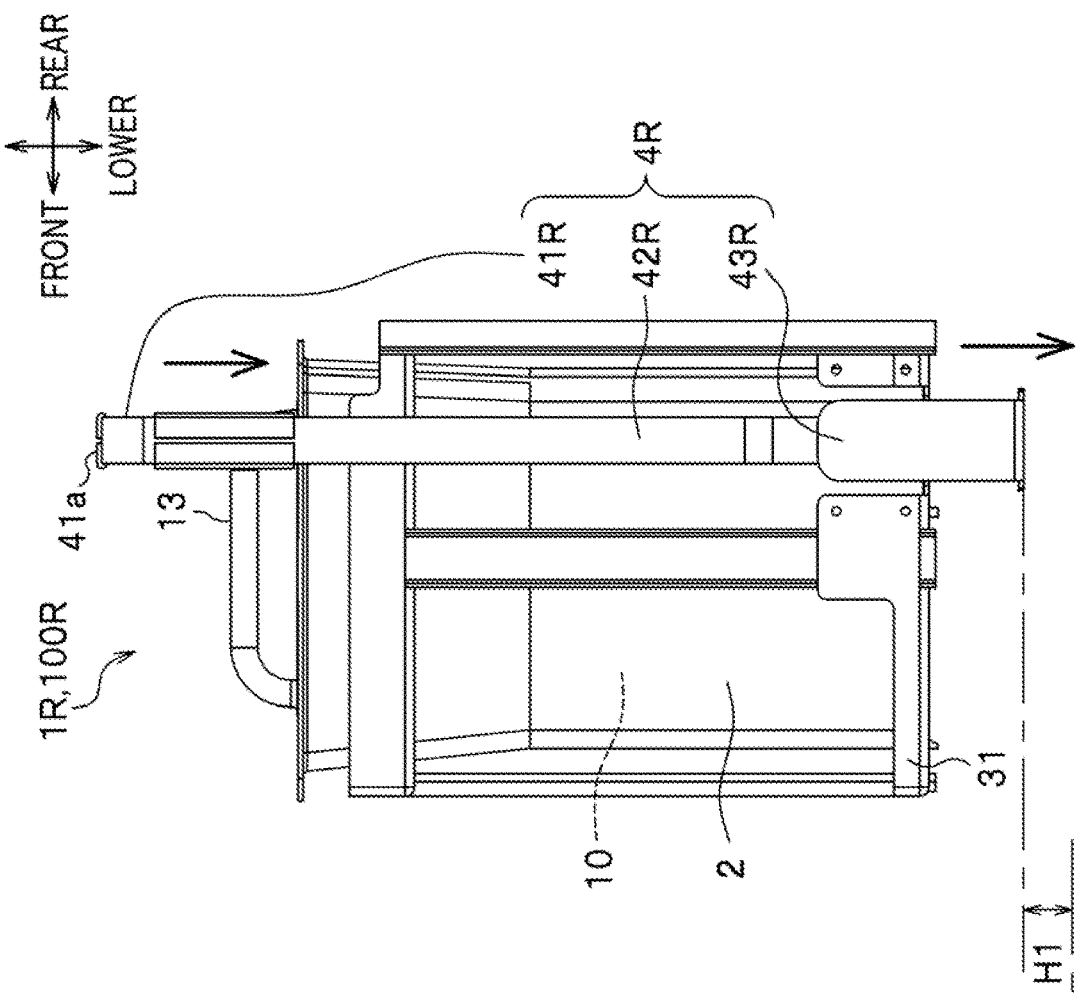
FIGS. 24A and 24B are diagrams showing a thirteenth modification of the connector driving structure and the power source apparatus having the same according to the embodiment of the present invention, FIG. 24A being a side view showing how an operation mechanism is when an operating part is operated to the release position (downward), FIG. 24B being a side view showing the operation mechanism is when the operating part is operated to the fixed position (upward).
Figure 24B:
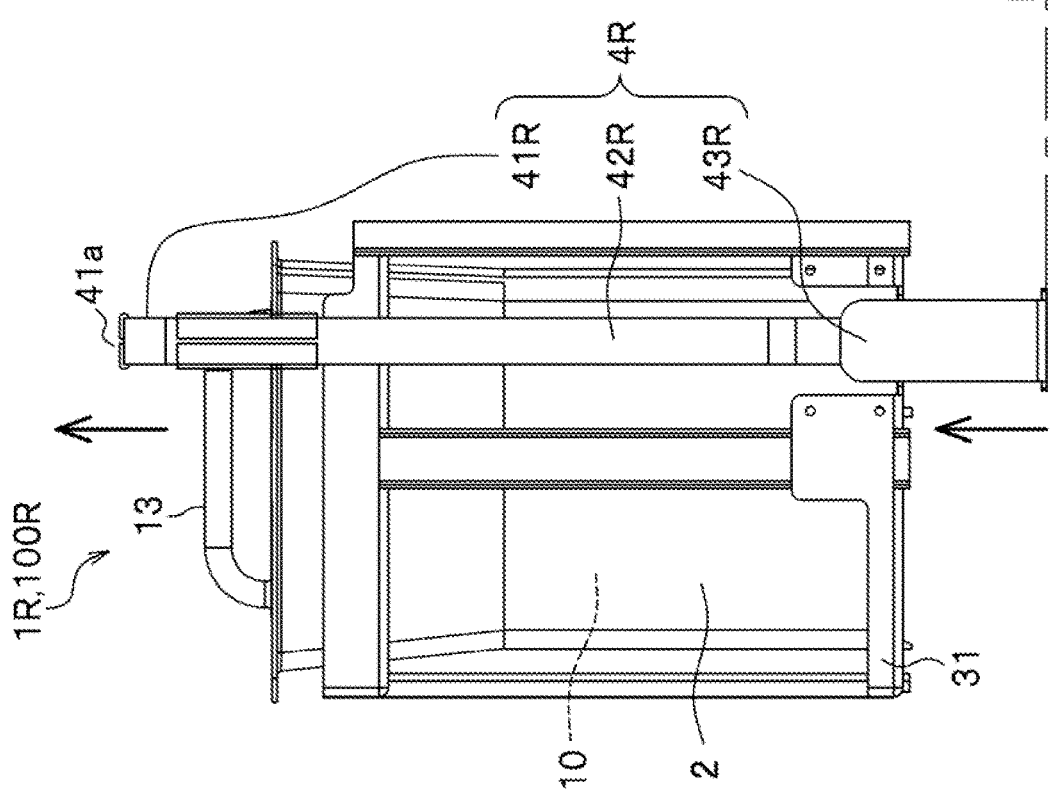

FIGS. 24A and 24B are diagrams showing a thirteenth modification of the connector driving structure 1 and the power source apparatus 100 having the same according to the embodiment of the present invention, FIG. 24A being a side view showing how an operation mechanism 4R is when an operating part 41R is operated to the release position (downward), FIG. 24B being a side view showing how the operation mechanism 4R is when the operating part 41R is operated to the fixed position (upward).

As shown in FIGS. 24A and 24B, the operation mechanism 4R may be of a pull-up type such that the operating part 41R is operated by being pulled upward.

The operation mechanism 4R is configured including the operating part 41R operated by being pulled up or pushed down, link plates 42R that move up and down integrally with the operating part 41R, and a driving part 43R that moves up and down integrally with the operating part 41R. Note that the operating part 41R, the link plates 42R, and the driving part 43R may be a single integrally-formed member.

The operation mechanism 4R thus configured also operates like the operation mechanism 4 of the embodiment. Also, when the operating part 41R, the link plates 42R, and the driving part 43R are formed by a single member, the operation mechanism 4R requires fewer parts and fewer man-hours for assemblage.

Fourteenth Modification

FIGS. 25A and 25B are diagrams showing a fourteenth modification of the connector driving structure 1 and the power source apparatus 100 having the same according to the embodiment of the present invention, FIG. 25A being a side view showing a state where an actuator 42S is operated to the release position (downward), FIG. 25B being a side view showing a state where the actuator 42S is operated to the fixed position (upward).

As shown in FIGS. 25A and 25B, an operation mechanism 4S may be of a switch operation type such that a driving part 43S moves up and down when the actuator 42S is driven.

The operation mechanism 4S is configured including an operating panel 41S formed of a switch, the actuator 42S driven when the operating panel 41S is operated, and the driving part 43S moved up and down by the actuator 42S.

The operating panel 41S may be a switch that sends a drive signal to drive the actuator 42S. The operating panel 41S is formed of a switch such as, for example, a push-button switch, a lever switch, or a slide switch.

The actuator 42S is formed of, for example, a solenoid or motor driven device or the like, and raises or lowers the driving part 43S at an appropriate speed when driven.

The operation mechanism 4S thus configured can also operate like the operation mechanism 4 of the embodiment. By using the electrically-operated actuator 42S, the operation mechanism 4S can form a connector driving structure without using a link structure.

Other Modifications

As shown in FIGS. 1 and 2, the connector 49 described in the embodiment is supported on the driving part 43 in such a manner that the elastic members SP are compressed when the driving part 43 changes its position upward. However, the present invention is not limited to this. The driving part 43 may be supported in such a manner that the elastic members SP are extended when the driving part 43 changes its position upward. This case causes no problem in functionality because the elastic members SP generate restoring force in proportional to the positional change of the driving part 43.

Also, although formed separately in the example described in the embodiment, the battery housing body 2 and the battery holding body 3 may be formed integrally as a single member. In other words, the vertical frames 32 and the upper frame 33 of the battery holding body 3 may be eliminated.

In this case, the battery stand 31 is provided at the bottom portion of the battery housing body 2 to make the battery housing body 2 a bottomed square tube body. Then, the turning-type operating part 41 may be pivotally supported at the side surfaces of an upper portion of the battery housing body 2 in such a manner that the operating part 41 can be operated and turned.

Also, depending on the form of the operating part 41, the notch grooves 31j may be formed in the left and right side surfaces of the battery housing body 2 as needed to enable the operation mechanism 4 to move up and down.

What is claimed is:

1. A connector driving structure comprising:
    an operating part;
    a driving part that moves in conjunction with movement of the operating part;
    a connector supported by the driving part via at least one elastic member;
    at least one damper supported by the connector; and
    a battery stand, wherein
    when the operating part is operated, the driving part changes position between a close position where the driving part is close to the battery stand and an away position where the driving part is away from the battery stand,
    the connector includes a connector terminal and a terminal holding portion holding the connector terminal, and
    a first end of the damper is supported by the terminal holding portion, while a second end of the damper abuts against the battery stand.

2. The connector driving structure according to claim 1, wherein
    the damper is fixed to at least one of the terminal holding portion and the battery stand.

3. The connector driving structure according to claim 1, wherein
    the damper is supported by a bottomed tubular damper holding member fixed to the terminal holding portion, one end of the damper abuts against a bottom portion of the damper holding member, and
    at least part of a total length of the damper is housed in the damper holding member.

4. The connector driving structure according to claim 3, wherein
    the bottom portion of the damper holding member is formed by an adjustment screw screwed into the damper holding member.

5. The connector driving structure according to claim 3, wherein
    the damper holding member extends downward of the driving part through a hole or a notch portion formed in the driving part.

6. The connector driving structure according to claim 5, wherein
    a collar made of resin is provided at the hole or the notch portion.

7. The connector driving structure according to claim 3, wherein
    the elastic member is a coil spring, and
    the damper holding member is inserted through the elastic member.

8. The connector driving structure according to claim 1, wherein
    the battery stand has a rising-and-lowering guide extending in a direction in which the connector changes position, and
    the rising-and-lowering guide is inserted through a guide insertion hole formed in the terminal holding portion.

9. The connector driving structure according to claim 3, wherein
    the battery stand has a guide portion extending in a direction in which the connector changes position,
    the guide portion is a hollow member having an outer peripheral shape smaller than an inner peripheral shape of the damper holding member and having an inner peripheral shape larger than an outer peripheral shape of the damper, and
    when the driving part is at the away position, at least part of a total length of the guide portion is housed in the damper holding member.

10. A power source apparatus comprising the connector driving structure according to claim 1, wherein
    a battery is mounted on the battery stand.

* * * * *